United States Patent [19]
Tsuboka et al.

[11] Patent Number: 5,692,100
[45] Date of Patent: Nov. 25, 1997

[54] VECTOR QUANTIZER

[75] Inventors: Eiichi Tsuboka, Neyagawa; Junichi Nakahashi, Nara, both of Japan

[73] Assignee: Matsushita Electric Industrial Co., Ltd., Osaka, Japan

[21] Appl. No.: 382,753

[22] Filed: Feb. 1, 1995

[30] Foreign Application Priority Data

| | | | |
|---|---|---|---|
| Feb. 2, 1994 | [JP] | Japan | 6-010944 |
| Mar. 24, 1994 | [JP] | Japan | 6-053973 |
| Apr. 12, 1994 | [JP] | Japan | 6-073593 |
| Sep. 16, 1994 | [JP] | Japan | 6-222269 |

[51] Int. Cl.$^6$ ............................................. G10L 9/00
[52] U.S. Cl. ............... 395/2.31; 395/2.33; 395/2.43; 395/2.45; 395/2.53
[58] Field of Search ............ 395/2.1, 2.3, 2.31, 395/2.33, 2.4, 2.43, 2.45, 2.47, 2.48, 2.52, 2.53, 2.54, 2.55

[56] References Cited

U.S. PATENT DOCUMENTS

| | | | |
|---|---|---|---|
| 4,922,508 | 5/1990 | Moriya | 375/34 |
| 5,046,099 | 9/1991 | Nishimura | 381/43 |
| 5,377,301 | 12/1994 | Rosenberg et al. | 395/2.31 |
| 5,487,128 | 1/1996 | Ozawa | 395/2.31 |

OTHER PUBLICATIONS

Picone, "Continuous Speech Recognition Using Hidden Markov Models", IEEE ASSP Magazine, pp. 26–41, Jul. 1990.

Ephraim, "Gain–Adapted Hidden Markov Models for Recognition of Clean and Noisy Speech", IEEE Trans. on Sig. Proc., vol. 40, No. 6, pp. 1303–1316, Jun. 1992.

*Primary Examiner*—Douglas W. Olms
*Assistant Examiner*—Russell W. Blum
*Attorney, Agent, or Firm*—Ratner & Prestia

[57] ABSTRACT

A codebook for vector quantization is speaker-adapted or a speaker is normalized so that it complies with the codebook using a small number of samples for learning. A deviation vector is set for the centroid of each cluster or an input vector. The deviation vector is set so that a separately defined objective function is maximized if it is defined to be maximized, or minimized if it is defined to be minimized. The maximization or minimization is performed using samples for learning obtained from a speaker who uses the system when the centroid or input vector is moved by an amount corresponding to the deviation vector. By moving the centroid or input vector using the deviation vector, speaker adaptation is performed if the former is moved and speaker normalization is performed if the latter is moved.

32 Claims, 31 Drawing Sheets

(ENCODING: TRANSMITTER)

FIG. 14 (ENCODING: TRANSMITTER)

VECTOR QUANTIZER

BACKGROUND OF THE INVENTION

1. Field of the Invention

The present invention relates to a device for adapting a codebook to a speaker in pattern recognition and communication utilizing vector quantization and for normalizing an input signal to be recognized or a signal to be transmitted.

2. Description of the Related Arts

Vector quantization is widely used as a fundamental technique for high efficiency encoding in transmission of speech signals etc. and for pattern recognition such as speech recognition. Vector quantization is performed as described below.

A vector space of interest is divided into M partial spaces. Labels (numbers) 1, . . . , M are assigned to the partial spaces. A representative vector (code vector) μm of a partial space m (m=1, . . . , M) corresponding to a label m is decided. Then, a vector y is converted into any one of the labels 1, . . . , M using a codebook in which μm can be referred to using m. Specifically, the vector y is converted into a label:

$$m^* = \operatorname*{argmin}_{m} [d(y, \mu_m)] \quad \text{Equation 1}$$

where d(u, v) represents the distance between vectors u and v.

A partial space as described above is determined by clustering a set of training vectors. As a method of such clustering, the well known LBG algorithm is frequently used. In this case, the representative vector μm is the center of gravity or mean vector of the cluster m and is also referred to as the centroid of the cluster m.

Transmission of a speech signal utilizing vector quantization is performed as follows.

The transmitter divides a PCM speech signal to be transmitted into blocks each consisting of n samples, treats each of the blocks as an n-dimensional vector, and converts them into a series of labels using a codebook as described above. This process will be described with reference to FIGS. 1. 2 and 3 designate buffer memories in which successive n samples are alternately stored. 1 designates a switch for switching the buffer memories 2 and 3 to cause them to alternately store the above-described n samples. 4 designates a switch for selectively outputting the n samples in the buffer memories 2 and 3. The components 1 through 4 operate so that readout is performed on one of the buffer memories during writing is performed on the other buffer memory. 5 designates a codebook in which an n-dimensional representative vector of each of M clusters is stored in a manner such that it can be retrieved using a label. 6 designates a comparison portion for. comparing the n-dimensional vectors stored in the buffer memories 2 and 3 with the M representative vectors stored in the codebook 5. 7 designates a label selecting portion for selecting the labels corresponding to the representative vectors which are closest to the respective vectors in the buffer memories 2 and 3 based on the result of the comparison. The selected labels are transmitted. In other words, successive n samples are sequentially converted into labels and the labels are transmitted.

The receiver converts the received series of labels into a corresponding series of vectors using a codebook having the same configuration as that described above to return them into a time waveform. 8 designates a code vector readout portion, and 9 designates the codebook. The codebook 9 has the same configuration as that of the codebook 5. The n-dimensional code vectors (representative vectors) corresponding to the received labels are read out from the codebook 9 using the code vector readout portion 8. 11 and 12 designate buffer memories for alternately storing the code vectors each consisting of n components read out from the codebook 9. 10 designates a switch for alternately assigning the code vectors read from the codebook 9 to the buffer memories 11 and 12. 13 designates a switch for alternately reading and outputting the contents of the buffer memories 11 and 12. Thus, the buffer memories 11 and 12 store approximations of the vectors in the buffer memories 2 and 3 obtained using the code vectors.

Therefore, if the approximations are serially read out for the respective n-dimensional vector elements described above, a decoded signal is obtained in the form of an approximation of the transmitted signal. The buffer memories 11 and 12 are adapted so that writing is performed on one of them while the other is being read. Readout is alternately performed on the buffer memories 11 and 12 through the switch 13.

For example, such an arrangement provides a transmission bit rate as described below in transmitting a speech signal in which one sample is represented by 12 bits where the codebook size M=256 and the length of a block n=8. When a PCM signal is transmitted as it is, the quantity transmitted per block is 12×8=96 (bits). If vector quantization is carried out, the required bits are only those for distinguishing the labels, i.e., only $\log_2 256=8$ (bits) are required. This means that the transmission bit rate is reduced by a factor of 12. In this case, each of vectors y consisting of n samples stored in the above-described buffer memories is approximated (quantized) by the centroid closest to it. Therefore, the larger the codebook size M, the smaller an error in such quantization. However, the number of bits required for encoding will be increased. The representative vectors are obtained in the manner as described above from a set of vectors prepared for learning. In order to do this accurately, the vectors for learning must be increased with the codebook size M. Therefore, the codebook size must be decided depending on the purpose in consideration of errors associated with such quantization, the transmission bit rate, the estimated accuracy of representative vectors, etc.

A speech recognition device converts an unknown speech signal into a series of acoustic feature vectors and calculates the likelihood of each reference model stored in advance in association with each category for recognition from the series of acoustic feature vectors to identify the reference model of the maximum likelihood. FIG. 2 is a block diagram for a general speech recognition device utilizing vector quantization in which 20 designates a feature extracting portion for converting an input speech signal into feature vectors. For example, an input speech signal is converted into n-dimensional feature vectors using a filter bank, LPC analysis, cepstrum analysis, etc. every 10 msec. 21 designates a codebook for storing the centroid of each of clusters which are obtained by clustering a set of feature vectors obtained in advance as described above from speech for learning using a known clustering method and which are each labeled to be retrievable using the labels. 22 designates a vector quantizing portion which includes a comparison portion 14 and a label selecting portion 15 shown in FIG. 1. Thus, a feature vector obtained by the feature extracting portion 20 is converted into the label of the cluster having the centroid which is closest to the feature vector in reference to the codebook 21. 23 designates a reference model storing portion in which reference models. associated with various units for recognition are stored. As the units for recognition, words, syllables, and phonemes are frequently used. 24 designates a checking portion which calculates the likelihood of the reference models stored in the reference model storing portion 23 from a series of labels obtained at the output of the vector quantizing portion 22. 25 designates a determination portion which determines the unit for recognition corresponding to the reference model of the maximum likelihood as the result of the recognition.

Reference models which have been proposed include a model which has=various recognition unit utterances as a series of labels and a model which has the so-called HMMs (Hidden Markov Models) in which states, transitions of states, and the degree of occurrence of a feature vector in each state are defined.

The former is known as the SPLIT method wherein a series of labels corresponding to unknown input utterances is checked against a series of labels as reference models or wherein output vectors from a feature extracting portion 20 obtained from unknown input are converted into distance vectors for various centroids (vectors whose component is the distance between the frames to the respective centroids) or similarity vectors (vectors whose component is the similarity of the frames to the respective centroids) instead of being converted into labels, and the distance (similarity) vectors thus obtained are checked against reference models.

The latter is a method which has become the main stream in the art and which is based on the principle as described below, though various improvements on it have been proposed. Assume that a series of feature vectors for unknown input to be recognized is represented by $Y=y_1, y_2, \ldots, y_T$; an arbitrary series of states having a length T generated by HMM $\lambda$ is represented by $X=x_1, x_2, \ldots, x_T$; the probability of a transition from a state i to a state j is represented by $a_{ij}$; the initial probability of the state i, i.e., the probability of the state i when t=1, is represented by ci; and the degree of the occurrence of a vector yt in the state i is represented by $\omega_i(y_t)$. Then, the degree of the occurrence of a series of feature vectors Y from $\lambda$ is expressed by Equations 2, 3 and 4.

$$L_1(Y|\lambda) = \sum_X \pi_{x_1} \prod_{t=1}^{T} a_{x_t x_{t+1}} \prod_{t=1}^{T} \omega_{x_t}(y_t)$$ Equation 2

Alternatively, $$L_2(Y|\lambda) = \max_X \left[ \pi_{x_1} \prod_{t=1}^{T} a_{x_t x_{t+1}} \prod_{t=1}^{T} \omega_{x_t}(y_t) \right]$$ Equation 3

Alternatively, the logarithms of both sides of Equation 3 may be obtained as follows.

$$L_3(Y|\lambda) = \max_X \left[ \log \pi_{x_1} + \sum_{t=1}^{T} \log a_{x_t x_{t+1}} + \sum_{t=1}^{T} \log \omega_{x_t}(y_t) \right]$$ Equation 4

FIG. 4 illustrates transitions of the state of a model which is frequently used. In this figure, the superscript w indicates correspondence to an unit for recognition w. If this model is represented by HMMw, the reference model storing portion 23 in FIG. 2 stores HMM 1, HMM 2, . . . , HMM W as shown in FIG. 3. The result of recognition will be as expressed in Equation 5 for $L1(Y|\lambda^W)$, $L2(Y|\lambda^W)$, and $L3(Y|\lambda^W)$ corresponding to the unit for recognition w.

$$\hat{w} = \underset{W}{\text{argmax}} \ [L_i(Y|\lambda^W)]$$ Equation 5

In Equation 5, i=1 if Equation 2 is used; i=2 if Equation 3 is used; and i=3 if Equation 4 is used.

There are three types of HMMs, i.e. successive discrete HMMs, and FVQ type HMMs which depend on the manner in which the degree of the occurrence of a feature vector $i(y_t)$ in a state i is defined. The present invention addresses discrete HMMs and FVQ type HMMs.

According to discrete HMMs, $$\omega_i(y_t) = b_{im}; \ m = \underset{K}{\text{argmax}} \ [d(y_t, \mu_k)]$$ Equation 6 where bim represents the probability of the occurrence of a label m in a state i.

As an improvement on discrete HMMs, there are HMMs based on fuzzy vector quantization (FVQ type HMMs). In normal vector quantization, a feature vector $y_t$ is uniquely quantized to the representative vector of the cluster closest thereto. According to fuzzy vector quantization, however, the membership value of the feature vector $y_t$ for a cluster m is defined as $0 \leq u_{tm} \leq 1$ and $u_{t1}+u_{t2}+ \ldots +u_{tM}=1$, and the following definition will be given.

$$\omega_i(y_t) = \sum_{m=1}^{M} u_{tm} b_{im}$$ Equation 7 or $$\log \omega_i(y_t) = \sum_{m=1}^{M} u_{tm} \log b_{im} \ \text{or}$$ Equation 8

$$\omega_i(y_t) = \prod_{m=1}^{M} (b_{im})^{u_{tm}}$$

Normally, a codebook is obtained as mean values based on the utterances of various sentences, words, etc. of a multiplicity of speakers. A deviation from such an average value will result in increased distortion which leads to a reduction in the quality of a decoded signal in the case of communication and to deterioration of recognition performance in the case of speech recognition. If a codebook is created for each speaker and the codebook used is switched defending on the speaker, the performance will be improved. However, this is not practical because a huge amount of data for learning must be collected from even a single speaker.

When HMMs are stored in syllable or phoneme unit which is a unit smaller than words, performance is degraded because of differences in context (the order of syllables, phonemes, etc) between words for learning and words for recognition.

Performance can be degraded also when the environment at the time of recognition is different from that at the time of collection and recording of data for learning.

As described above, the prior art speech recognition has had a problem in that the degradation of performance can be caused by differences in speakers and contexts between the time of learning and the time for recognition.

SUMMARY OF THE INVENTION

According to a first aspect of the present invention, there is provided a vector quantizer including a reference codebook for storing several representative vectors in a feature vector space so that they can be retrieved using labels corresponding thereto, a learning vector storing means for storing several vectors for learning, an objective function calculating means for calculating an objective function defined as a function of the representative vectors and the vectors for learning, a deviation vector calculating means for calculating deviation vectors, and an adaptation means for obtaining new representative vectors by adding the deviation vectors to the representative vectors wherein input vectors are encoded by converting the input vectors into labels or membership vectors whose components are the membership values of the input vector for the labels using the new representative vectors and wherein the deviation vector calculating means calculates so that the new representative vectors maximize of the objective function relative to the vector for learning.

According to a second aspect of the present invention, there is provided a vector quantizer comprising a reference codebook for storing several representative vectors in a feature vector space so that they can be retrieved using labels corresponding thereto, a learning vector storing means for storing several vectors for learning, an objective function calculating means for calculating an objective function defined as a function of the representative vectors and the vectors for learning, a deviation vector calculating means for calculating a deviation vector, and a normalization means for adding the deviation vector to input vectors wherein the input vectors are encoded by adding the deviation vectors to the input vectors to obtain the normalized input vectors and by converting them into labels or membership vectors whose components are the membership values of the input vectors for the labels and wherein the deviation vector calculating means calculates so that the objective function is maximized when the sums of the vectors for learning and the deviation vector are placed in the reference codebook as new vectors for learning.

In the vector quantizer according to the first aspect of the present invention, several representative vectors in a feature vector space are stored in a reference codebook so that they can be retrieved using labels corresponding thereto; several vectors for learning are stored in a learning vector storing means in advance; an objective function defined as a function of the representative vectors and the vectors for learning is calculated by an objective function calculating means; deviation vectors are calculated by a deviation vector calculating means; and new representative vectors are obtained by adding the deviation vectors to the representative vectors using an adaptation means. Input vectors to be encoded are converted into labels or membership vectors whose components are the membership values of the input vector for the labels by a vector quantization means using the new representative vectors, and the deviation vector calculating means calculates so that the new representative vectors maximize of the objective function relative to the vector for learning.

In the vector quantizer according to the second aspect of the present invention, several representative vectors in a feature vector space are stored in a reference codebook so that they can be retrieved using labels corresponding thereto; several vectors for learning are stored in a learning vector storing means in advance; an objective function defined as a function of the representative vectors and the vectors for learning is calculated by an objective function calculating means; deviation vectors are calculated by a deviation vector calculating means; and the deviation vector is added to input vectors to be encoded by a normalization means to obtain normalized input vectors. The normalized input vectors are converted by a vector quantization means into labels or membership vectors whose components are the membership values of the input vectors for the labels using the representative vectors. The deviation vector is calculated by the deviation vector calculating means so that the objective function is maximized using the sums of the vectors for learning and the deviation vector are placed in the reference codebook as new vectors for learning.

DETAILED DESCRIPTION OF THE PREFERRED EMBODIMENTS

Figure 1:
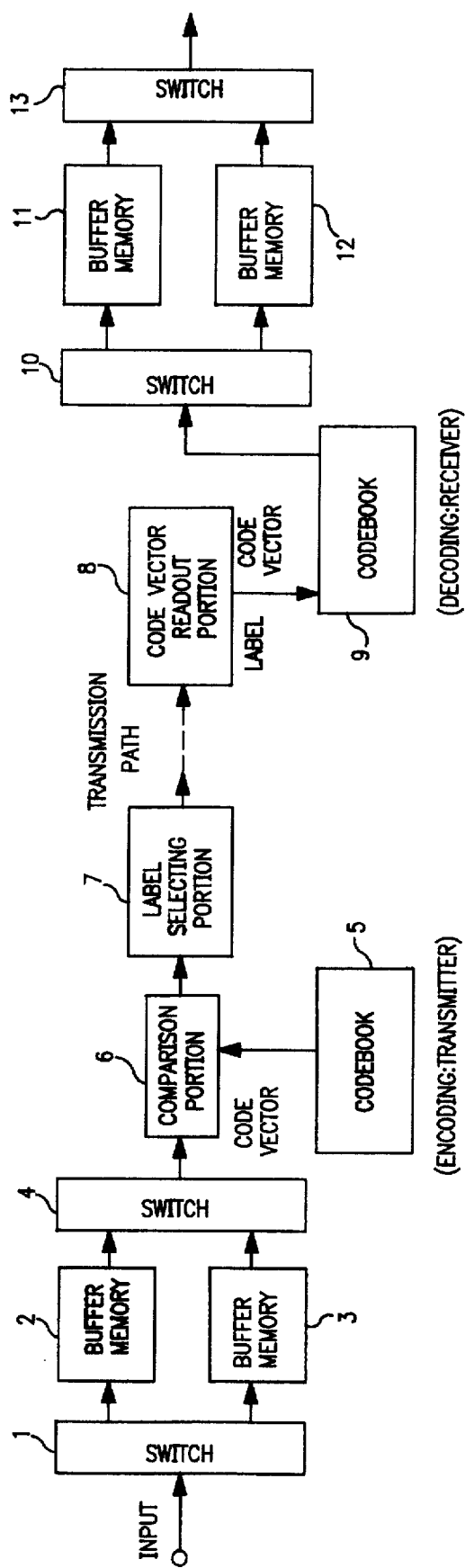
FIG. 1 illustrates the principle of a transmission method based on vector quantization.

The present invention addresses normalization of speakers or adaptation of a codebook. Specifically, the present invention relates to method which solves the problems as described earlier by correcting input vectors depending on the speaker or by correcting representative vectors of a codebook depending on the speaker based on only a few voices of the speakers to be recognized on an unsupervised basis (i.e., the system is not taught what words, sentences, etc. the speakers have pronounced).

A codebook is created by clustering a set of feature vectors obtained from utterances of a multiplicity of speakers. Methods of clustering include the so-called hard clustering in which each feature vector is assigned to only one cluster and the so-called fuzzy clustering in which each feature vector is assigned to each cluster in accordance with the membership value of the feature vector for the cluster. As a method for hard clustering, there is an algorithm called LGB method. For fuzzy clustering, well known methods such as the fuzzy k-means method are used. Although the present invention can be applied to both of hard clustering and fuzzy clustering, hard clustering can be regarded as a special case of fuzzy clustering.

Fuzzy clustering is carried out as follows.

Serial numbers $y_1, y_2, \ldots, y_n, \ldots, y_N$ are assigned to feature vectors obtained from utterances of a multiplicity of speakers. The point is to decide a centroid matrix $V=[\mu_1, \mu_2, \ldots, \mu_M]$ and a membership matrix $U=[u_{nm}]$ so that the following objective function is minimized provided that $u_{n1}+u_{n2}+\ldots+u_{nM}=1$ where $u_{nm}$ represents the membership value of a feature vector y for a cluster m $(=1, \ldots M)$ and m represents a centroid vector of the cluster m.

$$J = \sum_{n=1}^{N} \sum_{m=1}^{M} u_{nm}^F d(y_n, \mu_m) \qquad \text{Equation 9}$$

This is carried out by repeating an operation alternately on the matrices V and U in which one of the matrices V or U is fixed and the objective function J is minimized using the other matrix. Specifically, an operation of fixing V and obtaining U' as the solution to $\delta J/\delta U=0$ for U, an operation of liking U and obtaining V' as the solution to $\delta J/\delta V=0$ for V, and an operation of establishing U=U' and V=V' as new U and V are alternately repeated until convergence is achieved. F represents fuzziness and F>1. The greater the value of F, the greater the fuzziness between clusters.

Fuzzy clustering is performed in the following steps where $d(y_n, \mu m)=(y_n-\mu m)^T(y_n-\mu m)$.

(Step 1-1)

The number of clusters, the number of the iterations of the alculation, and the value of the objective function are put as M, s=0, and J(0)=1, respectively, and an initial value $U^{(0)}$ of the membership matrix $U=[u_{nm}$ is appropriately given.

(Step 1-2)

We put s=s+1.

(Step 1-3)

The average vector $\mu m^{(S)}$ of a cluster m (m=1, . . . , M) is obtained by the following equation.

$$\mu_m^{(s)} = \frac{\sum_{n=1}^{N} (u_{nm}^{(s-1)})^F y_n}{\sum_{n=1}^{N} (u_{nm}^{(s-1)})^F} \quad ; \quad 1 \le m \le M \qquad \text{Equation 10}$$

(Step 1-4)

The membership matrix of each point to the clusters is calculated using the following equation.

$$u_{nm}^{(s)} = \frac{1}{\sum_{k=1}^{M} \frac{d(y_n, \mu_m^{(s-1)})}{d(y_n, \mu_k^{(s-1)})}^{1/(F-1)}} \qquad \text{Equation 11}$$

$$1 \le m \le M, \quad 1 \le n \le N$$

(Step 1-5)

The objective function is calculated as follows.

$$J^{(s)} = \sum_{n=1}^{N} \sum_{m=1}^{M} (u_{nm}^{(s)})^F d(y_n, \mu_m^{(s)}) \qquad \text{Equation 12}$$

(Step 1-6)

It is determined whether the following condition for termination is satisfied.

$$\frac{|J^{(s-1)} - J^{(s)}|}{J^{(s-1)}} \le \epsilon \qquad \text{Equation 13}$$

If, not, the process returns to Step 1-2. If yes, the process is terminated.

represents an appropriate small positive number which is defined in advance. The smaller this value, the higher the accuracy of the estimation of the centroid. However, convergence will take a longer time.

In the above-described steps, Equation 10 is obtained by solving $lJ(S-1)/l\mu m^{(S-1)})=0$ for $\mu m^{(S-1)}$ and Equation 11 is obtained by solving the following equation by $\mu m^{(S-1)}$ where represents a Lagrange's undetermined multiplier.

$$\frac{\partial}{\partial u_{nm}^{(s-1)}} \left\{ J^{(s-1)} + \theta \left( \sum_{k=1}^{M} u_{nk}^{(s-1)} - 1 \right) \right\} \qquad \text{Equation 14}$$

Further, if the fuzziness F→1+0, 1/(F−1)→.

When $\mu_m^{(S-1)}$ is closest to yn, $d(y_n, \mu_m^{(S-1)}) < d(y_n, \mu_h^{(S-1)})$ for $h \neq m$ $d(y_n, \mu_m^{(S-1)}) = d(y_n, \mu_h^{(S-1)})$ for $h = m$ Therefore, $\{d(y_n, \mu_m^{(S-1)})/d(y_n, \mu_h^{(S-1)})\}^{1/(F-1)} \to 0$ for $h \neq m$ $\{d(y_n, \mu_m^{(S-1)})/d(y_n, \mu_h^{(S-1)})\}^{1/(F-1)} = 1$ for $h = m$ Then, $$u_{nm}^{(s)} = 1 \text{ for } m = \underset{h}{\operatorname{argmin}}\, [d(y_n, \mu_h)] \quad \text{Equation 15}$$

$$u_{nm}^{(s)} = 0 \text{ for } m \neq \underset{h}{\operatorname{argmin}}\, [d(y_n, \mu_h)]$$

Hard clustering is thus performed.

Hard clustering is to give a definition that $unm(S)=L_{(n)}$, $m_{(S)}$ in performing fuzzy clustering where $L_{(n)}$ represents the label of the cluster closest to $y_n$. $\delta_{ij}$ represents the Kronecker's delta. $\delta_{ij}=1$ if $i=j$, and $\delta_{ij}=0$ if $i=j$. Therefore, the above-described procedure will be replaced by the following in the case of hard clustering.

First, the objective function is:

$$J = \sum_{n=1}^{N} \sum_{m=1}^{M} \delta_{L(n),a}\, d(y_n, \mu_m) \quad \text{Equation 16}$$

In this case, clustering is performed as follows.

(Step 2-1)

We put $s=0$ and $J(0)=1$.

(Step 2-2)

We put $s=s+1$ (Step 2-3)

The average vector $\mu_m^{(S)}$ of a cluster (m=1, ..., M) is obtained by the following equation.

$$\mu_m^{(s)} = \frac{\sum_{n=1}^{N} (\delta_{L(n),m})^F y_n}{\sum_{n=1}^{N} (\delta_{L(n),m})^F} \quad \text{Equation 17}$$

$$= \frac{\sum_{n:L(n)=m} y_n}{\sum_{n:L(n)=m}}$$

$$= \frac{1}{|C_m|} \sum_{n:L(n)=m} y_n$$

$1 \leq m \leq M$ where $|C_m|$ represents the total number of the vectors included in the cluster m.

(Step 2-4)

The centroid closest to each point is calculated to cluster each point.

$$\hat{m} = \underset{m}{\operatorname{argmin}}\, [d(y_n, \mu_m^{(s)})] \quad \text{Equation 18}$$

$L(n) = \hat{m}$ (Step 2-5)

The objective function is calculated as follows.

$$J^{(s)} = \sum_{m=1}^{M} \sum_{n=1}^{N} \delta_{L(n),m}\, d(y_n, \mu_s^{(s)}) \quad \text{Equation 19}$$

$$= \sum_{m=1}^{M} \sum_{n:L(n)=s} d(y_n, \mu_s^{(s)})$$

(Step 2-6)

It is determined whether the following condition for termination is satisfied.

$$\frac{|J^{(s-1)} - J^{(s)}|}{J^{(s)}} \leq \epsilon \quad \text{Equation 20}$$

If, not, the process returns to Step 2-2. If yes, the process is terminated.

A codebook is created as described above. The codebook thus created is adapted to the utterance of a speaker A as follows.

The point is to convert the centroid $\mu_m^{(S)}$ (m=1, ..., M) into $\mu m'$ which is closest to the utterance of the speaker A. According to a first embodiment of the present invention, this is accomplished by performing this conversion by putting $\mu_m'=\mu_m+h_m$ and by finding the optimum hm from the utterance of the speaker A. Specifically, this can be accomplished by finding hm which gives an appropriately small solution to:

$$J' = \sum_{i=1}^{I} \sum_{m=1}^{M} u_{im}^F d(y_i^A, \mu_m') \quad \text{Equation 21}$$

$$= \sum_{i=1}^{I} \sum_{m=1}^{M} u_{im}^F d(y_i^A, \mu_m + h_m)$$

where feature vectors obtained from the utterance of the speaker A for the adaptation of the codebook are indicated by serial numbers $y^A_1, y^A_2, \ldots, y^A_I$. A definition that $d(y, \mu)^T(y-\mu)$ as in the above-described example will give the hm according to the following steps. S represents a value which is predetermined as the upper limit for the number of the iteration of the operation.

(Step 3-1)

An initial value $U(0)$ of the membership matrix $U=[u_{nm}]$ is given by:

$$u_{nm}^{(0)} = \frac{1}{\sum_{k=1}^{M} \frac{d(y_i^A, \mu_m + h_m^{(0)})}{d(y_i^A, \mu_k + h_k^{(0)})}^{1/(F-1)}}\; ;\; \begin{array}{l}1 \leq m \leq M,\\ 1 \leq n \leq N\end{array} \quad \text{Equation 22}$$

where the number of clusters is represented by M; the number of the iteration of the calculation s=0; the value of the objective function $J^{(0)}=\infty$; and $hm^{(0)}=0$ (m=1, ..., M).

(Step 3-2)

We put s=s +1.

(Step 3-3)

A deviation vector $hm^{(S)}$(m=1, ..., M) is obtained by the following equation.

$$h_m^{(s)} = \frac{\sum_{i=1}^{I} (u_{im}^{(s-1)})^F (y_i^A - \mu_m)}{\sum_{i=1}^{I} (u_{im}^{(s-1)})^F} \quad \text{Equation 23}$$

(Step 3-4)

The membership matrix of each point (vector for learning) for the clusters is calculated using the following equation.

$$u_{im}^{(s)} = \frac{1}{\sum_{k=1}^{M} \frac{d(y_i^A, \mu_m + h_m^{(s)})}{d(y_i^A, \mu_k + h_m^{(s)})}^{1/(F-1)}} ; \quad \begin{array}{l} 1 \leq m \leq M, \\ 1 \leq i \leq N \end{array}$$ Equation 24

(Step 3-5)
The objective function is calculated as follows.

$$J^{(s)} = \sum_{i=1}^{I} \cdot \sum_{m=1}^{M} (u_{im}^{(s)})^F d(y_i^A, \mu_m + h_m^{(s)})$$ Equation 25

(Step 3-6)
It is determined whether the following condition for termination is satisfied.

$$\frac{|J^{(s-1)} - J^{(s)}|}{J^{(s-1)}} \leq \delta \text{ or } s \geq S$$ Equation 26

If not, the process returns to Step 3-2. If yes, the process is terminated.

δ in Step 3-6 is an appropriately small number which is determined by the degree to which the centroids of the codebook which are prepared as reference values are made close to the audio input used for learning. If δ is small and S is large, the codebook will be close to that obtained by clustering using only the utterances for learning. When the number of the utterances for learning is small, it is not preferable that the distribution of the centroids is over-biased toward the utterances for learning. So, appropriate magnitude must be selected for δ and S depending on the number of the utterances for learning.

When the number of the utterances for learning is small, $h_m$ in the objective function (Equation 21) is preferably kept common against various values of m=1, ..., M. A second embodiment of the present invention is an example of this arrangement in which h=h$_1$=h$_2$=..., h$_M$ and the objective function is:

$$J'' = \sum_{i=1}^{I} \sum_{m=1}^{M} u_{im}^F d(y_i^A, \mu_m') = \sum_{i=1}^{I} \sum_{m=1}^{M} u_{im}^F d(y_i^A, \mu_m + h)$$ Equation 27 h is obtained from the following steps.
(Step 4-1)
An initial value U$^0$ of the membership matrix U=[u$_{n,m}$] is given by:

$$u_{nm}(0) = \frac{1}{\sum_{k=1}^{M} \frac{d(y_i^A, \mu_m + h^{(0)})^{1/(F-1)}}{d(y_i^A, \mu_k + h^{(0)})}} ; \quad \begin{array}{l} 1 \leq m \leq M, \\ 1 \leq n \leq N \end{array}$$ Equation 28 where the number of clusters is represented by M; the number of the iteration of the calculation s=0; the value of the objective function J$^{(0)}$=; and hm$^{(0)}$=0.
(Step 4-2)
We put s=s +1.
(Step 4-3)
A deviation vector h$^{(S)}$ is obtained by the following equation.

$$h^{(s)} = \frac{\sum_{i=1}^{I} \sum_{m=1}^{M} (u_{im}^{(s-1)})^F (y_i^A - \mu_m)}{\sum_{i=1}^{I} \sum_{m=1}^{M} (u_{im}^{(s-1)})^F}$$ Equation 29

(Step 4-4)
The membership matrix of each point (vector for learning) for the clusters is calculated using the following equation.

$$u_{im}^{(s)} = \frac{1}{\sum_{k=1}^{M} \frac{d(y_i^A, \mu_m + h^{(s)})^{1/(F-1)}}{d(y_i^A, \mu_k + h^{(s)})}} ;$$ Equation 30

$1 \leq m \leq M,$
$1 \leq i \leq N$ (Step 4-5)
The objective function is calculated as follows.

$$J^{(s)} = \sum_{i=1}^{I} \sum_{m=1}^{M} (u_{im}^{(s)})^F d(y_i^A, \mu_m + h^{(s)})$$ Equation 31

(Step 4-6)
It is determined whether the following condition for termination is satisfied.

$$\frac{|J^{(s-1)} - J^{(s)}|}{J^{(s-1)}} \leq \delta \text{ or } s \geq S$$ Equation 32

If not, the process returns to Step 4-2. If yes, the process is terminated.

Again in this case, the influence of the utterances for learning on the amount of the correction of the centroids can be adjusted through the selection of δ and S.

Figure 5:
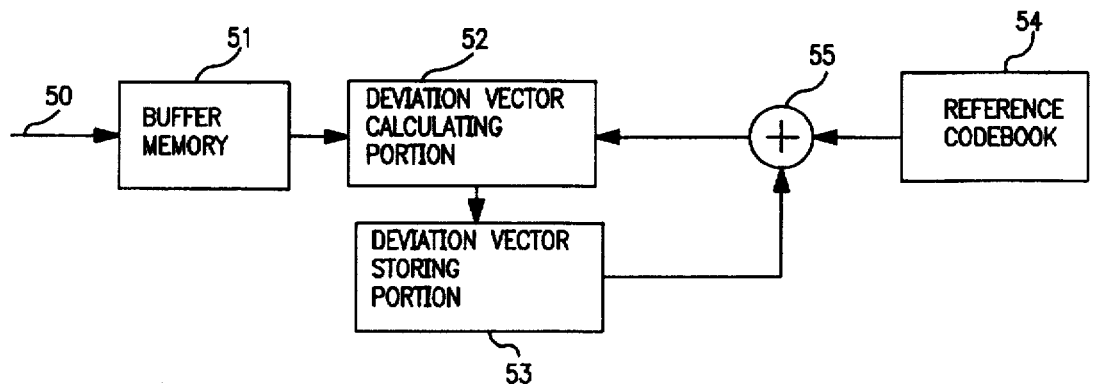
FIG. 5 illustrates the principle of an embodiment of a method of adaptation according to the present invention.

FIG. 5 is a block diagram showing the configuration of the first and second embodiments of the present invention. In the first embodiment, Steps 3-1 through 3-6 are carried out and, in the second embodiment, Steps 4-1 through 4-6 are carried out. 50 designates a terminal to which the vectors for learning y$^A$$_1$, ..., y$^A$$_N$ for creating a codebook are input. 51 designates a buffer memory for storing the vectors for learning y$^A$$_1$, ..., y$^A$$_N$. 54 designates a reference codebook in which code vectors created from a multiplicity of speakers are stored in a manner allowing them to be retrieved using labels. 53 designates a deviation vector storing portion, and 55 designates an adder which adds the contents of the reference codebook 54 and the contents of the deviation vector storing portion 55. 52 designates a deviation vector calculating portion which calculates h$_m$ (m=1, ..., M) from the contents of the buffer memory 51 and the output of the adder 55 according to Steps 6-1 through 6-6 in the first embodiment and which makes calculations at Steps 4-1 through 4-6 in the second embodiment. The calculated deviation vectors are stored in the deviation vector storing portion 53. When the above-described repeated calculations are started, the contents of the deviation vector storing portion 53 is initialized to zero. With this configuration, the contents of the deviation vector storing portion 53 are rewritten each time a deviation vector is updated during the calculations. If the condition for convergence in Step 3-6 or Step 4-6 is satisfied, deviation vectors adapted to the speaker A are finally obtained in the deviation vector storing portion 53. Representative vectors appropriate. for the speaker A can be obtained by adding the deviation vectors thus obtained to the output of the reference codebook.

Figure 6:
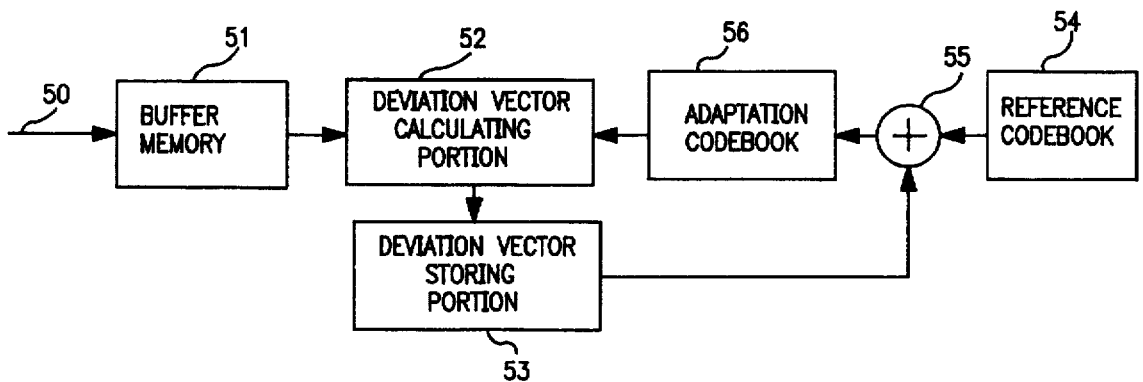
FIG. 6 illustrates the principle of another embodiment of the present invention.

FIG. 6 shows a case wherein an adaptation codebook 56 is inserted between the adder 55 and deviation vector calculating portion 52. Apparently, this configuration will finally provide an adaptation codebook as a codebook which is appropriate for the speaker A.

Figure 7:
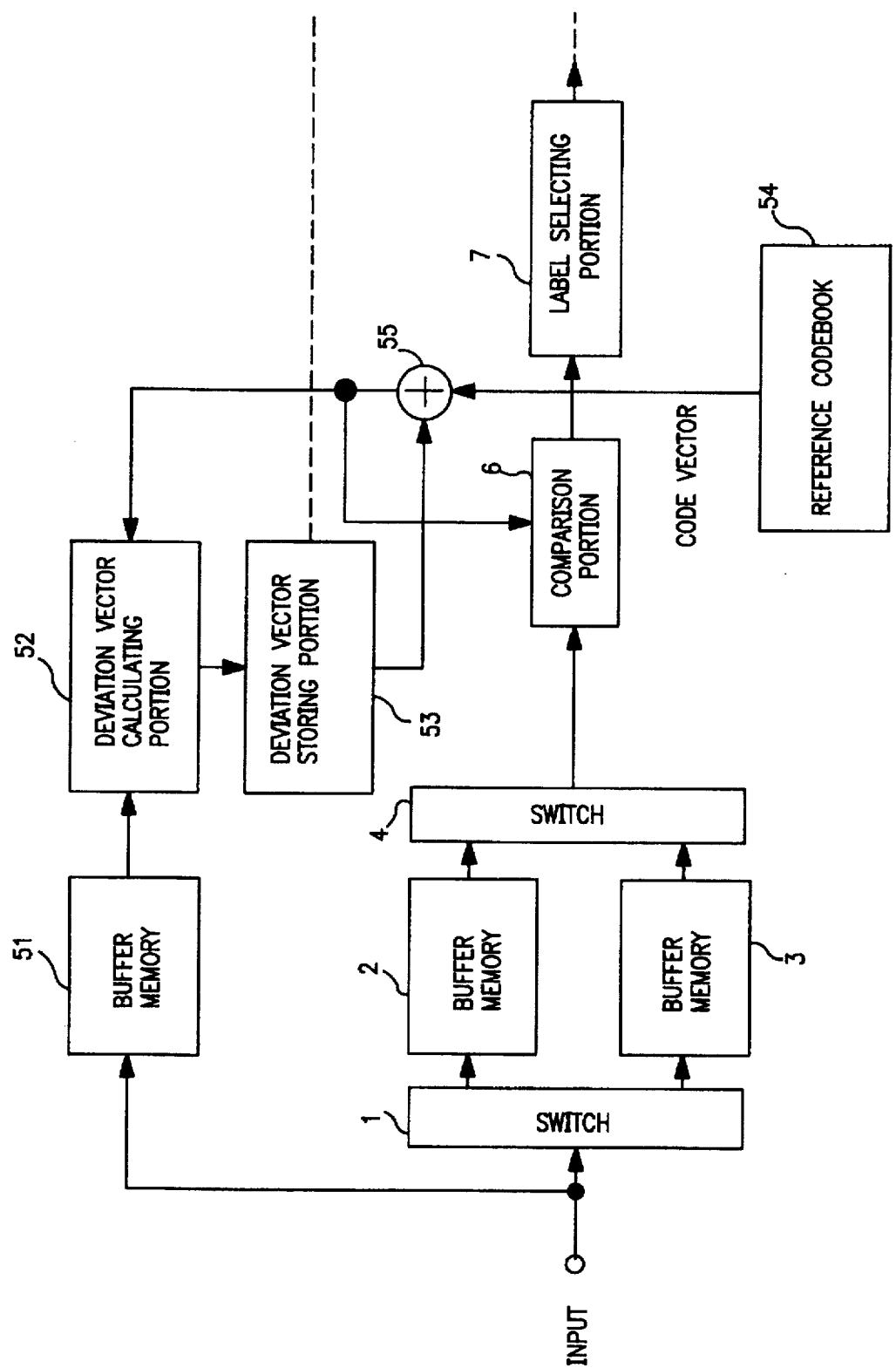
FIG. 7 is a block diagram of a signal transmitter based on vector quantization according to the principle illustrated in FIG. 5.
Figure 8:
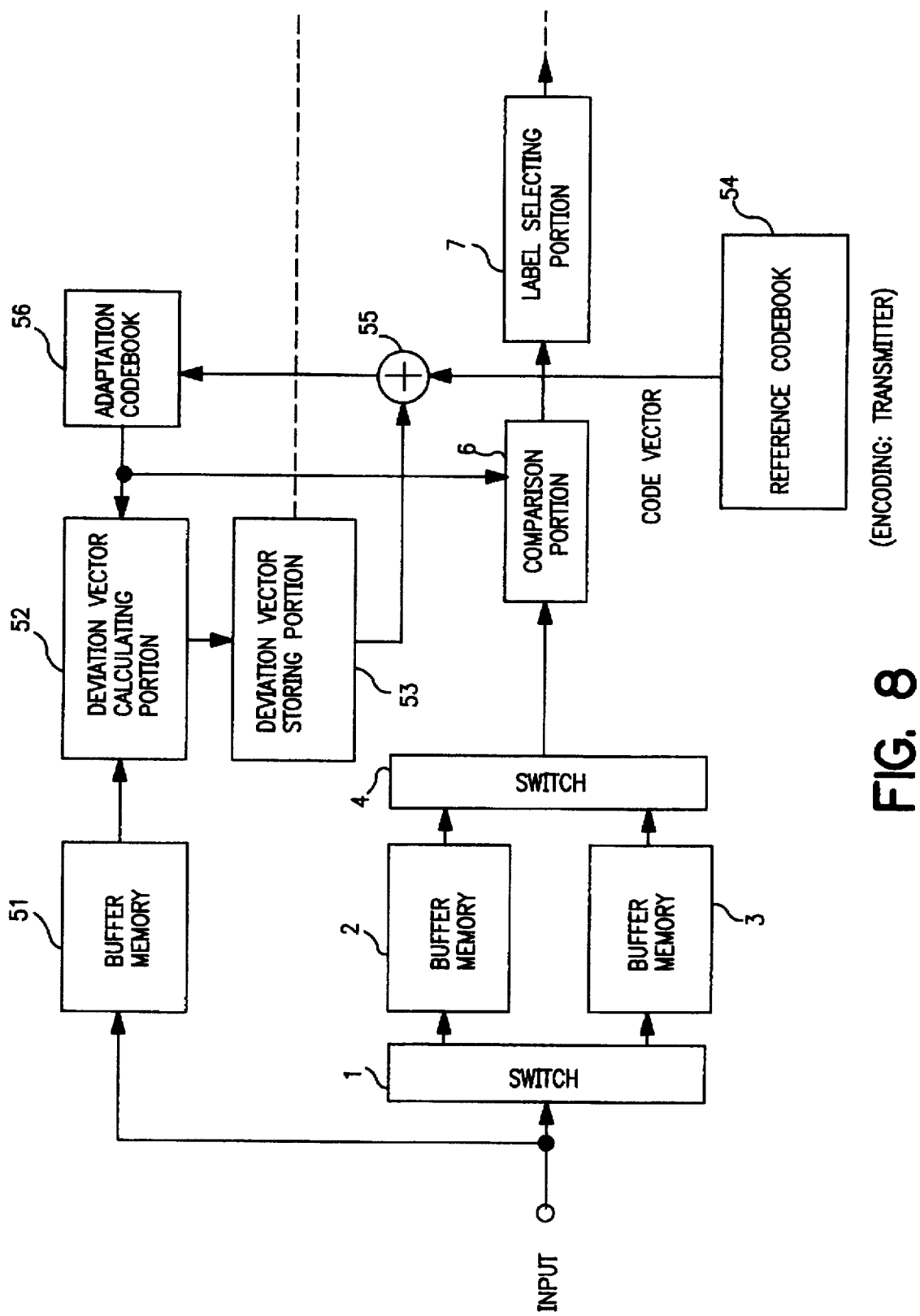
FIG. 8 is a block diagram of a signal transmitter based on vector quantization according to the principle illustrated in FIG. 6.

FIG. 7 and FIG. 8 show an embodiment of a transmitter of a communication device employing the above-described principle.

FIG. 7 shows a case wherein the method of adaptation to a speaker shown in FIG. 5 is employed. Blocks 1, 2, 3, 4, 6, and 7 operate in the same manner as the blocks having the same reference numbers in FIG. 1. Blocks 51 through 54 in FIG. 7 operate in the same manner as the blocks having the same reference numbers in FIG. 6 and are used mostly for speaker adaptation. Each time the speaker is changed to a new person, deviation vectors representing the deviation of the new speaker from the reference codebook are learned and stored in the deviation vector storing portion 53 as described above. While the output of the switch 4 and the contents of the codebook 5 are compared in the case of the system shown in FIG. 1, FIG. 7 shows that the output of the switch 4 is compared with the output of the adder 55. The output of the adder 55 may be regarded as a reference codebook which has been compensated for the deviation of the speaker.

FIG. 8 shows a case wherein the method for speaker adaptation as shown in FIG. 6 is used. In this case, an adaptation codebook is inserted as described above. The comparator 6 compares the output of the switch 4 and the output of the adaptation codebook. This is because the output of the adaptation codebook stores representative vectors which are a result of compensation for the speaker.

FIGS. 9 through 12 show an embodiment of a receiver for reproducing the original series of samples from the series of labels received as described above.

Figure 9:
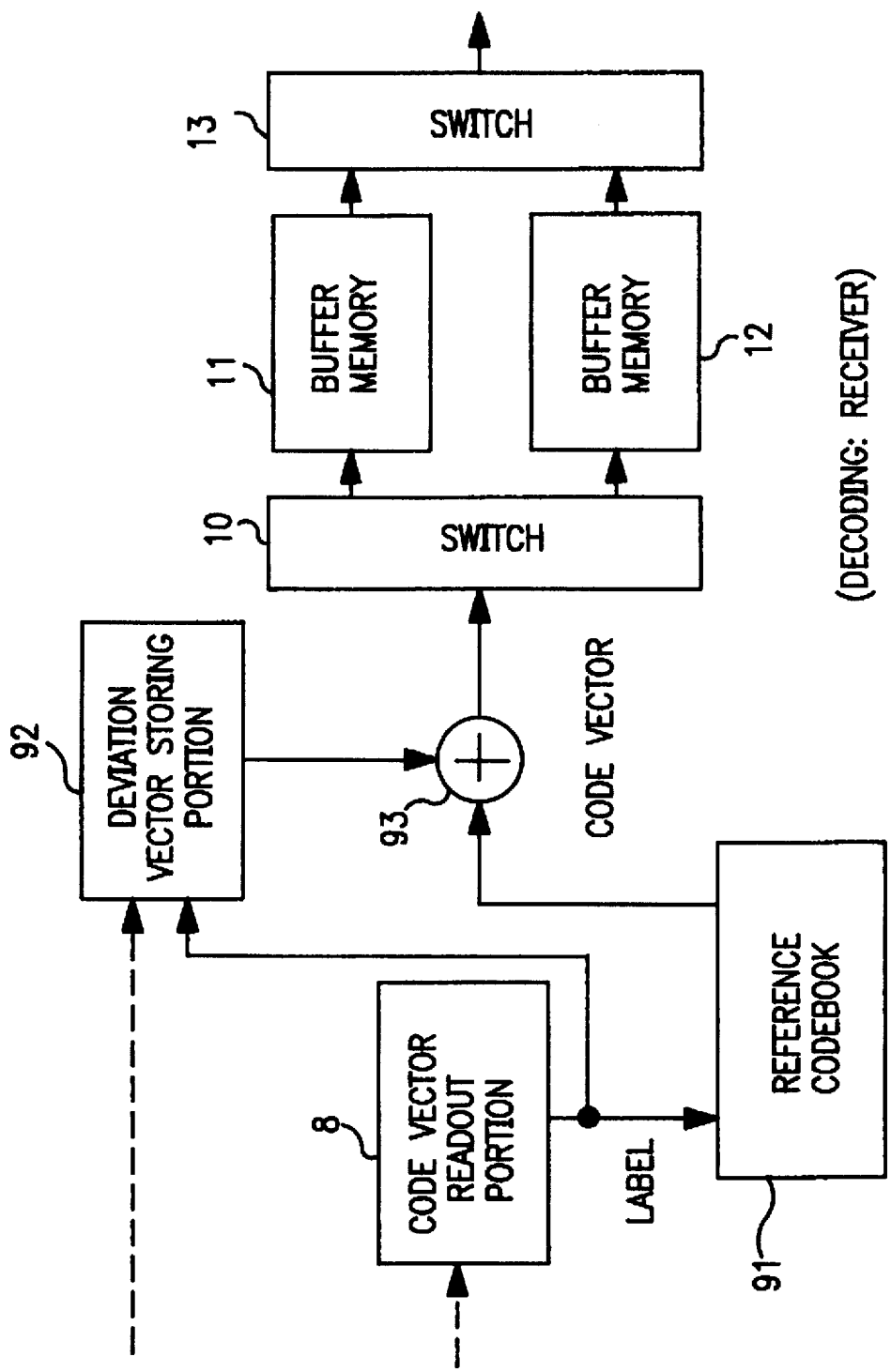
FIG. 9 shows an embodiment of a receiver for the transmitter in FIG. 7 and FIG. 8.

Referring to FIG. 9, deviation vectors associated with the speakers are first received and are stored in a deviation vector storing portion in advance. Thereafter, the vectors corresponding to the received labels are read from a reference codebook. The code vectors thus read are compensated by an adder 93 based on the contents of the deviation vector storing portion described above, and blocks 10 through 13 perform processes similar to those described above to obtain a decoded signal.

Figure 10:
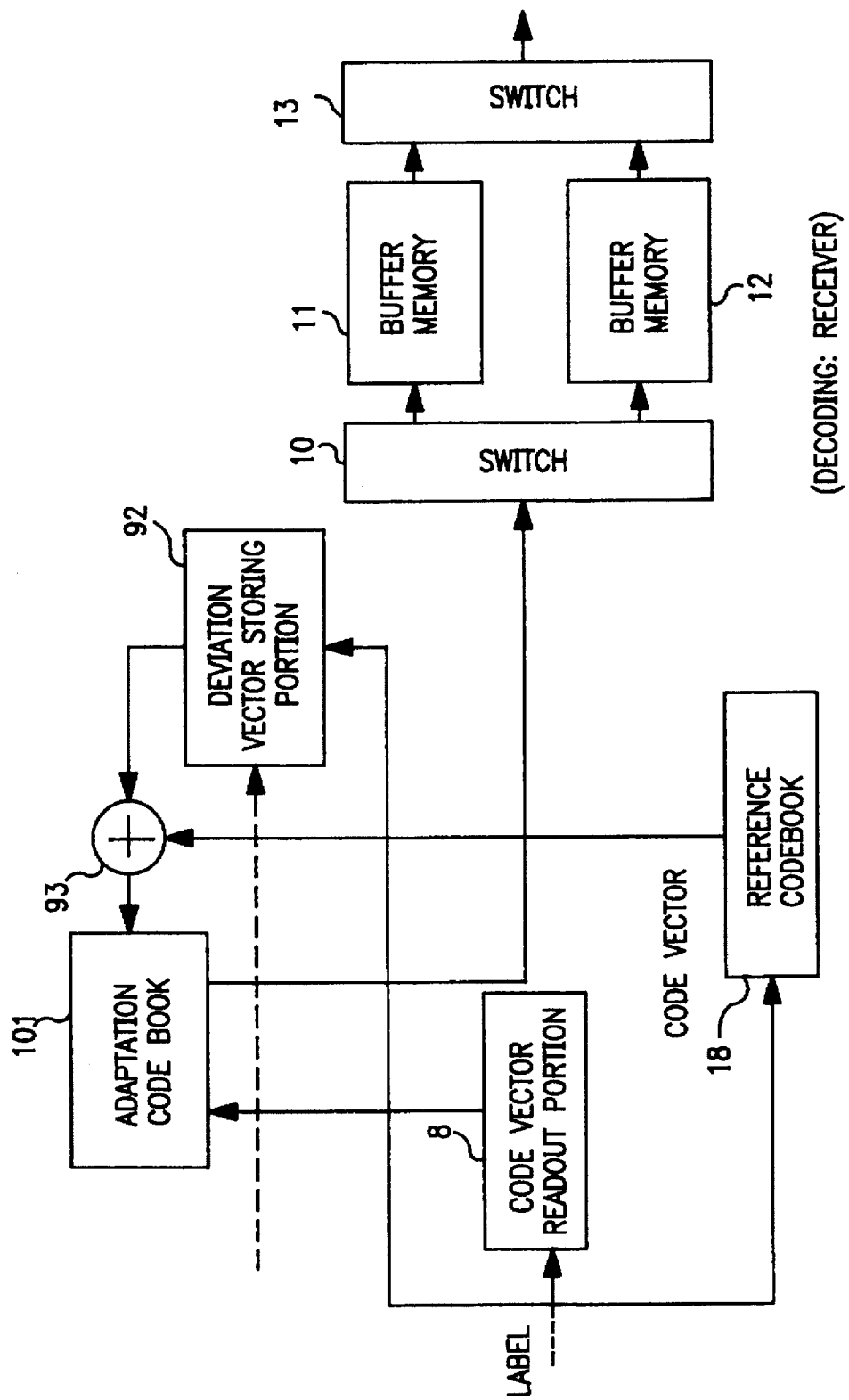
FIG. 10 shows an embodiment of a receiver for the transmitter in FIG. 7 and FIG. 8.

FIG. 10 shows a case wherein an adaptation codebook 101 is provided. Specifically, the output of the adder 93 which is the sum of the contents of the deviation vector 92 and the contents of the reference codebook is calculated for all the code vectors and is stored in the adaptation codebook in advance, and this adaptation codebook is used instead of the codebook 9 in FIG. 1.

Figure 11:
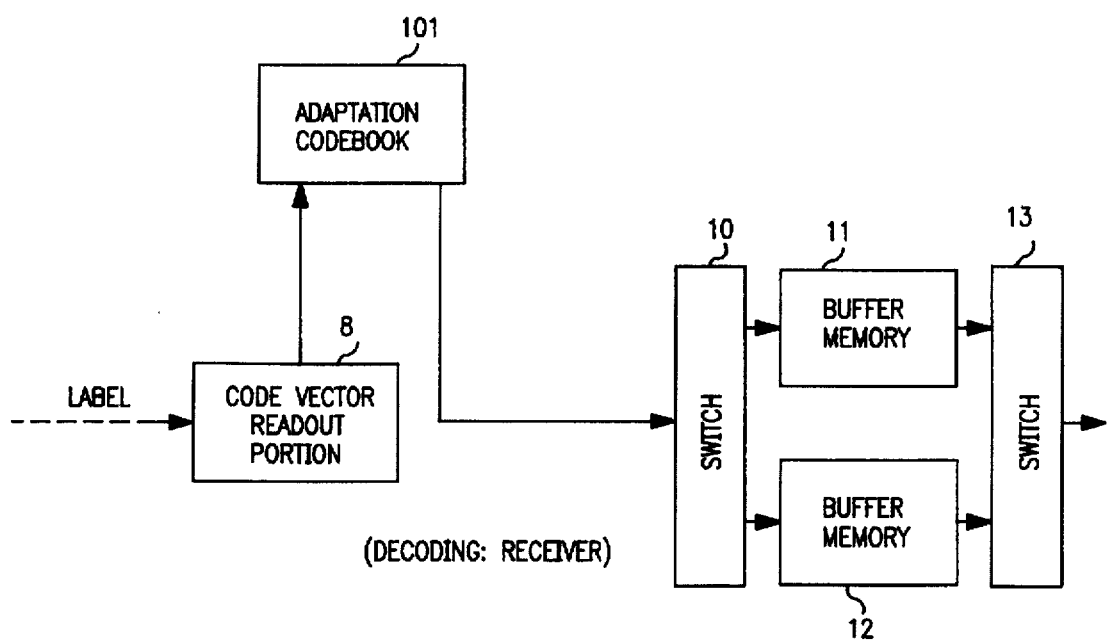
FIG. 11 shows another embodiment of a receiver for the transmitter in FIG. 8.

FIG. 11 shows a case wherein a codebook itself rather than deviation vectors is transmitted from the transmitter in advance. Specifically, the contents of an adaptation codebook created by a transmitter such as that shown in FIG. 8 are transmitted to a codebook 111 and stored therein. It goes without saying that this codebook 81 corresponds to the codebook 9 in FIG. 1.

Figure 12:
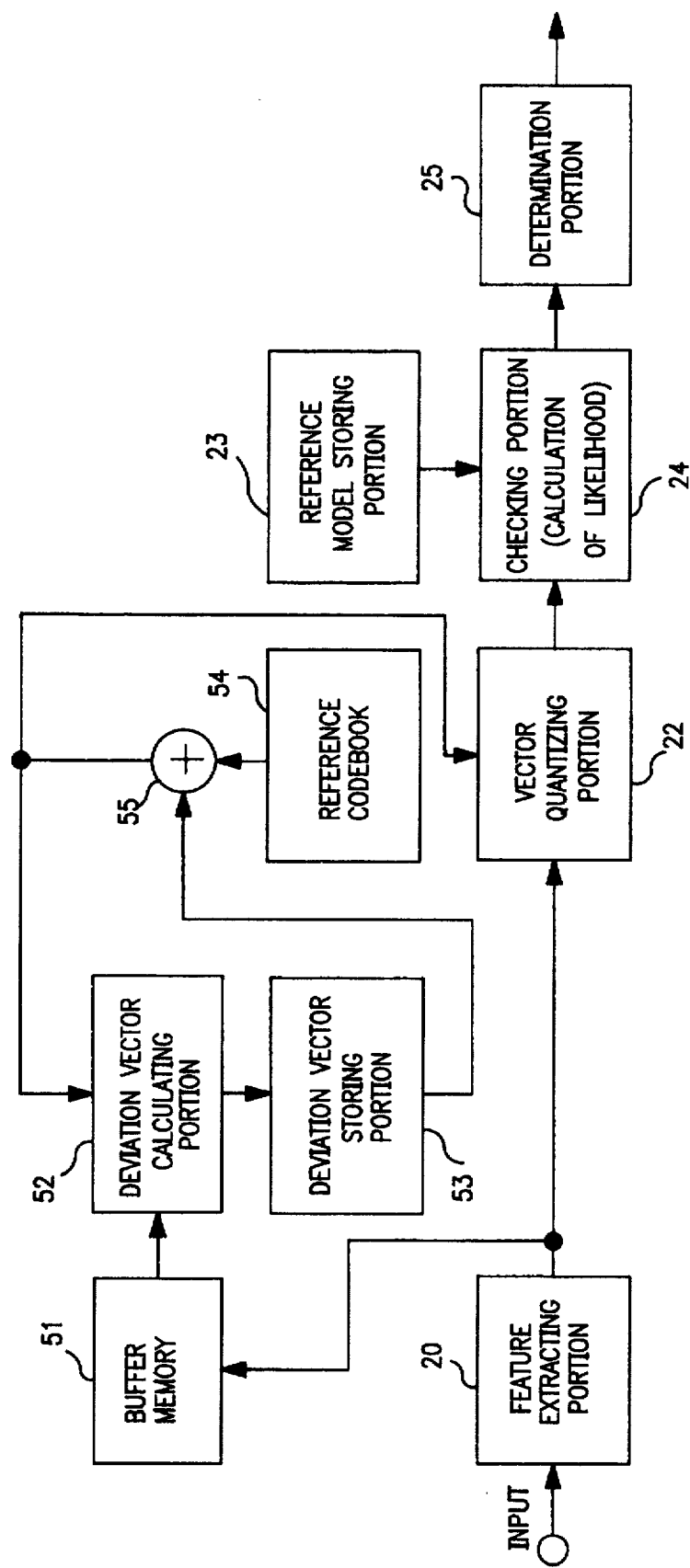
FIG. 12 is a block diagram of a pattern recognition device based on vector quantization according to the principle illustrated in FIG. 5.
Figure 13:
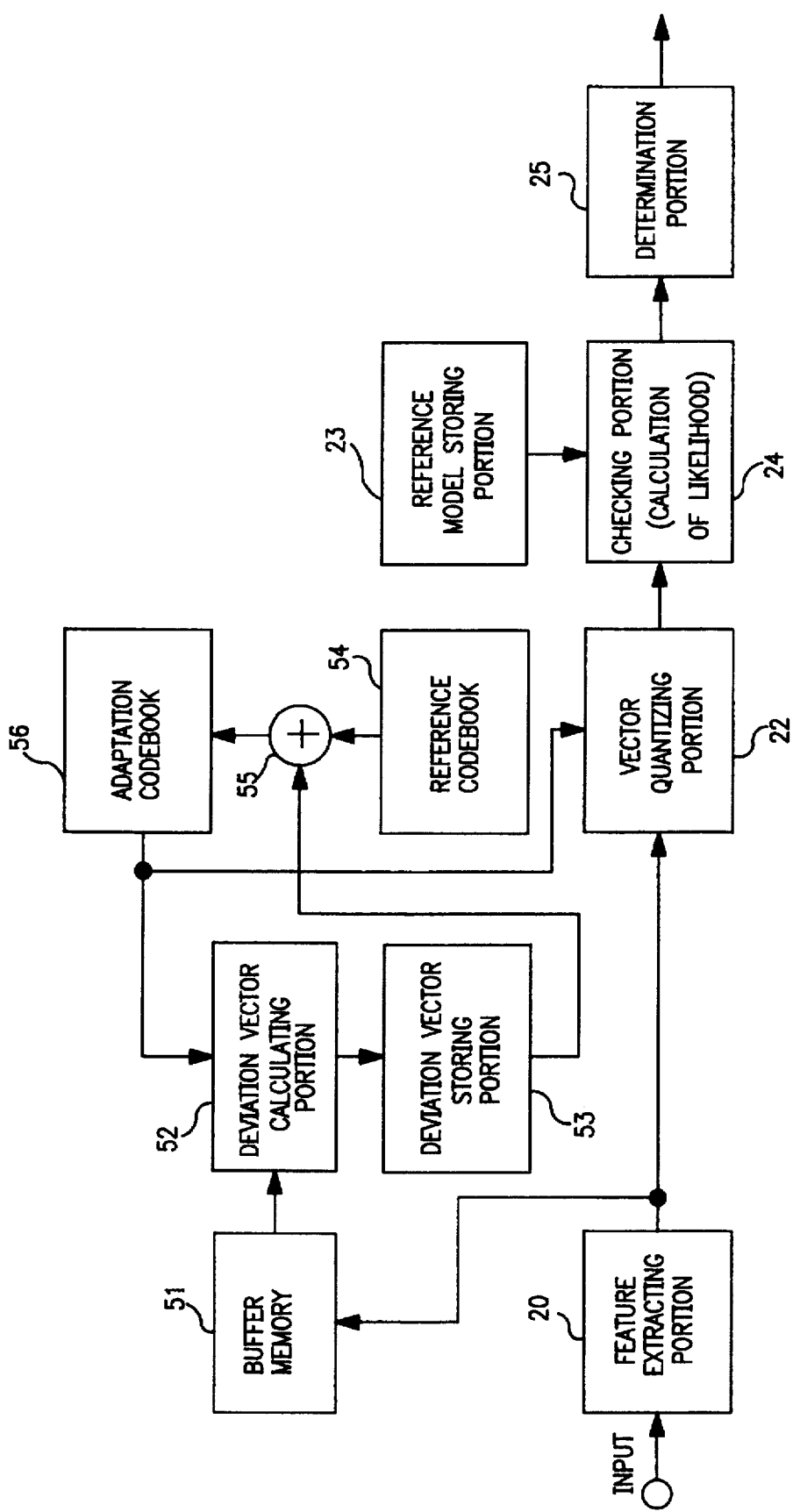
FIG. 13 is a block diagram of a pattern recognition device based on vector quantization according to the principle illustrated in FIG. 6.

FIG. 12 and FIG. 13 show embodiments wherein the methods for speaker adaptation as described above are applied to voice recognition.

Figure 2:
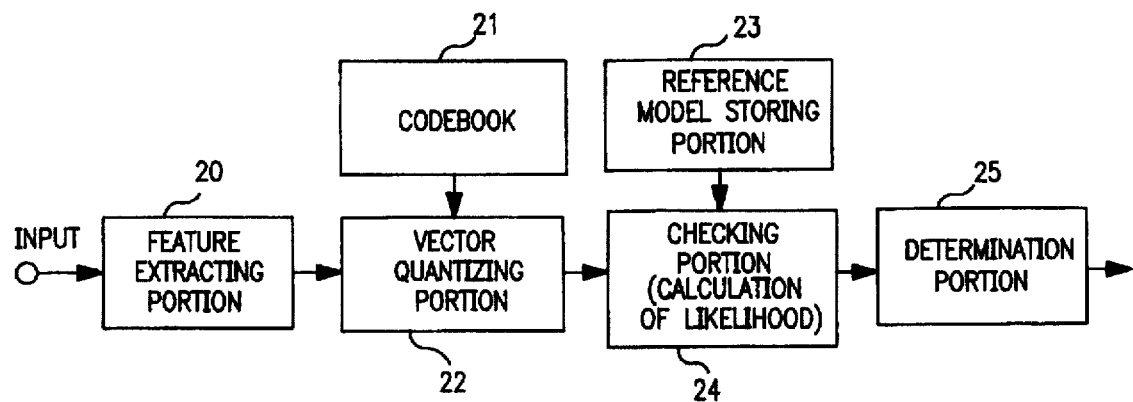
FIG. 2 illustrates the general principle of a speech recognition device based on vector quantization.
Figure 3:
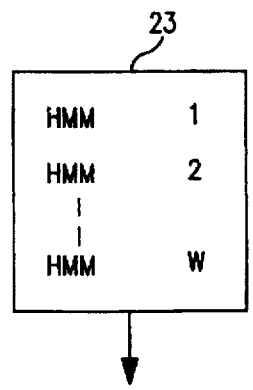
FIG. 3 illustrates the details of the reference model storing portion in FIG. 2.
Figure 4:
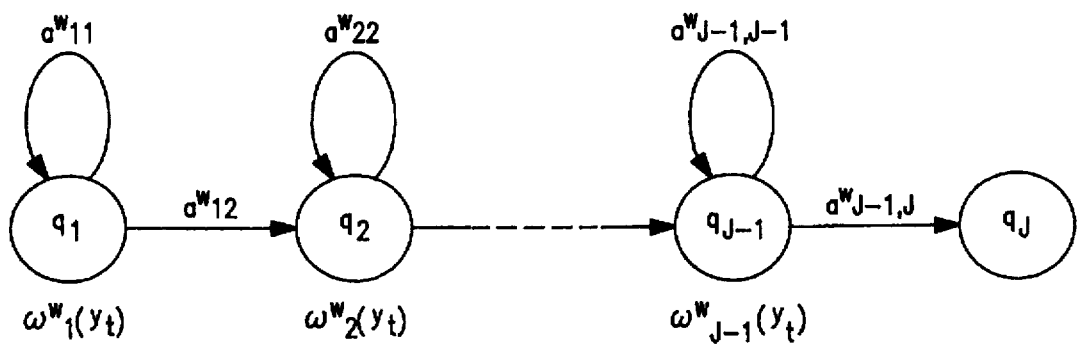
FIG. 4 illustrates the principle of an HMM (Hidden Markov Model).

FIG. 12 shows an application of the method shown in FIG. 5 wherein the components 51 through 55 perform functions similar to those in FIG. 5. Therefore, after speaker adaptation is carried out, the output of the adder 55 is used instead of the codebook 21 in FIG. 2.

FIG. 13 shows an application of the method shown in FIG. 6 wherein the components 51 through 56 perform functions similar to those in FIG. 6. Therefore, after speaker adaptation is carried out, the output of the adaptation codebook 56 is used instead of the codebook 21 in FIG. 2.

Another embodiment of the present invention will now be described.

The calculation of sum of products or accumulation in a calculation formula to obtain the rate of the occurrence of a series of feature vectors is limited to integral numbers from 1 to M which is equal to the codebook size. In order to reduce the amount of calculation, small numbers are used in most cases. In the present embodiment, the range of limitation is represented by a character K.

Figure 18:
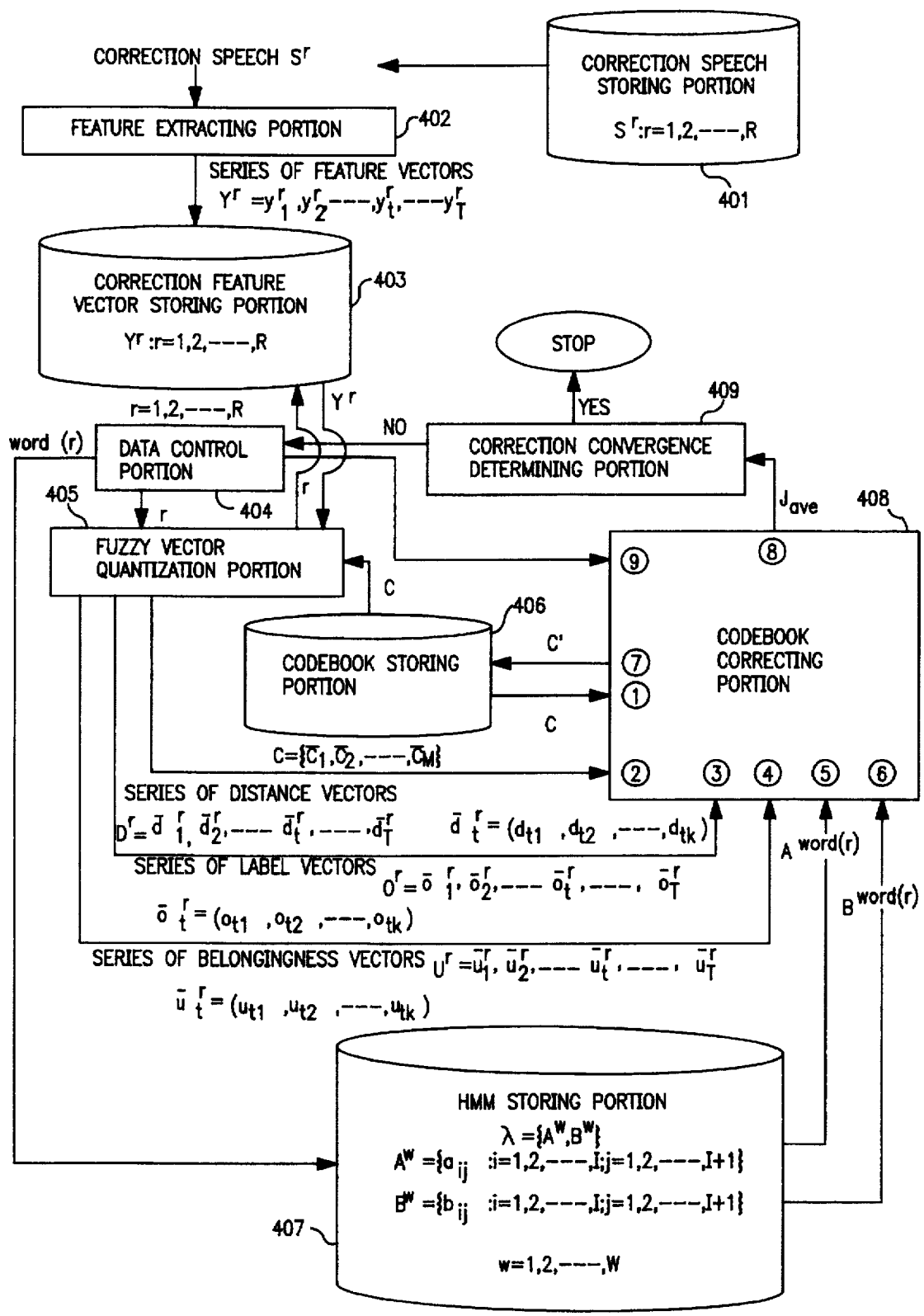
FIG. 18 is a block diagram illustrating an embodiment of a codebook correcting device according to the present invention.

FIG. 18 is a block diagram schematically illustrating a codebook correcting device according to the present invention.

401 designates a correction speech storing portion which stores R (r=1~R) utterances of known speech $S^r$ (hereinafter referred to as correction speech) (the contents of the speech is known to the codebook correcting device in advance) of a speaker (hereinafter referred to as speaker for correction) for whom the reference codebook (hereinafter also simply referred to as codebook) is to be corrected, i.e., the speaker who uses the speech recognition. The speech is used for subsequent correction of a codebook. These correction speech may be any word or sentence as its contents are known.

402 designates a feature extracting portion which converts the correction speech $S^r$ into a series of feature vectors $Y^r = y_1^r, y_2^r, \ldots, y_t^r, \ldots, y_{T^r}^r$ at constant intervals. $T^r$ represents the number of frames of data when the correction Speech $S^r$ are converted into a series of feature vectors.

403 designates a correction feature vector storing portion which stores the series of feature vectors $Y^r$ obtained by the feature-extracting r (r=1~R) utterances of the correction speech $S^r$ stored in the correction speech storing portion 401 using the feature extracting portion 402.

404 designates a data control portion which controls the following process based on determination on which utterance (r) among the R utterances is currently treated and what is the contents of the r-th utterance. In the following description, the term "word(r)" means the contents of the r-th utterance (the number w of the HMM of the contents of utterance).

405 designates a fuzzy vector quantization portion which reads the series of feature vectors $Y^r$ from the correction feature vector storing portion 403 using an utterance number r sent by the data control portion 404, replaces feature vectors $y_t^r$ at various points in time t with labels of the first to K-th orders in the order of increasing distances $d^r(t, m)$ to code vectors $C_1$–$C_M$ stored in a code book storing portion 406 to be described later and with membership values of the feature vectors $y_t$ for the respective code vectors retrieved with the set of labels for the feature vectors $y_t$ to convert them into distance vectors $d_t^r = (d_{t1}, d_{t2}, \ldots,$ label vectors $o_t^r = (o_{t1}, o_{t2}, \ldots o_{tK})$, and membership vectors $u_t^r = (u_{t1}, u_{t2}, \ldots, u_{tK})$, and converts the series $Y^r$ of the feature vectors $y_t^r$ into a series of distance vectors $D^r = d_1^r, d_2^r, \ldots, d_T^r$, a series of label vectors $O^r = o_1^r, o_2^r, \ldots, o_T^r$, and a series of membership vectors $U^r = u_1^r, u_2^r, \ldots, u_T^r$.

406 designates a codebook storing portion for storing code vectors $C_m$ so that they can be retrieved using labels m given thereto, the code vectors being used by the fuzzy vector quantizing portion 405 for vector quantization.

407 designates an HMM storing portion which stores HMMs created in advance in the number W of the words to be recognized, a state transition probability matrix A and a label occurrence probability matrix B being stored for each word to be recognized. Therefore, HMM $\lambda^w$ in the w-th place is expressed by $\lambda^w = \{A^w, B^w\}$.

408 designates a codebook correcting portion which corrects the values of the code vectors $C_m$ in the codebook storing portion 406 using the correction speech and probabilities of the HMMs being in certain states in certain points in time (path probabilities) calculated from the HMMs corresponding to the contents of the correction speech stored in the HMM storing portion 407 to minimize the distortion of the quantization error of the series of feature vectors weighted by the path probabilities relative to the codebook and transfers new code vectors $C'_m$ obtained as a result of the correction to the codebook storing portion 406.

409 designates a correction convergence determining portion which determines the state of convergence when the code vectors are corrected using the correction speech. It causes the correcting operation to be terminated if predetermined conditions for convergence are satisfied and, if not, it causes the correction of the code vectors to be repeated until the conditions are satisfied.

The present invention is characterized by the configuration of the codebook correcting portion 408 wherein, provided that the contents of speech are known, the code vectors are corrected using path probabilities calculated from the HMMs corresponding to the contents of the speech to minimize the distortion of the quantization error of the series of feature vectors weighted by the path probabilities relative to the codebook.

Figure 19:
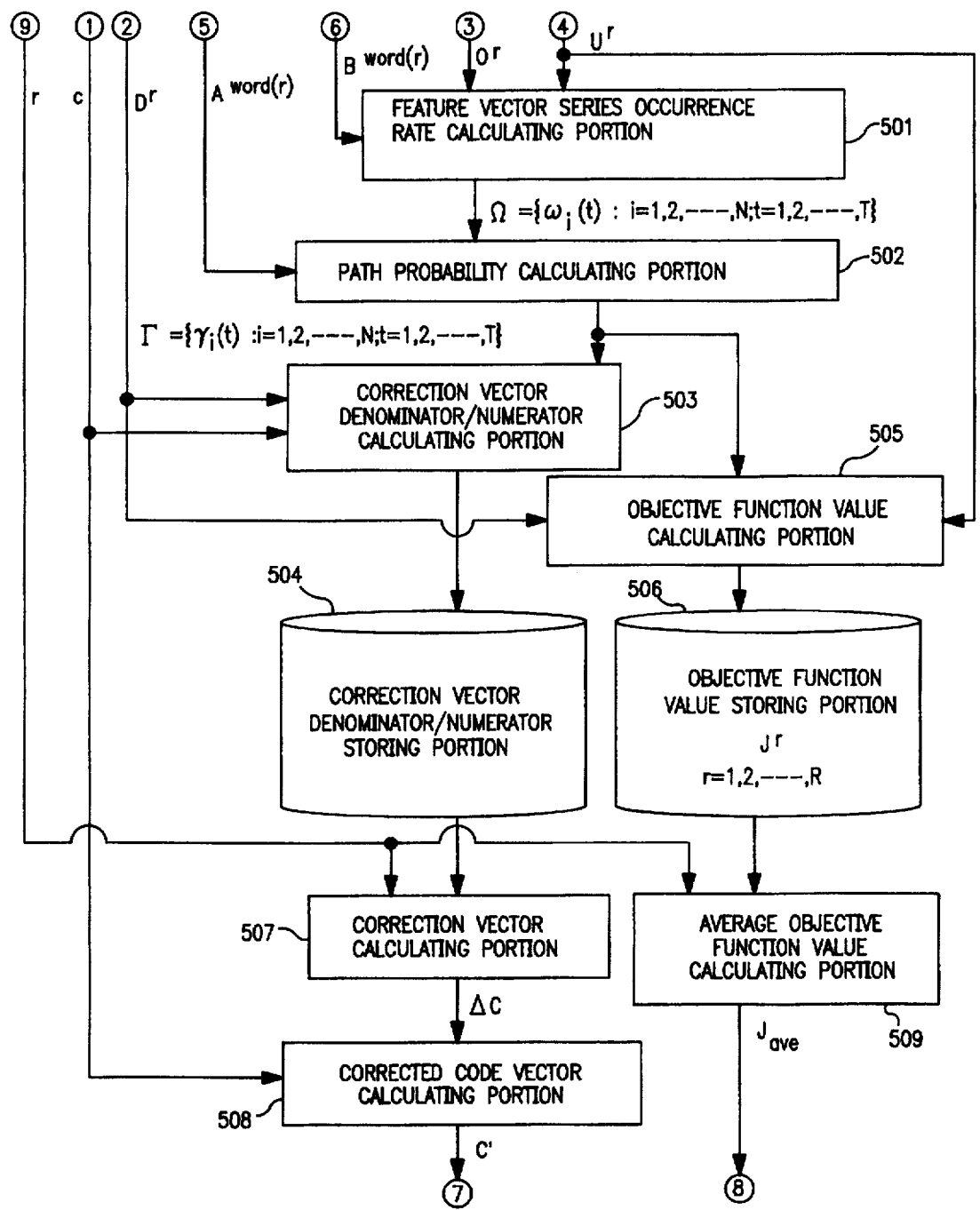
FIG. 19 is a block diagram illustrating an embodiment of a codebook correcting portion which is a major part of a codebook correcting device according to the present invention.
Figure 20:
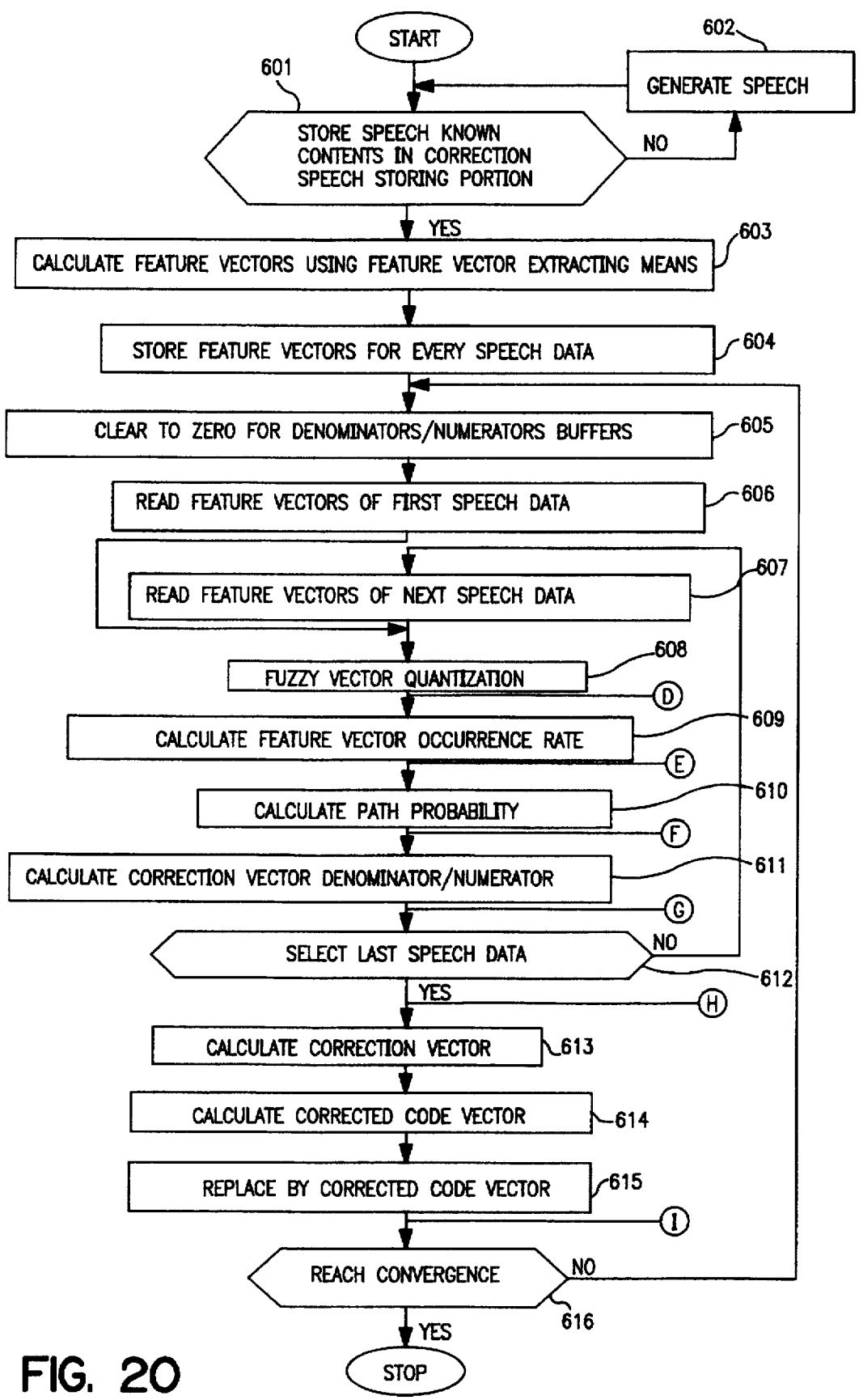
FIG. 20 is flow chart illustrating the operation of the present invention.

FIG. 19 is a block diagram showing a specific configuration of the codebook correcting portion.

Terminals 1 through 9 are connected to the components in FIG. 18. The terminals 1 and 7 are connected to the codebook storing portion 406. The terminal 1 receives the codebook C, and the terminal 7 transmits the corrected codebook C'. The terminal 5 and 6 are connected to the HMM storing portion 407. The terminal 5 receives the state transition probability matrix $A^{word(r)}$ of the HMM corresponding to the r-th word. The terminal 6 receives the label occurrence probability matrix $B^{word(r)}$ of the same. The terminals 2, 3, and 4 are connected to the fuzzy vector quantizing portion 405 to receive the series of distance vectors $D^r$, series of label vectors $O^r$, and series of membership vectors $U^r$ for the r-th word. The terminal 8 is connected to the correction convergence determining portion 409 and transmits an average objective function value J to be used for the determination of convergence to it. Needless to say, this value may be obtained by adding various objective functions instead of averaging them. The terminal 9 is connected to the data control portion 404 to receive information on the place (r) where the current correction speech data exists and to calculate a correction vector C and the average objective function value J when r=R.

The codebook correcting portion 408, i.e., FIG. 19, operates with the information as described above exchanged.

501 designates a feature vector series occurrence rate calculating portion which calculates the rate of the occurrence of a feature vector $\omega_i(t)$ for every point in time t and every state i of the HMMs from the membership value and label occurrence probability based on the series of distance vectors, series of label vectors, series of membership vectors, and label occurrence probability matrix received at the terminals 2, 3, 4, and 6 to obtain a feature vector occurrence rate matrix $\Omega$.

502 designates a path probability calculating portion which calculates path probability $\gamma_i(t)$ which is the probability of HMM being in a certain state i at a certain point in time t is calculated for every point in time t and every state i to obtain a path probability matrix.

503 designates a correction vector denominator/numerator calculating portion which calculates the denominator and numerator of a correction vector estimation equation.

504 designates a correction vector denominator/numerator storing portion which stores the denominators and numerators for a correction vector calculation formula calculated by the correction vector denominator/numerator calculating portion 503 for use in a correction vector calculating portion to be described later.

505 designates an objective function value calculating portion which calculates objective function values $J^r$ to be used for the determination of convergence using the path probabilities $\gamma_i(t)$, membership vectors $u_t^r$, and distance vectors $d_t^r$ as described above according to Equation 35.

$$J^r = \sum_{t=1}^{T^r} \sum_{i=1}^{I} \gamma_i(t) \sum_{k=1}^{K} u_{to_k}^F \cdot d_{to_k}$$ Equation 35

506 designates an objective function value storing portion which stores the objective function values $J^r$ received from the objective function value calculating portion 505 in a quantity R which corresponds to the total number of the words for correction. It goes without saying that it may accumulate those values instead of storing them.

After the operations as described above are carried out on the R correction words (the terminal 8 signals "R"), the following operations will be performed.

507 designates a correction vector calculating portion which obtains a set of correction vectors $\Delta C$ from the denominators and numerators for correction vectors stored in the correction vector denominator/numerator storing portion 504 according to the correction vector calculation formula.

508 designates a corrected code vector calculating portion which calculates the code vector values of the corrected codebook C' using the code vector values of the uncorrected codebook C received from the terminal 1 and the set of correction vectors $\Delta C$ obtained by the correction vector calculating portion 507 and transmits them to the code vector storing portion 406 through the terminal 7.

509 designates an average objective function value calculating portion which obtains an average objective function value $J_{ave}$ by averaging all the objective function values and transmits it to the correction convergence determining portion 409 through the terminal 8.

The configuration of the codebook correcting portion according to the present invention is as follows. Generally speaking, this configuration may be used according to two methods. One is a method wherein correction vectors for correcting the code vectors of the codebook are obtained separately for individual clusters. The other is a method wherein a common correction vectors for all the clusters is obtained.

The former case wherein correction vectors are separately obtained for individual clusters will be described with reference to the flow chart shown in FIGS. 20 through 23 which illustrates the execution of the codebook correcting operation.

At Step 601, it is checked whether speech $S^r$ the contents of which are known of a speaker for correction is stored in the correction speech storing portion 401. If yes, the process proceeds to the next step and, if not, the correction speech is stored as indicated by 602. Step 603 corresponds to converting the correction speech $S^r$ into feature vectors $Y^r$ using a well-known feature vector extracting means at the feature extracting portion 402 and is carried out for r=1~R utterances of the correction speech. The feature vectors obtained are stored in the correction feature vector storing portion 403 as indicated by 604.

The following operation is repeated until it is determined that the correction has reached convergence. First, buffers for the denominators and numerators for the correction vectors are cleared to zero at Step 605 in preparation for subsequent steps. At Step 606 or 607, the series of feature vectors $Y^r$ in the correction speech data is read and, at step 608, the fuzzy vector quantizing portion 405 and the code vector storing portion 406 perform vector quantization according to a well-known method to calculate the series of membership vectors $U^r$ and the series of label vectors $O^r$.

Figure 21:
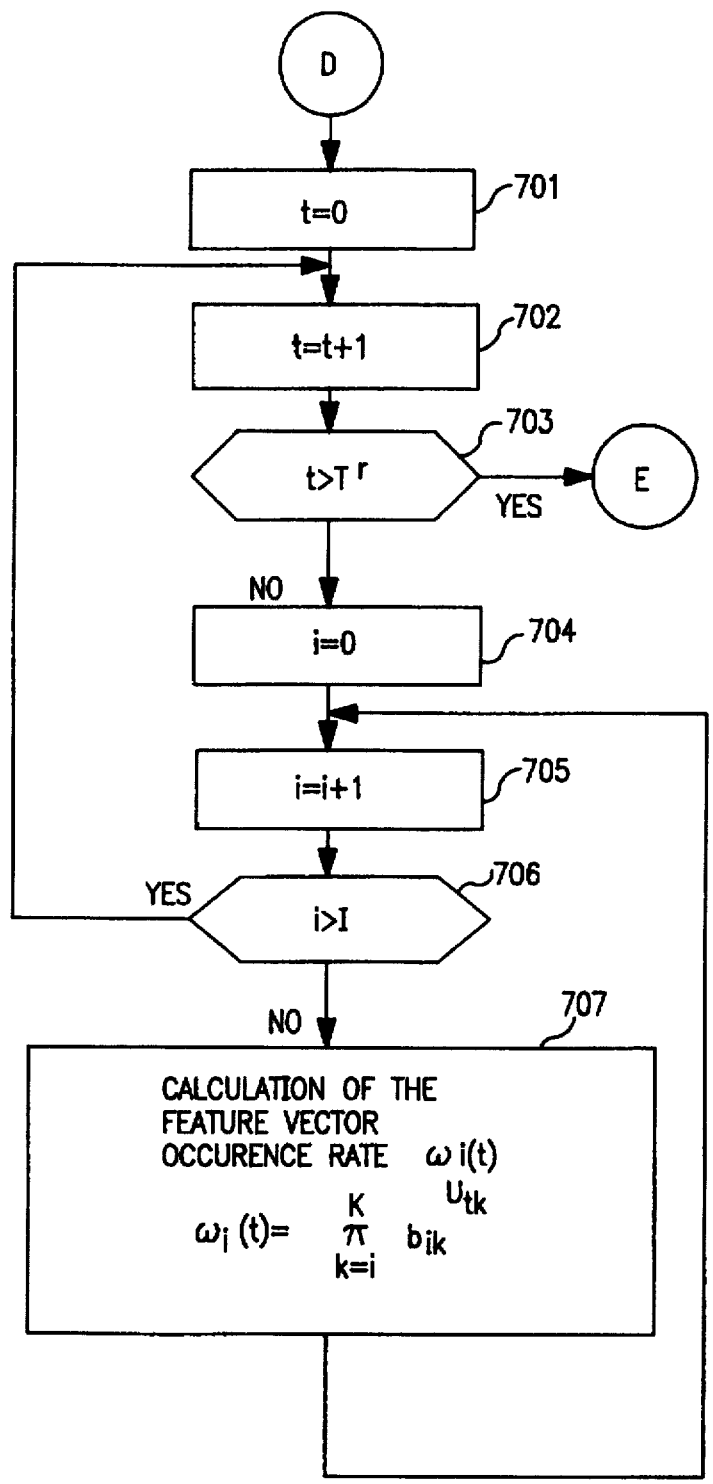
FIG. 21 is a flow chart illustrating the operation in the case that the occurrence rate calculating formula in FIG. 20 is represented by Equation 4.

At Step 609, i.e., in FIG. 21, the calculation of the feature vector occurrence rate ₍(t) in the feature vector series occurrence rate calculating portion 501 is carried out at Step 707 for t=1~T$^r$ and i=1~I according to a calculation formula (Equation 36).

$$\omega_i(t) = \prod_{k=1}^{K} b_{lo_{tk}}^{u_{to_{tk}}} \text{ or } \log \omega_i(t) = \sum_{k=1}^{K} u_{to_{tk}} \cdot \log b_{lo_{tk}} \quad \text{Equation 36}$$

or $$\omega_i(t) = \sum_{k=1}^{K} b_{lo_{tk}} \cdot u_{to_{tk}}$$

At Step 610, the path probability calculating portion 502 calculates the path probabilities $\gamma_i(t)$ using the well-known forward/backward algorithm. As well known in the art, the Viterbi algorithm in which only the optimum path is considered may be used instead.

Figure 22:
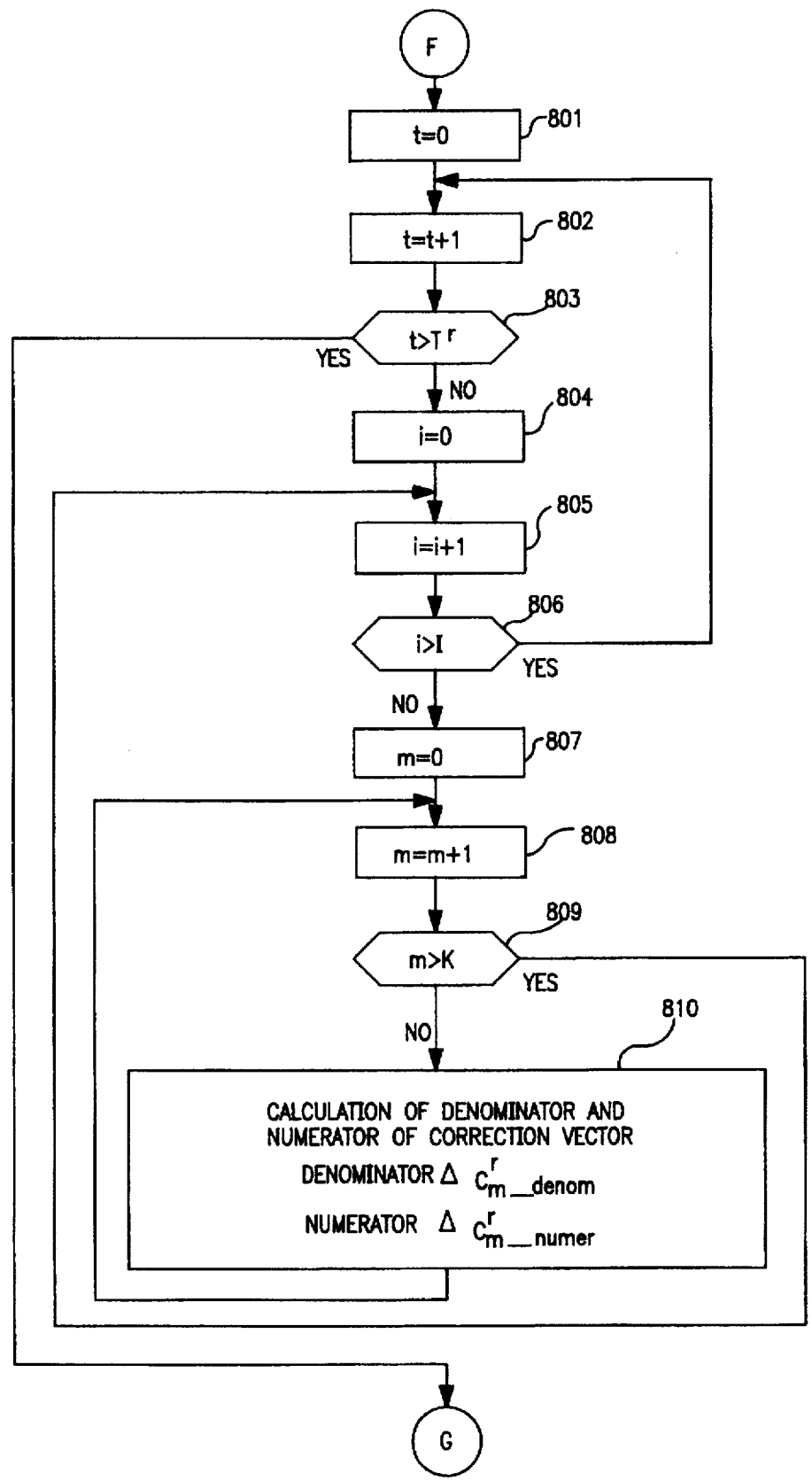
FIG. 22 is a flow chart illustrating the operation of calculating the denominator and numerator of a correction vector in a case wherein the correction vector in FIG. 20 is obtained for each cluster.
Figure 23:
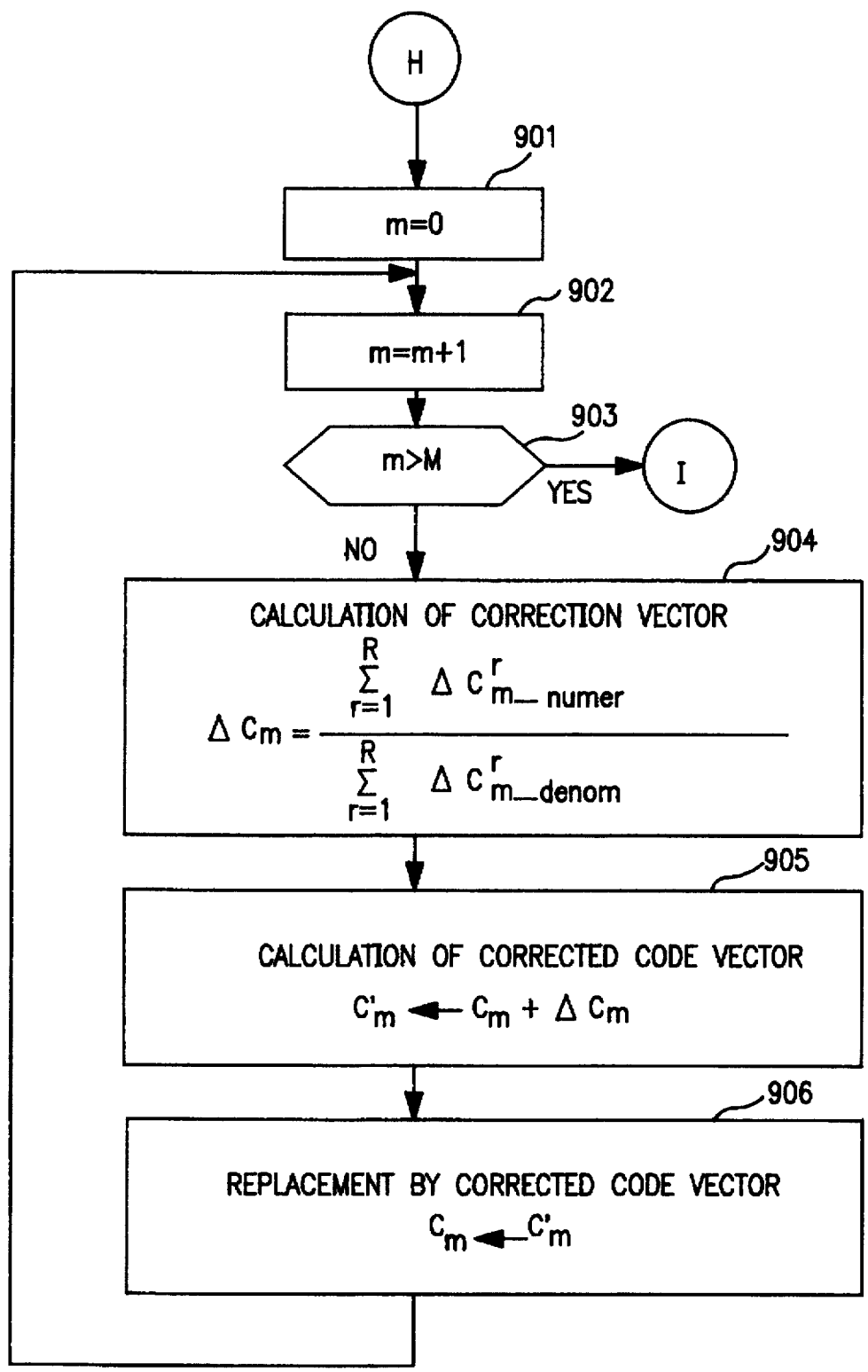
FIG. 23 is a flow chart illustrating the operation in a case wherein the correction vector in FIG. 20 is got for each cluster.

At Step 611, i.e., in FIG. 22, the operation of the correction vector denominator/numerator calculating portion 503 is repeated for all the code vectors Cm (m=1~M) until the frame length Tr of the r-th series of feature vectors Yr ends at Step 803 and the number of the states I of the HMM corresponding to the contents of the r-th utterance is counted up at Step 806 (the condition at Step 809 is satisfied). At step 810, the denominator and numerator for the correction vector calculation formula are calculated using Equation 37 for the denominator and Equation 38 for the numerator. The Equations 37 and 38 are equations to obtain the denominator and numerator of a correction vector calculation formula (Equation 39) for each of the labels m.

$$\Delta C_m^r\_\text{demon} = \sum_{t=1}^{T^r} \sum_{i=1}^{I} \gamma_i(t) u_{im}^F d_{im}^r \quad \text{Equation 37}$$

$$\Delta C_m^r\_\text{numer} = \sum_{t=1}^{T^r} \sum_{i=1}^{I} \gamma_i(t) \cdot u_{im}^F \quad \text{Equation 38}$$

$$\Delta \overline{C}_m = \frac{\sum_{r=1}^{R} \sum_{t=1}^{T^r} \sum_{i=1}^{I} \gamma_i(t) u_{im}^F d_{im}^r}{\sum_{r=1}^{R} \sum_{t=1}^{T^r} \sum_{i=1}^{I} \gamma_i(t) u_{im}^F} \quad \text{Equation 39}$$

$\Delta C_m^r\_\text{denom}$ and $\Delta C_m^r\_\text{number}$ respectively represent the denominator and numerator of a calculation formula to obtain a correction vector $\Delta C_m$ for m-th cluster of the r-th word.

When all the frame lengths Tr and the numbers I have ended (the conditions at Steps 806 and 803 have been satisfied), the calculations of this part are terminated.

The operations at Steps 608 through 611 are repeated until it is determined at Step 612 that the last series of feature vectors Y$^R$ has been selected, i.e., for the entire series of feature vectors Y$^r$ (r=1~R), to calculate the denominator and numerator of the correction vector calculation formula for each of the code vectors for the entire correction speech. Then, at Steps 613 through 615, i.e., in FIG. 9, the set of correction vectors $\Delta C = \Delta C_1, C_2, \ldots, \Delta C_M$ and the corrected codebook C'={C$_1$', C$_2$', C$_M$'} are calculated As indicated by 903, the correction vector $\Delta C_m$ for each cluster is obtained according to Equation 40 at Step 613, i.e., Step 904, using the denominator and numerator of the correction vector calculation formula.

$$\Delta \overline{C} = \frac{\sum_{r=1}^{R} \Delta C^r\_\text{numer}}{\sum_{r=1}^{R} \Delta C^r\_\text{denom}} \quad \text{Equation 40}$$

Once the set of correction vectors $\Delta C$ is obtained, it is added to the code vectors of the uncorrected codebook C (614, i.e., 905) which is then replaced by the corrected codebook C' as a new codebook C (615, i.e., 906).

It is determined at Step 616 whether the correction has reached convergence against a predetermined condition for convergence. If yes, the process is terminated and the codebook available at that time is use as the codebook for the speaker. If it is determined that convergence has not been reached, the process returns to Step 605 to be repeated until convergence is achieved.

Now, the latter case wherein a common correction vector is obtained for all clusters will be described with reference to the flow chart shown in FIGS. 20, 21, 24, and 25 which illustrates the execution of the codebook correcting operation.

At Step 601, it is checked whether speech S$^r$ the contents of which are known of a speaker for correction is stored in the correction speech storing portion 401. If yes, the process proceeds to the next step and, if not, the correction speech is stored as indicated by 602. Step 603 corresponds to converting the correction speech S$^r$ into feature vectors Y$^r$ using a well-known feature vector extracting means at the feature extracting portion 402 and is carried out for r=1~R utterances of the correction speech. The feature vectors obtained are stored in the correction feature vector storing portion 403 as indicated by 604.

The following operation is repeated until it is determined that the correction has reached convergence. First, buffers for the denominators and numerators for the correction vectors are cleared to zero at Step 605 in preparation for subsequent steps. At Step 606 or 607, the series of feature vectors Y$^r$ in the correction speech data is read and, at Step 608, the fuzzy vector quantizing portion 405 and the code vector storing portion 406 perform vector quantization according to a well-known method to calculate the series of distance vectors Dr, the series of membership vectors U$^r$, and the series of label vectors O$^r$.

At Step 609, i.e., in FIG. 21, the calculation of the feature vector occurrence rate $\omega_i(t)$ in the feature vector series occurrence rate calculating portion 501 is carried out at Step 707 for t=1~T$^r$ and i=1~I according to the above-described calculation formula (Equation 36).

At Step 610, the path probability calculating portion 502 calculates the path probabilities $\gamma_i(t)$ using the well-known forward/backward algorithm. As well known in the art, the Viterbi algorithm in which only the optimum path is considered may be used instead.

Figure 24:
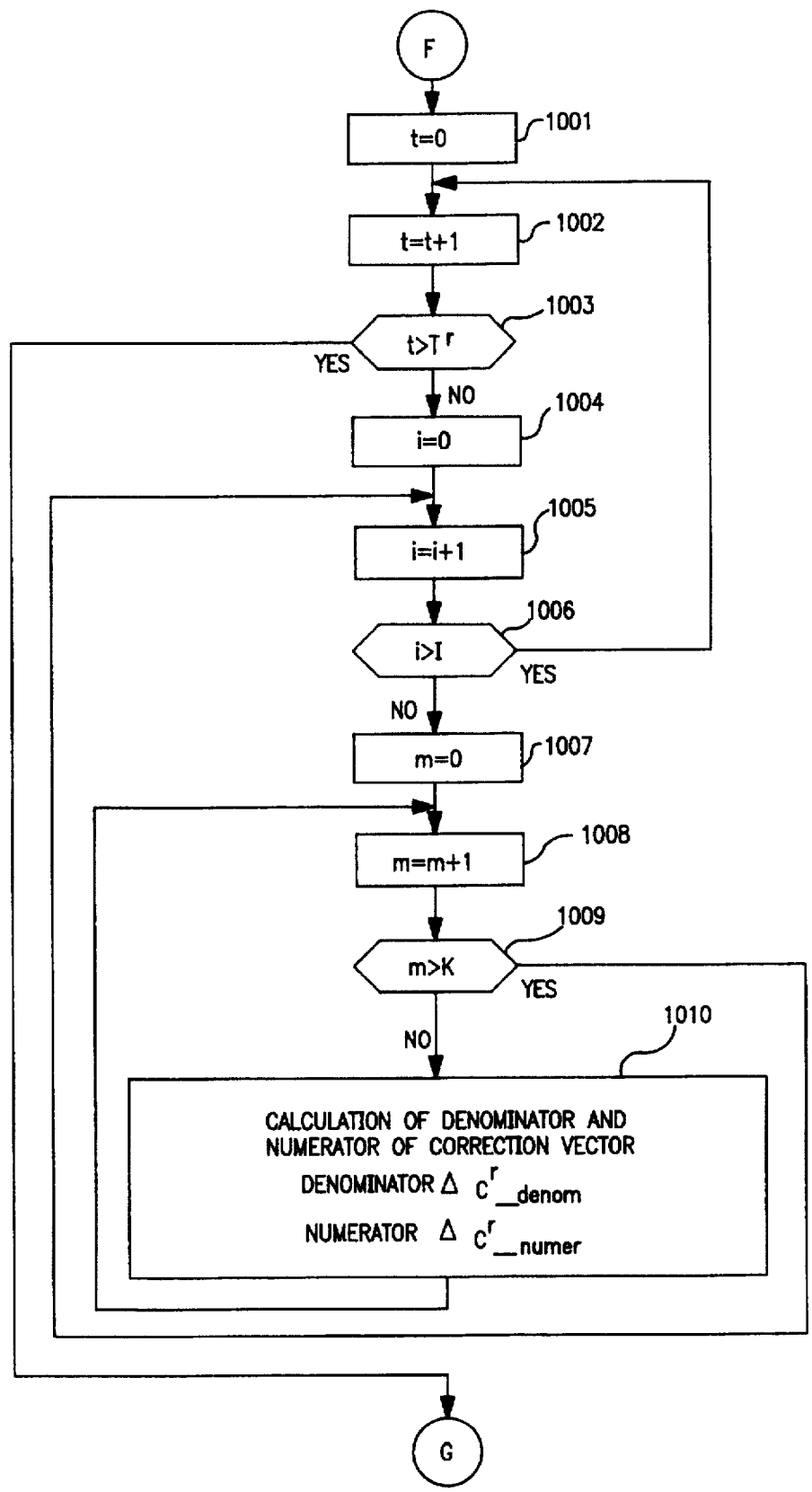
FIG. 24 is a flow chart illustrating the operation of calculating the denominator and numerator of a correction vector in a case wherein the correction vector in FIG. 20 is obtained to be used commonly for all clusters.
Figure 25:
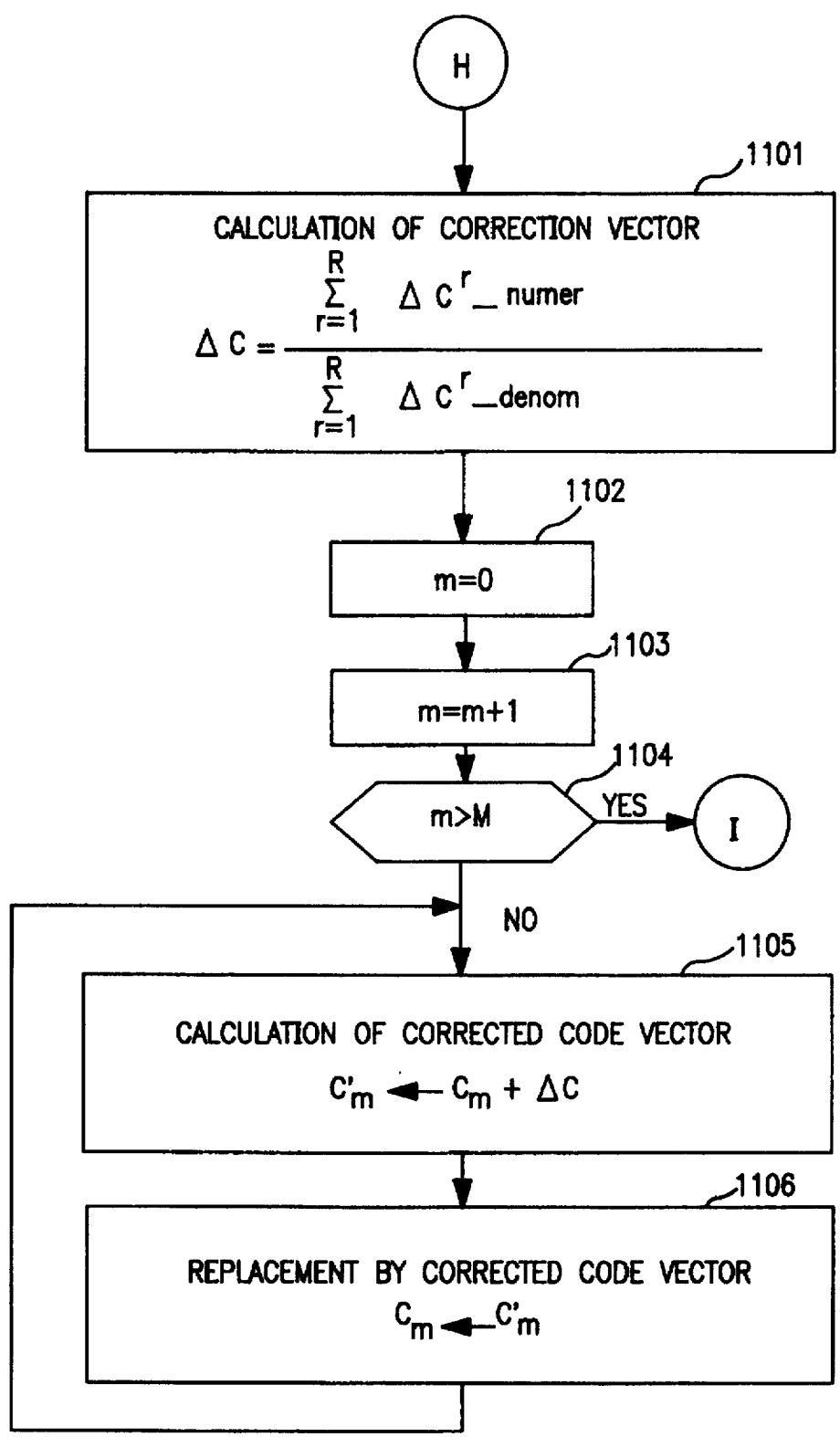
FIG. 25 is a flow chart illustrating the operation in a case wherein the correction vector in FIG. 20 is obtained to be used commonly for all clusters.

At Step 611, i.e., in FIG. 24, the operation of the correction vector denominator/numerator calculating portion 503 is repeated for all the code vectors Cm (m=1~M) until the frame length Tr of the r-th series of feature vectors Yr ends at Step 1003 and the number of the states of the HMM corresponding to the contents of the r-th utterance is counted up at Step 1006 (the condition at Step 1009 is satisfied). At step 1010, the denominator and numerator for the correction vector calculation formula are calculated using Equation 31 for the denominator and Equation 42 for the numerator. The Equations 41 and 42 are equations to obtain the denominator and numerator of a calculation formula (Equation 43) to obtain a common correction vector for all labels.

$$AC^r\_denom = \sum_{t=1}^{Tr} \sum_{i=1}^{I} \gamma_i(t) \sum_{k=1}^{K} u^F_{to_k} d_{to_k} \quad \text{Equation 41}$$

$$AC^r\_numer = \sum_{t=1}^{Tr} \sum_{i=1}^{I} \gamma_i(t) \sum_{k=1}^{K} u^F_{to_k} \quad \text{Equation 42}$$

$$\overline{\Delta C} = \frac{\sum_{t=1}^{Tr} \sum_{i=1}^{I} \gamma_i(t) \sum_{k=1}^{K} u^F_{to_k} d_{to_k}}{\sum_{t=1}^{Tr} \sum_{i=1}^{I} \gamma_i(t) \sum_{k=1}^{K} u^F_{to_k}} \quad \text{Equation 43}$$

$\Delta C^r_{m\_denom}$ and $\Delta C^r_{m\_number}$ respectively represent the denominator and numerator of a calculation formula to obtain a common correction vector $\Delta C$ for all the clusters of the r-th word.

When all the frame lengths Tr and the numbers I have ended (the conditions at Steps 1006 and 1003 have been satisfied), the calculations of this part are terminated.

The operations at Steps 608 through 611 are repeated until it is determined at Step 612 that the last series of feature vectors $Y^R$ has been selected, i.e., for the entire series of feature vectors $Y^r$ (r=1~R), to calculate the denominator and numerator of the correction vector calculation formula for the common code vector for the entire correction speech. Then, at Steps 613 through 615, i.e., in FIG. 25, the common correction vector $\Delta C$ and the corrected codebook C'={$C_1'$, $C_2'$, ... $C_M'$} are calculated.

The common correction vector $\Delta C$ for the entire clusters is obtained according to Equation 44 at Step 613, i.e., Step 1101, using the denominator and numerator of the correction vector calculation formula.

$$\overline{\Delta C_m} = \frac{\sum_{r=1}^{R} \Delta C^r_m\_numer}{\sum_{r=1}^{R} \Delta C^r_m\_denom} \quad \text{Equation 44}$$

Once the correction vector $\Delta C$ is obtained, it As added to the uncorrected codebook C (614, i.e., 1105) which is then replaced by the corrected codebook C' as a new codebook C (615, i.e., 1106).

It is determined at Step 616 whether the correction has reached convergence against a predetermined condition for convergence. If yes, the process is terminated and the codebook available at that time is used as the codebook for the speaker. If it is determined that convergence has not been reached, the process returns to Step 605 to be repeated until convergence is achieved.

In the above-described embodiment, a corrected codebook is obtained after obtaining a vector for mapping between uncorrected and corrected vectors called correction vector. It goes without saying that the code vectors of the corrected codebook can be directly obtained so that the distortion of the quantization error of the series of feature vectors weighted by the path probabilities relative to the codebook is minimized.

Speech recognition can be carried out simply by replacing the values in the codebook storing device 302 of the conventional speech recognition apparatus described earlier with the corrected codebook obtained in the above-described embodiment.

The above-mentioned point is one of the features of the present invention. The modification of a codebook is carried out so that distortion associated with quantization weighted by path probability is minimized. In the case of low path probability, i.e., if there is a part which is poorly associated with HMM, such a part is prevented from being used for adaptation.

While the description so far has been made on speaker adaptation of a codebook, the reverse of this method may be contemplated, in which speakers are adapted to a reference codebook, i.e., speaker normalization is performed. Specifically, Equation 21 is changed to:

$$J' = \sum_{i=1}^{t} \sum_{m=1}^{M} u^F_{im} d(y_i^A, \mu_m + h_m) \quad \text{Equation 33}$$

$$= \sum_{i=1}^{t} \sum_{m=1}^{M} u^F_{im} \{(y_i^A - (\mu_m + h_m)\}^T \{(y_i^A - (\mu_m + h_m)\}$$

$$= \sum_{i=1}^{t} \sum_{m=1}^{M} u^F_{im} \{(y_i^A - h_m) - \mu_m\}^T \{(y_i^A - h_m) - \mu_m\}$$

Therefore, the subtraction of hm from $y^A_i$ can be regarded as normalization of a speaker to a codebook. Equation 33 corresponds to the configuration in FIG. 5 or FIG. 6. If they are used in conjunction with the configuration in FIG. 17a and FIG. 17b, Equation 34 as shown below will be obtained from Equation 33.

$$J'' = \sum_{i=1}^{t} \sum_{m=1}^{M} u^F_{im} d(y_i^A + h_m, \mu_m) \quad \text{Equation 34}$$

$$= \sum_{i=1}^{t} \sum_{m=1}^{M} u^F_{im} \{(y_i^A + h_m) - \mu_m\}^T \{(y_i^A + h_m) - \mu_m\}$$

Figure 14:
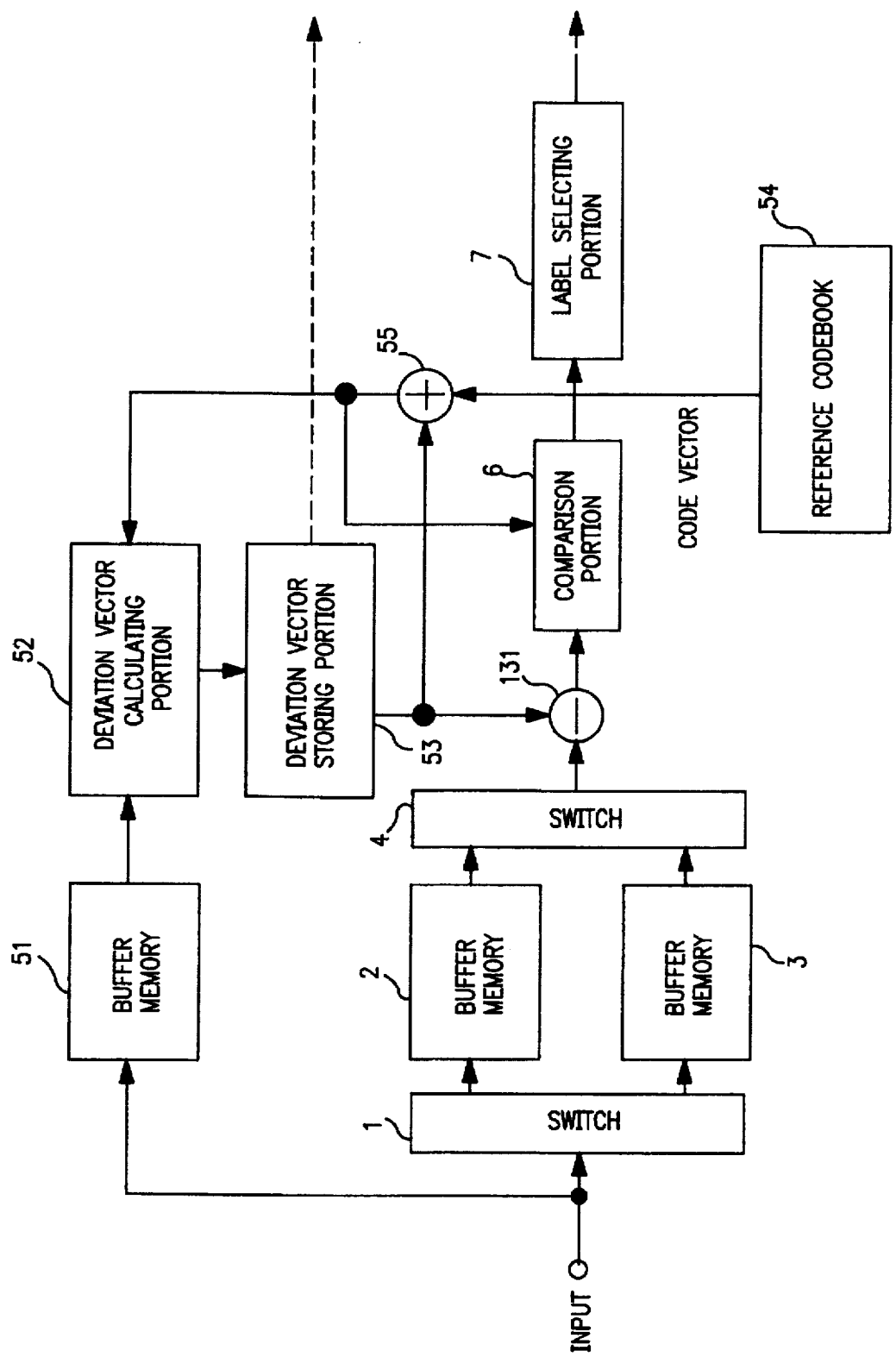
FIG. 14 illustrates an embodiment of a transmitter based on speaker normalization.

FIG. 14 shows an embodiment of a transmitter employing the communication method based on vector quantization utilizing speaker normalization according to the third embodiment of the present invention wherein the configuration in FIG. 5 or FIG. 6 is used. The components 51 through 55 perform the same operations as described above. In this case, deviation vectors learned as described above are subtracted from input vectors and vector quantization is performed using the reference codebook 54. 131 designates a subtracter which subtracts deviation vectors from input vectors.

Figure 15:
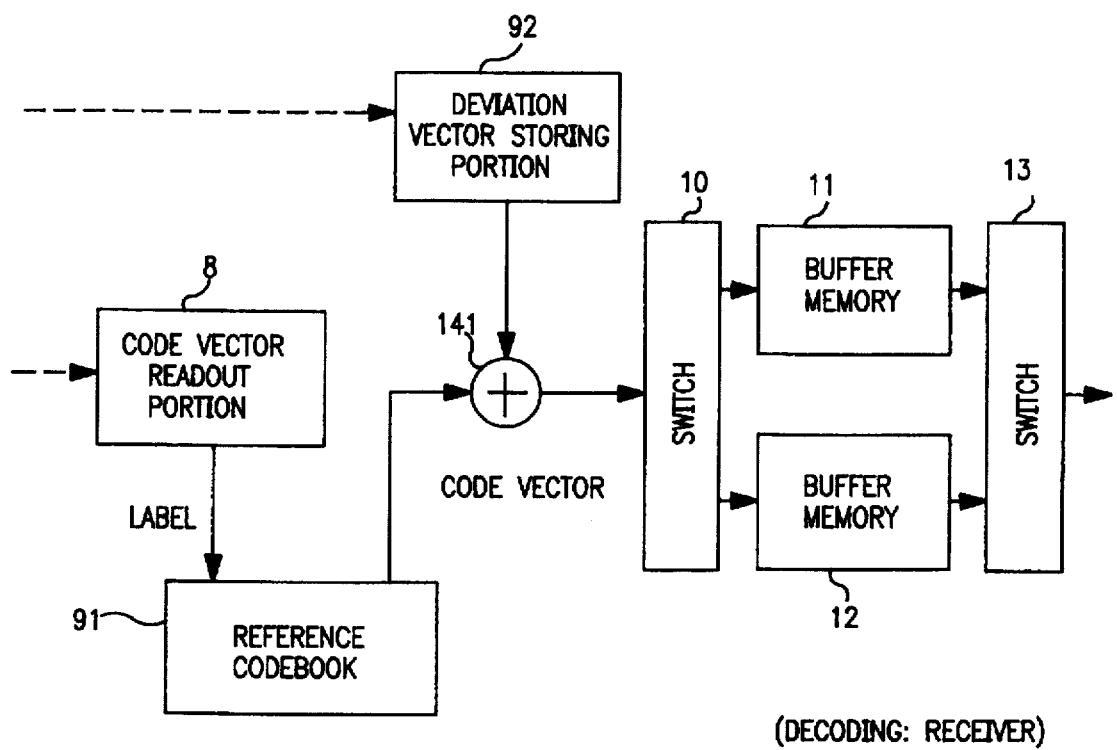
FIG. 15 illustrates an embodiment of a receiver based on speaker normalization.

FIG. 15 shows a receiver to be used with the transmitter described above with reference to FIG. 14 which converts a series of labels received using a reference codebook 91 into a series of code vectors and adds deviation vectors separately transmitted from the transmitter to the code vectors to obtain decoded vectors. 141 designates an adder which performs this addition. 92 designates a deviation vector storing portion for storing the deviation vectors to be added by the adder 141. The deviation vectors are transmitted from the transmitter in advance when the speaker is changed.

Figure 16:
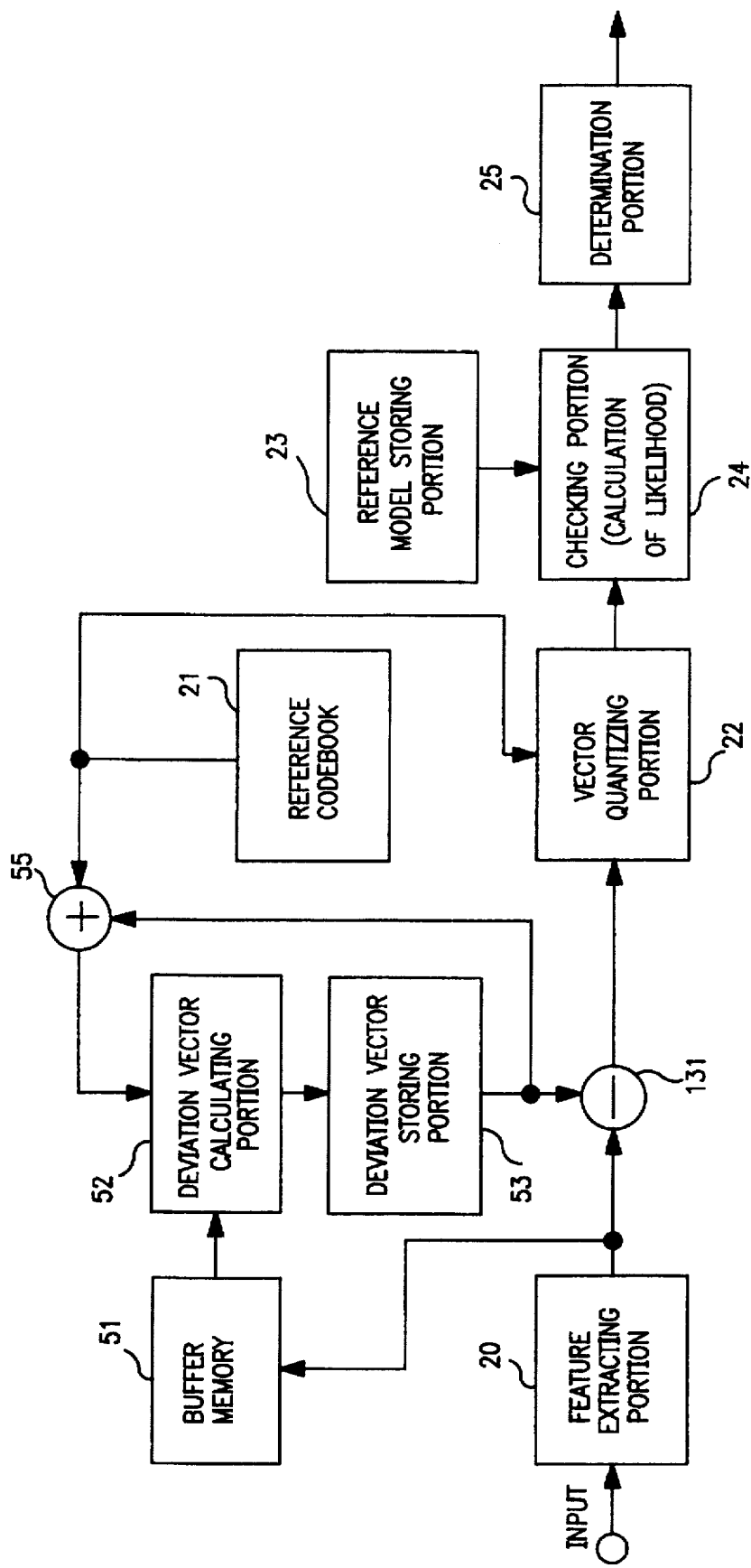
FIG. 16 illustrates an embodiment of a recognition device based on speaker normalization.

FIG. 16 shows an embodiment of a speech recognition device based on vector quantization utilizing speaker normalization according to the third embodiment of the present invention. 51 through 55 perform the same operations as described above. In this case, similarly, deviation vectors learned as described above are subtracted from input vectors by the .subtracter 131 and vector quantization is performed using the reference codebook 54. 131 designates a subtracter which subtracts deviation vectors from input vectors.

Figure 17A:
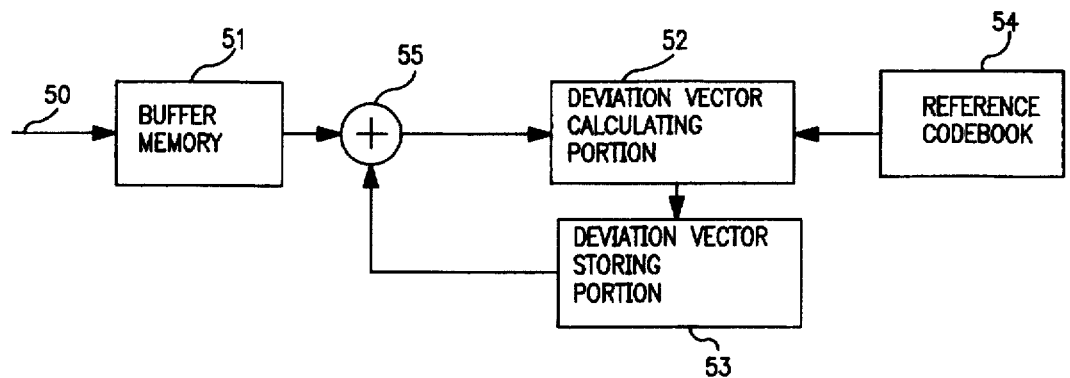
FIGS. 17a and 17b illustrate another embodiment of a method for speaker normalization according to the present invention.
Figure 17B:
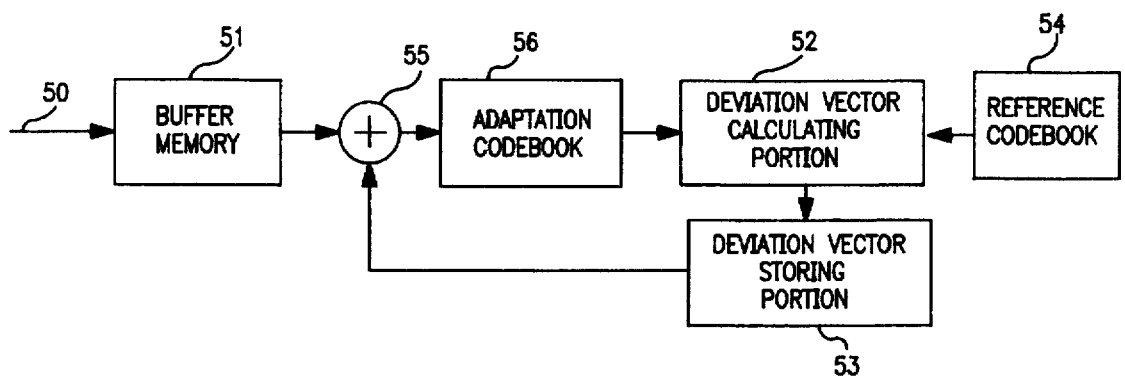

Obviously, the use of the configurations in FIG. 17a and FIG. 17b will make it possible to provide a transmission/reception device and a speech recognition device having substantially the same configuration. In this case, the addition and subtraction are partially reversed (not shown).

In the above-described embodiment, the correction of the code vectors is carried out by adding the correction vector $\Delta C$ to the code vectors C. If a predetermined vector $\Delta H$ (hereinafter referred to as normalization vector) obtained .from the correction vector $\Delta C$ is subtracted from the feature vectors $y_t$ of the speech of input speakers, speaker-dependent differences in input speech can be removed. This makes it possible to perform speaker normalization.

$$\bar{y}_t' = \bar{y}_t - \Delta H \qquad \text{Equation 45}$$

Figure 26:
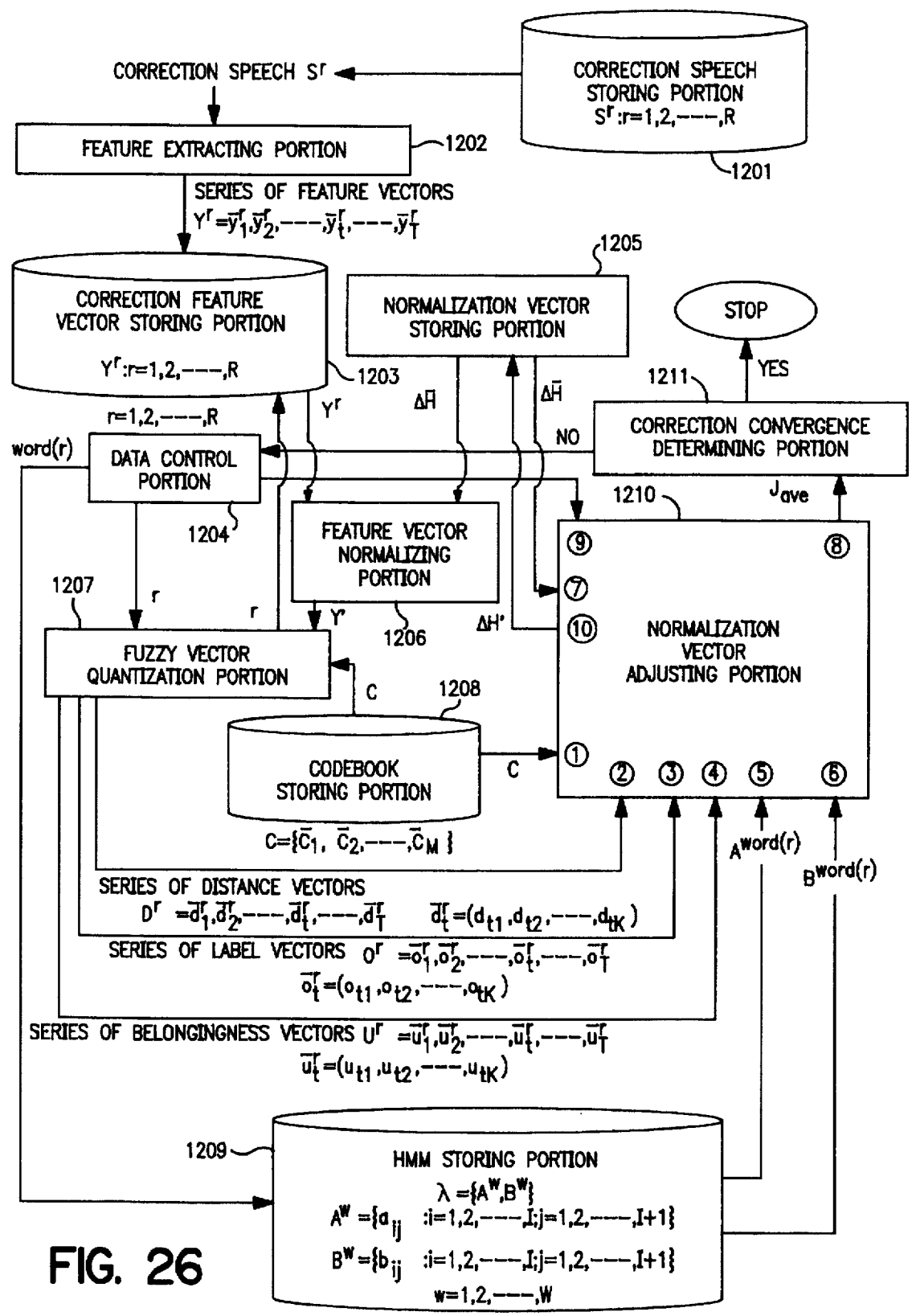
FIG. 26 is a block diagram illustrating an embodiment of a feature vector normalizing device according to the present invention.

In this case, the normalization vector is stored in advance with the values of the code vectors unchanged, and the normalization vector is subtracted from the feature vector in each frame of the series of feature vectors at the time of recognition. FIG. 26 is a block diagram of a device for creating such a normalization vector $\Delta H$ for speaker normalization.

1201 designates a correction speech storing portion which stores R (r=1~R) utterances of known speech $S^r$ (hereinafter referred to as correction speech) (the contents of the speech is known to the feature vector normalizing device in advance) of a speaker (hereinafter referred to as speaker for correction) for whom a normalization vector is to be obtained, i.e., the speaker who uses the speech recognition system. The speech is used for subsequent correction operations.

1202 designates a feature extracting portion which converts the correction speech $S^r$ into a series of feature vectors $Y^r = y_1^r, y_2^r, \ldots, y_t^r, \ldots y_T^r$ at constant intervals according to the same feature extracting procedure as that used in the above-described recognition device. $T^r$ represents the number of frames of data at the time Of the conversion of the correction speech $S^r$ into a series of feature vectors.

1203 designates a correction feature vector storing portion which stores the series of feature vectors $Y^r$ obtained by the feature-extracting r (r=1~R) utterances of the correction speech $S^r$ stored in the correction speech storing portion 1201 using the feature extracting portion 1202.

1204 designates a data control portion which controls the following process based on determination on which utterance (r) among the R utterances is currently treated and what is the contents of the r-th utterance. In the following description, the term "word(r)" means the contents of the r-th utterance (the number w of the HMM of the contents of utterance).

1205 designates a normalization vector storing portion for storing a normalization vector for correcting the feature vectors.

1206 designates a feature vector normalizing portion which obtains corrected feature vectors by correcting the values $y_t$ of the feature vectors at various points in time t using the normalization vector $\Delta H$ stored in the normalization vector storing portion 1205.

1207 designates a fuzzy vector quantizing portion which reads the series of feature vectors $Y^r$ from the correction feature vector storing portion 1203 using an utterance number r sent by the data control portion 1204, corrects the feature vectors $y_t^r$ at various points in time t at the feature vector normalizing portion using the normalization vector stored in the normalization vector storing portion 1205, replaces the corrected feature vectors with labels of the first to K-th orders in the order of increasing distances $d^r(t, m)$ to code vectors $C_1$–$C_M$ stored in a codebook storing portion 1208 to be described later and with membership values of the feature vectors $y_t$ for the respective code vectors retrieved with the set of labels for the feature vectors $y_t$ to convert them into distance vectors $d_t^r = (d_{t1}, d_{t2}, \ldots, d_{tK})$, label vectors $o_t^r = (o_{t1}, o_{t2}, u_{tK})$, and converts the series $Y^r$ of the feature vectors $y_t^r$ into a series of distance vectors $D^r = d_1^r, d_2^r, \ldots, d_T^r$, a series of label vectors $O^r = o_1^r, o_2^r, \ldots, o_T^r$, and a series of membership vectors $U^r = u_1^r, u_2^r, \ldots, u_T^r$. K can take any value from 1 up to the codebook size M and limits the number of calculations to obtain the rate of the occurrence of feature vectors to be described later.

1208 designates a codebook storing portion for storing code vectors $C_m$ so that they can be retrieved using labels m given thereto, the code vectors being used by the fuzzy vector quantizing portion 1207 for vector quantization.

1209 designates an HMM storing portion which stores HMMs created in advance in the number W of the words to be recognized, a state transition probability matrix A and a label occurrence probability matrix B being stored for each word to be recognized. Therefore, HMM $\lambda^w$ in the w-th place is expressed by $\lambda^w = \{A^w, B^w\}$.

1210 designates a normalization vector adjusting portion which adjusts the values of the normalization vector $\Delta H$ in the normalization vector storing portion 1205 using the correction speech and the HMMs corresponding to the contents of the correction speech stored in the HMM storing portion 1209 to minimize the distortion of the quantization error of the series of feature vectors weighted by the path probabilities relative to the codebook and transfers a new normalization vector $\Delta H'$ obtained as a result of the adjustment to the normalization vector storing portion 1205.

1211 designates a correction convergence determining portion which determines the state of convergence when the normalization vector is corrected using the correction speech. It causes the correcting operation to be terminated if predetermined conditions for convergence are satisfied and, if not, it causes the correction to be repeated using the same correction speech until the conditions are satisfied while sequentially updating the normalization vector.

The present invention is characterized by the configuration of the normalization vector adjusting portion 1210 wherein, provided that the contents of speech are known, the normalization vector is adjusted to minimize the distortion of the quantization error of the series of feature vectors corrected by the normalization vector weighted by the path probabilities relative to the codebook.

Figure 27:
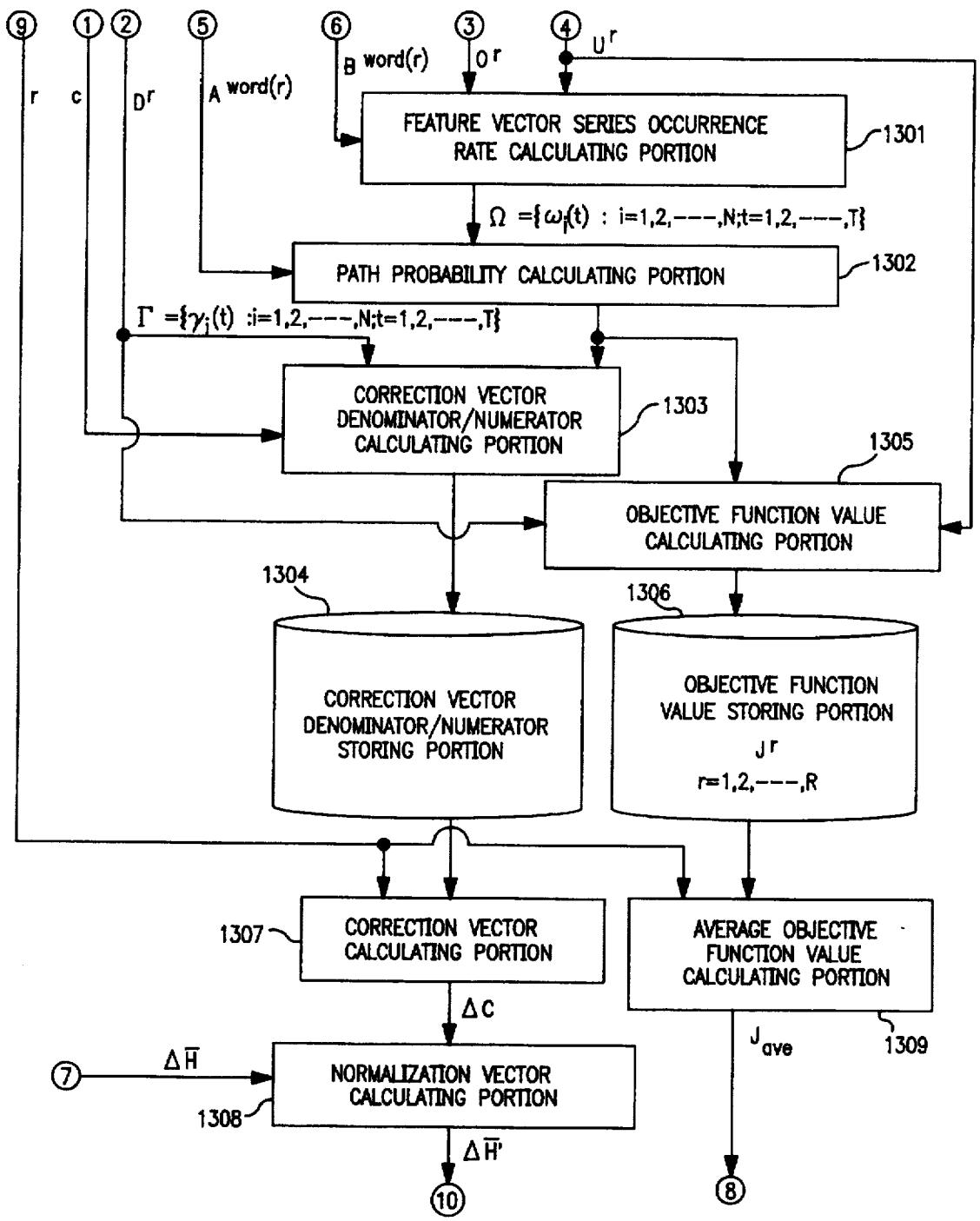
FIG. 27 is a block diagram illustrating an embodiment of correction vector correcting portion which is a major part of feature vector normalizing device of the present invention.

FIG. 27 is a block diagram showing a specific configuration of the normalization vector adjusting portion.

Terminals 1 through 10 are connected to the components in FIG. 26. The terminals 1 is connected to the codebook storing portion 1208 to receive the codebook C. The terminal 5 and 6 are connected to the HMM storing portion 1209. The terminal 5 receives the state transition probability matrix $A^{word(r)}$ of the HMM corresponding to the r-th word. The terminal 6 receives the label occurrence probability matrix $B^{word(r)}$ of the same. The terminals 2, 3, and 4 are connected to the fuzzy vector quantizing portion 1207 to receive the series of distance vectors $D^r$, series of label vectors $O^r$, and series of membership vectors $U^r$ for the r-th word. The terminals 7 and 10 are connected to the normalization vector storing portion 1205. The terminal 7 receives the normalization vector $\Delta H$, and the terminal 10 transmits a corrected normalization vector $\Delta H'$. The terminal 8 is connected to the correction convergence determining portion 1211 and transmits an average objective function value J to be used for the determination of convergence to it. The terminal 9 is connected to the data control portion 1204 to receive information on the place (r) where the current correction speech data exists and to calculate the normalization vector H and the average objective function value J when r=R.

The codebook correcting portion 1210, i.e., FIG. 27, operates with the information as described above exchanged.

1301 designates a feature vector series occurrence rate calculating portion which calculates the rate of the occurrence of a feature vector $\omega_i(t)$ as expressed by Equation 36 for every point in time t and every state i of the HMMs from the membership value and label occurrence probability based on the series of distance vectors, series of label vectors, series of membership vectors, and label occurrence probability matrix received at the terminals 2, 3, 4, and 6 to obtain a feature vector occurrence rate matrix $\Omega$.

1302 designates a path probability calculating portion which calculates path probability $\gamma_i(t)$ which is the probability of HMM being in a certain state i at a certain point in time t is calculated for every point in time t and every state i to obtain a path probability matrix $\Gamma$.

1303 designates a correction vector denominator/ numerator calculating portion which calculates the denominator and numerator of a correction vector estimation equation.

1304 designates a correction vector denominator/ numerator storing portion which stores the denominators and numerators for a correction vector calculation formula calculated by the correction vector denominator/numerator calculating portion 1303 for use in a correction vector calculating portion to be described later.

1305 designates an objective function value calculating portion which calculates objective function values $J^r$ to be used for the determination of convergence using the path probabilities $\gamma_i(t)$, membership vectors $u_r^r$, and distance vectors $d_t^r$ as described above according to Equation 35.

1306 designates an objective function value storing portion which stores the objective function values $J^r$ received from the objective function value calculating portion 1305 in a quantity R which corresponds to the total number of the words for correction. It goes without saying that it may accumulate those values instead of storing them.

After the operations as described above are carried out on the R correction words (the terminal 8 signals "R"), the following operations will be performed.

1307 designates a correction vector calculating portion which obtains a set of correction vectors $\Delta C$ from the denominators and numerators for correction vectors stored in the correction vector denominator/numerator storing portion 1304 according to the correction vector calculation formula and transmits it to the correction vector storing portion 1205 through the terminal 10.

1308 designates a normalization vector calculating portion which obtains the new normalization vector $\Delta H'$ from the correction vectors $\Delta C$ obtained by the correction vector calculating portion and the uncorrected normalization vector $\Delta H$ received at the terminal 7.

1309 designates an average objective function value calculating portion which obtains an average objective function value $J_{ave}$ by averaging all the objective function values stored in the objective function value storing portion 1306 and transmits it to the correction convergence determining portion 1211 through the terminal 7.

The correction vector calculating formula in the feature vector normalization device described above corresponds to Equations 41, 42, 43, and 44.

The above description has focused on cases wherein a system is divided into a learning phase and a recognition phase. It is also possible to perform communication and recognition while repeatedly learning each utterance which has (just) been given during the ongoing conversation or recognition process. Specifically, the buffer memory 51 shown in FIG. 5–FIG. 8, FIG. 12–FIG. 14, and FIG. 16 is brought into a state wherein it always accepts input signals and deviation vectors are recalculated at appropriate intervals according to the above-described method based on the accepted speech data to allow the codebook to be rewritten and normalization vectors for speaker normalization to be updated. This makes it possible to perform real-time speaker normalization while leaving the speaker generally unconscious of the learning phase in progress and to perform speaker adaptation or normalization in accordance with the speaker characteristics changing as time progresses. Correction speech is pronounced in advance in the above-described embodiments of the codebook correcting device and feature vector normalizing device according to the present invention. Considering the requirement that the contents of the speech must be known, it is not necessary for a speaker who uses the speech recognition system to pronounce the correction speech in advance if the result of recognition exhibits high reliability because the result of recognition can be regarded as such contents of speech.

In this case, the result of recognition can be considered reliable if the likelihood itself is high or there is a big difference in likelihood between the first and second candidates. Otherwise, the result of recognition can be considered less reliable. Therefore, appropriate thresholds may be set such that the codebook is corrected if such a threshold is exceeded and is not corrected otherwise. Thus, the correction of the codebook can be carried out even of the contents of speech is unknown by using the result of recognition instead.

Figure 28:
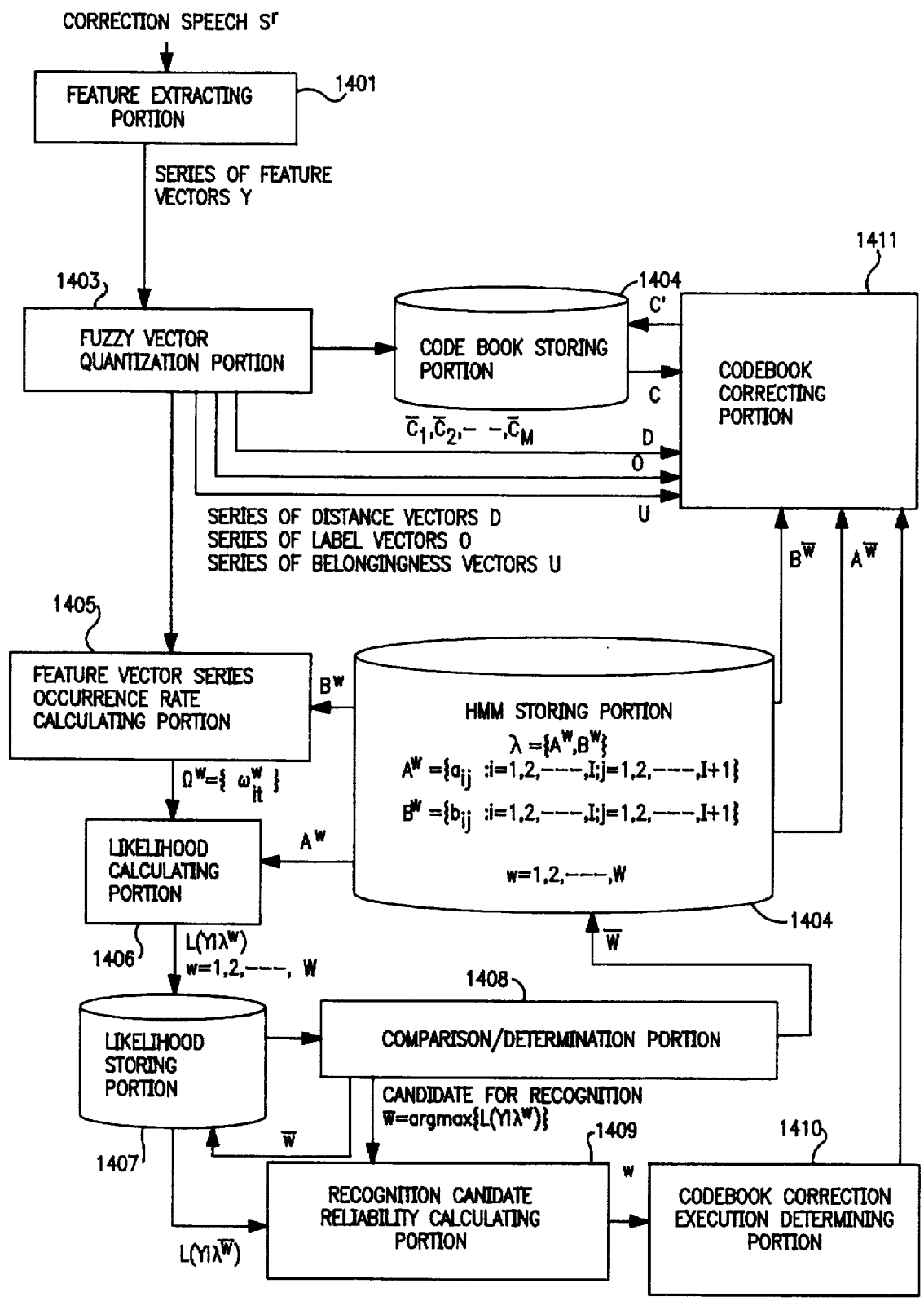
FIG. 28 is a block diagram illustrating an embodiment of a speech recognition device incorporating a codebook normalizing means.

FIG. 28 is a block diagram of such a speech recognition device.

1401 designates a feature extracting portion which converts an unknown speech signal into feature vectors at constant intervals using a well-known method such as LPC analysis to obtain a series of feature vectors $Y=y_1, y_2, \ldots, y^t, \ldots, y^T$. Tesents the length of the series of feature vectors Y for the unknown speech signal.

1402 designates a codebook storing portion which stores code vectors so that they can be retrieved using labels given to them.

1403 designates a fuzzy vector quantizing portion which replaces the feature vectors Y extracted by the feature extracting portion 1401 with K labels in the order of increasing distances $d^r(t, m)$ to code vectors stored in the codebook storing portion 1402 and with membership values of the feature vectors $y_t$ for the respective code vectors retrieved with the set of labels for the feature vectors $y_t$ to convert them into distance vectors $d_t^r=(d_{t1}, d_{t2}, \ldots, d_{tK})$, label vectors $o_t^r=(o_{t1}, o_{t2}, \ldots, o_{tK})$, and membership vectors $u_t^r=(u_{t1}, u_{t2}, \ldots, u_{tK})$, and converts the series Y of the feature vectors $y_t$ into a series of distance vectors $D=d_1, d_2, \ldots, d_T$, a series of label vectors $O=o_1, o_2, \ldots, o_T$, and a series of membership vectors $U=u_1, u_2, \ldots, u_T$.

1404 designates an HMM storing portion which stores HMM $\lambda^w$ (w=1~W) created in advance in the number W of the words to be recognized, a state transition probability matrix A and a label occurrence probability matrix B being stored for each word to be recognized. Therefore, HMM $\lambda^w$ in the w-th place is expressed by $\lambda^w=\{A^w, B^w\}$ w=1 W.

1405 designates a feature vector series occurrence rate calculating portion which calculates a feature vector series occurrence rate matrix $\Omega W=\{\omega^w_{it}\}$ for HMM $\lambda^w$ according to Equation 36 using the series of Mabel vectors O obtained by the fuzzy vector quantizing portion 1403, the series of membership vector U, and the label occurrence probability matrix $B^w$ of the w-th word stored in the HMM storing portion 1404.

Label occurrence probability $b_i o_{tk}$ is the probability of the occurrence of the k-th label $o_{tk}$ from a state i of HMM when feature vectors $y_t$ at a point in time t are subjected to fuzzy vector quantization.

1406 designates a likelihood calculating portion which calculates likelihood $L(Y|\lambda^W)$ using the feature vector series occurrence rate matrix $\Omega W$ for HMM $\lambda^W$ calculated by the feature vector series occurrence rate calculating portion 1405 and the state transition probability matrix $A^W$ for HMM $\lambda^W$ stored in the HMM storing portion 1404.

1407 designates a likelihood storing portion which stores the likelihood $L(Y|\lambda^W)$ of HMM $\lambda^W$ for each word relative to the series of feature vectors Y calculated by the likelihood calculating portion 1406 for later comparison.

1408 designates a comparison/determination portion which determines the word associated with the HMM that gives the maximum likelihood among the HMMs stored in the likelihood storing portion 1407 as a candidate for recognition.

Each of the operations of the components 1405 through 1407 is performed once for the HMM $\lambda^W$ for each word and is repeated until w equals W. The result of these operations is evaluated by the comparison/determination portion 1408.

1409 designates a recognition candidate reliability calculating portion which calculates the reliability of the candidate for recognition selected by the comparison/determination portion 1408 using the likelihood of the candidate for recognition stored in the likelihood storing portion 1407 and the like.

1410 designates a codebook correction execution determining portion which sends a codebook correction signal to a codebook correcting portion to be described later to execute correction of the codebook if the reliability of the candidate for recognition obtained by the recognition candidate reliability calculating portion 1409 is equal to or higher than a predetermined threshold.

1411 designates a codebook correcting portion which receives the codebook correction signal from the codebook correction execution determining portion, corrects the codebook using the codebook stored in the codebook storing portion 1402, the series of distance vectors D obtained by the fuzzy vector quantizing portion 1403, the series of label vectors O, the series of membership vectors U, and the path probability, and sends the corrected codebook to the codebook storing portion.

Similarly, the normalization vector can be corrected even if the contents of speech are unknown by using the result of recognition instead if an arrangement is made such that the normalization vector is adjusted when a threshold is exceeded and otherwise no adjustment is made.

Figure 29:
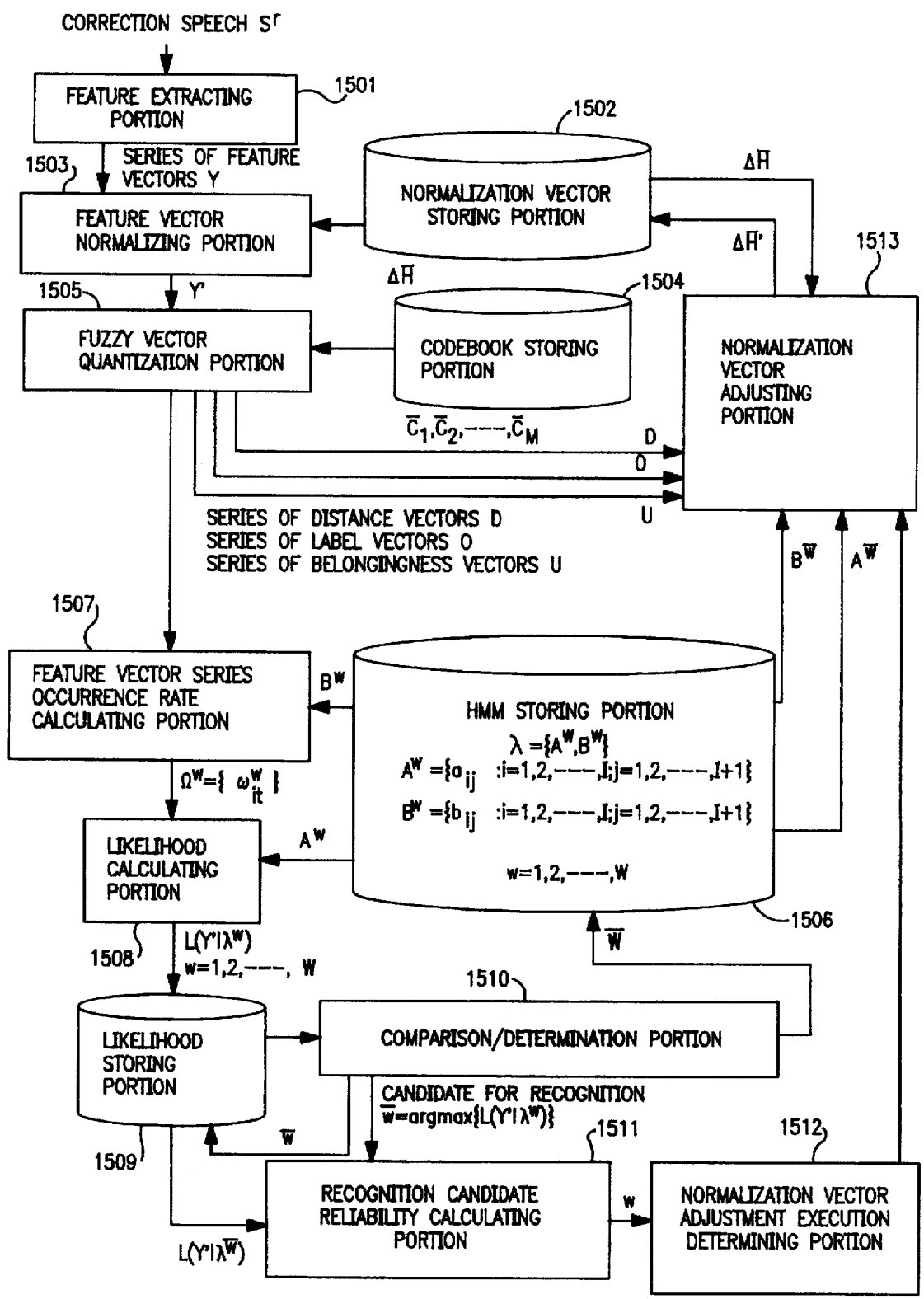
FIG. 29 is a block diagram illustrating an embodiment of a speech recognition device incorporating a normalization vector adjusting means.

FIG. 29 is a block diagram of such a speech recognition device.

1501 designates a feature extracting portion which converts an unknown speech signal into feature vectors at constant intervals using a well-known method such as LPC analysis to obtain a series of feature vectors $Y=y_1, y_2, \ldots, y_t, y_T$. T represents the length of the series of feature vectors Y for the unknown speech signal.

1502 designates a normalization vector storing portion which stores a normalization vector for normalizing the feature vectors.

1503 designates a feature vector normalizing portion which normalizes the feature vectors using the normalization vector.

1504 designates a codebook storing portion which stores code vectors so that they can be retrieved using labels given to them.

1505 designates a fuzzy vector quantizing portion which replaces the feature vectors $y'_t$ normalized by the feature vector normalizing portion with K labels in the order of increasing distances $d'(t, m)$ to code vectors stored in the codebook storing portion 1502 and with membership values of the normalized feature vectors $y'_t$ for the respective code vectors retrieved with the set of labels for the normalized feature vectors $y'_t$ to convert them into distance vectors $d_t=(d_{t1}, d_{t2}, \ldots, d_{tK})$, label vectors $o_t'=(o_{t1}, o_{t2}, \ldots, o_{tK})$, and membership vectors $u_t'=(u_{t1}, u_{t2}, \ldots, u_{tK})$, and converts the series Y' of the normalized feature vectors $y'_t$ into a series of distance vectors $D=d_1, d_2, \ldots, d_T$, a series of label vectors $O=o_1, o_2, \ldots, o_T$, and a series of membership vectors $U=u_1, u_2, \ldots, u_T$.

1506 designates an HMM storing portion which stores HMM $\lambda^W$ (w=1~W) created in advance in the number W of the words to be recognized, a state transition probability matrix A and a label occurrence probability matrix B being stored for each word to be recognized. Therefore, HMM $\lambda^W$ in the w-th place is expressed by $\lambda^W=\{A^W, B^W\}$w=1~W.

1507 designates a feature vector series occurrence rate calculating portion which calculates a feature vector series occurrence rate matrix $\Omega W=\{\omega^W_{it}\}$ for HMM $\lambda^W$ according to Equation 36 using the series of label vectors O obtained by the fuzzy vector quantizing portion 1505, the series of membership vector U, and the label occurrence probability matrix $B^W$ of the w-th word stored in the HMM storing portion 1506.

Label occurrence probability $b_i o_{tk}$ is the probability of the occurrence if the k-th label $o_{tk}$ from a state i of HMM when feature vectors $y'_t$ at a point in time t are subjected to fuzzy vector quantization.

1508 designates a likelihood calculating portion which calculates likelihood $L(Y|\lambda^W)$ using the feature vector series occurrence rate matrix $\Omega W$ for HMM $\lambda^W$ calculated by the feature vector series occurrence rate calculating portion 1507 and the state transition probability matrix $A^W$ for HMM $\lambda^W$ stored in the HMM storing portion 1506.

1509 designates a likelihood storing portion which stores the likelihood $L(Y|\lambda^W)$ of HMM $\lambda^W$ for each relative to the series of feature vectors Y calculated by word the likelihood calculating portion 1508 for later comparison.

1510 designates a comparison/determination portion which determines the word associated with the HMM that gives the maximum likelihood among the HMMs stored in the likelihood storing portion 1509 as a candidate for recognition.

Each of the operations of the components 1507 through 1509 is performed once for the HMM $\lambda^W$ for each word and is repeated until w equals W. The result of these operations is evaluated by the comparison/determination portion 1510.

1511 designates a recognition candidate reliability calculating portion which calculates the reliability of the candidate for recognition selected by the comparison/determination portion 1510 using the likelihood of the candidate for recognition stored in the likelihood storing portion 1509 and the like.

1512 designates a normalization vector adjustment execution determining portion which sends a normalization vector adjustment signal to a normalization vector adjusting portion to be described later to execute adjustment of the normalization vector if the reliability of the candidate for recognition obtained by the recognition candidate reliability calculating portion 1511 is equal to or higher than a predetermined threshold.

1513 designates a normalization vector adjusting portion which receives the normalization vector adjustment signal from the normalization vector adjustment execution determining portion, adjusts the normalization vector using the normalization vector stored in the normalization vector storing portion 1502, the series of distance vectors D obtained by the fuzzy vector quantizing portion 1505, the series of label vectors O, the series of membership vectors U, and the path probability of the HMM associated with the candidate for recognition, and sends the corrected normalization vector to the normalization vector storing portion.

What is required is to convert a centroid μm (m=1, ..., M) into μm' which is optimum for the speech of a speaker A. Such conversion (adaptation) is serially performed and adaptation may be performed various timing such as intervals in speech or predetermined intervals. The present embodiment will be described on an assumption that adaptation is performed each time a word is input.

According to a first embodiment of the present invention, when the n-th utterance of a word is input, it is subjected to conversion which is expressed as $\mu_m'(n)=\mu_m+h_m(n)$ and is performed by finding the optimum $h_m(n)$ from among n past utterances of words from the speaker A.

The present invention is characterized in that membership value sum vector $W_m(n)$ and the short time deviation vector $\Delta_m(n)$ are calculated from only the n-th utterance of a word which has been most recently input and in that the optimum deviation vector $h_m(n)$ is calculated for all of the utterances from the first to n-th utterances based on an accumulated-product-of-membership value-and-deviation vector $V_m(n-1)$ and an accumulated sum of membership values $W_m(n-1)$ which have already been calculated from (n-1) past utterances. Therefore, the $\mu_m'(n)$ obtained is always converted to be the optimum among the input utterances including past utterances.

Specifically, when feature vectors obtained from the n-th utterance of the speaker A are expressed as $y^A_1(n), y^A_2(n), \ldots, y^A_{I^n}(n)$, an objective function $J'(n)$ for only the u-th utterance is defined as in Equation 46 and an objective function $JJ'(n)$ for all of the n utterances is defined as in Equation 47.

$$J'(n) = \sum_{i=1}^{I^n} \sum_{m=1}^{M} u_{im}(n)^F d(y_i^A(n),\mu_m'(n))$$

$$= \sum_{i=1}^{I^n} \sum_{m=1}^{M} u_{im}^F(n) d(y_i^A(n),\mu_m'(n-1)+\Delta_m(n))$$

Equation 46

$$JJ'(n) = \sum_{r=1}^{n} \sum_{i=1}^{I^r} \sum_{m=1}^{M} u_{im}(r)^F d(y_i^A(r),\mu_m'(r))$$

$$= \sum_{r=1}^{n-1} \sum_{i=1}^{I^r} \sum_{m=1}^{M} u_{im}(r)^F d(y_i^A(r),\mu_m'(r)) +$$

$$\sum_{i=1}^{I^n} \sum_{m=1}^{M} u_{im}^F(n) d(y_i^A(n),\mu_m'(n))$$

$$= JJ'(n-1) + \sum_{i=1}^{I^n} \sum_{m=1}^{M} u_{im}^F(n) d(y_i^A(n),\mu_m + h_m(n))$$

Equation 47

Therefore, the conversion can be performed by finding $\Delta_m(n)$ that gives an appropriately small solution to Equation 46 and $h_m(n)$ that gives an appropriately small solution to Equation 47. If a definition that $(y, \mu)=(y-\mu)^T(y-\mu)$ is given as in the example described earlier, such $\Delta_m(n)$ and $h_m(n)$ will be obtained according to the following steps. S represents a preset value as the upper limit for iterations of calculation to obtain $\Delta_m(n)$ (Step 3-1)

All initial values are set before the speaker inputs.

Wait for input of speech with setting wherein value of the overall objective function $JJ'=\infty$; the accumulated-product-of-membership value-and-deviation vector $V_m=0$ (m=1, ..., M); the accumulated sum of membership values $W_m=0$ (m=1, ..., M); and the number of input words n=0.

(Step 3-2)

Speech is input. Then, the number of input words n=n+1.

(Step 3-3)

The number of the iterations of calculation on each input is set as s=0. The values of the objective function is set as $J^{(0)}=\infty$ and $\Delta_m^{(0)}=0$ (m=1, ..., M).

(Step 3-4)

The initial value $U(n)^{(0)}$ for the membership matrix $U(n)=[u_{nm}(n)]$ for the n-th input is given by the following equation.

$$u_{im}(n)^{(0)} = \frac{1}{\sum_{k=1}^{M} \left( \frac{d(y_i^A(n), \mu_m + h_m(n-1) + \Delta_m(n)^{(0)})}{d(y_i^A(n), \mu_k + h_k(n-1) + \Delta_k(n)^{(0)})} \right)^{1/(F-1)}}$$

Equation 48

$$1 \leq m \leq M, 1 \leq i \leq I^n$$

where $I^n$ represents the frame length of the n-th utterance.

(Step 3-5)

s=s+1

(Step 3-6)

The short time deviation vector $\Delta_m(n)^{(S)}$ (m=1, ..., M) is obtained by the following equation.

$$\Delta_m(n)^{(s)} = \frac{\sum_{i=1}^{I^n} (u_{im}(n)^{(s-1)})^F (y_i^A(n) - \mu_m - h_m(n-1))}{\sum_{i=1}^{I^n} (u_{im}(n)^{(s-1)})^F}$$

Equation 49

$$u_{im}(n)^{(s)} = \frac{1}{\sum_{k=1}^{M} \left( \frac{d(y_i^A(n), \mu_m + h_m(n-1) + \Delta_m(n)^{(s)})}{d(y_i^A(n), \mu_k + h_k(n-1) + \Delta_k(n)^{(s)})} \right)^{1/(F-1)}} ;$$

$$1 \leq m \leq M, 1 \leq i \leq I^n$$

(Step 3-7)

The membership matrix of each point (input vector) for clusters is calculated according to the following equation.

$$u_{im}(n)^{(s)} = \frac{1}{\sum_{k=1}^{M} \left( \frac{d(y_i^A(n), \mu_m + h_m(n-1) + \Delta_m(n)^{(s)})}{d(y_i^A(n), \mu_k + h_k(n-1) + \Delta_k(n)^{(s)})} \right)^{1/(F-1)}} ;$$

Equation 50

$$1 \leq m \leq M, 1 \leq i \leq I^n$$

(Step 3-8)

The objective function is calculated.

$$J^{(s)} = \sum_{i=1}^{I^n} \sum_{m=1}^{M} (u_{im}(n)^{(s)})^F d(y_i^A(n), \mu_m + h_m(n) + \Delta_m(n))$$

Equation 51

(Step 3-9)

It is determined whether the following condition for the termination of the calculation of the short time deviation vector for the current input speech is satisfied.

$$\frac{|J^{(s-1)} - J^{(s)}|}{J^{(s-1)}} \leq \delta \text{ or } s \geq S$$

Equation 52

If not, the process returns to Step 3-5. If yes, the process proceeds to the next step.

(Step 3-10)

The sum of membership values $W_m(n)$ only for the n-th utterance is calculated according to the following equation.

$$w_m(n) = \sum_{i=1}^{I^n} u_{im}(n)^{(s)}$$

Equation 53

(Step 3-11)

The accumulated sum of membership values $W_m$ and the accumulated-product-of-membership value-and-deviation vector $V_m$ are updated.

$$W_m = W_m + w_m(n)$$

Equation 54

$$V_m = V_m + w_m(n) \times \Delta_m(n)$$

(Step 3-12)

The deviation vector $h_m(n)$ (m=1, ..., M) is obtained by the following equation.

$$h_m(n) = V_m / W_m$$

Equation 55

(Step 3-13)

The overall objective function is calculated.

$$JJ'(n) = JJ'(n-1) + J(n)^{(s)}$$

Equation 56

(Step 3-14)

It is determined whether the following condition for the termination of the calculation of the deviation vector for each input utterance is satisfied.

$$\frac{|JJ'(n-1) - JJ'(n)|}{JJ'(n-1)} \leq \delta\delta$$

Equation 57

If not, the process returns to Step 3-2 to wait for speech input. If yes, adaptation is terminated.

δ in Step 3-9 and δδ in Step 3-14 are appropriately small values and are determined by how much the centroids of a codebook which is prepared as a reference are biased to the input speech. When δ is small and S is large, the centroids are biased to a codebook which is obtained by clustering using only the input speech. When the number of past input utterances n is small, it is considered undesirable that the distribution of the centroids is over-biased to this input speech. So, appropriate sizes must be chosen for δ i and S depending on the number of input utterances n.

When the number of input utterances n is small, it is preferable to make $\Delta_m(n)$ in the objective function (Equation 21) and $h_m(n)$ in the overall objective function (Equation 47) common to m=1, ..., M. Specifically, this idea is employed in a second embodiment of the present invention wherein $\Delta(n)=, \Delta_1(n)=, \Delta_2(n)= ... = \Delta M(n); h(n)=h_1(n)=h_2(n)= ... =h_M(n)$; an objective function $J''(n)$ only for the n-th utterance is defined as in Equation 58; and an overall objective function $JJ''(n)$ for all of the n utterances is defined as in Equation 59.

$$J''(n) = \sum_{i=1}^{I^n} \sum_{m=1}^{M} u_{im}(n)^F d(y_i^A(n), \mu_m'(n))$$

Equation 58

$$= \sum_{i=1}^{I^n} \sum_{m=1}^{M} u_{im}^F(n) d(y_i^A(n), \mu_m'(n-1) + \Delta(n))$$

$$JJ''(n) = \sum_{r=1}^{n} \sum_{i=1}^{I^n} \sum_{m=1}^{M} u_{im}(r)^F d(y_i^A(r), \mu_m'(r))$$

Equation 59

$$= \sum_{r=1}^{n-1} \sum_{i=1}^{I^n} \sum_{m=1}^{M} u_{im}(r)^F d(y_i^A(r), \mu_m'(r)) +$$

$$\sum_{i=1}^{I^n} \sum_{m=1}^{M} u_{im}^F(n) d(y_i^A(n), \mu_m'(n))$$

$$= JJ''(n-1) + \sum_{i=1}^{I^n} \sum_{m=1}^{M} u_{im}^F(n) d(y_i^A(n), \mu_m + h(n))$$

$\Delta(n)$ and $h(n)$ are obtained according to the following steps.

(Step 4-1)

All initial values are set before the speaker inputs.

Wait for input of speech with setting wherein value of the overall objective function $JJ' = \infty$; the accumulated sum of membership values $W_m = 0$; the accumulated-product-of-membership value-and-deviation vector $V_m$; and the number of input words n=0.

(Step 4-2)

Speech is input. Then, the number of input words n=n+1.

(Step 4-3)

The number of the iterations of calculation on each input is set as s=0. The values of the objective function is set as $J^{(0)} = \infty$ and $\Delta_m(0) = 0$.

(Step 4-4)

The initial value $U(n)^{(0)}$ for the membership matrix $U(n) = [u_{nm}(n)]$ for the n-th input is given by the following equation.

$$u_{im}(n)^{(0)} = \frac{1}{\sum_{k=1}^{M} \left( \frac{d(y_i^A(n), \mu_m + h(n-1) + \Delta(n)^{(0)})}{d(y_i^A(n), \mu_k + h(n-1) + \Delta(n)^{(0)})} \right)^{1/(F-1)}}$$

Equation 60

$1 \leq m \leq M, 1 \leq i \leq I^n$ where $I^n$ represents the frame length of the n-th utterance.

(Step 4-5)

s=s+1

(Step 4-6)

The short time deviation vector $\Delta_m(n)^{(S)}$ is obtained by the following equation.

$$\Delta(n)^{(s)} = \frac{\sum_{m=1}^{M} \sum_{i=1}^{I^n} (u_{im}(n)^{(s-1)})^F (y_i^A(n) - \mu_m - h(n-1))}{\sum_{m=1}^{M} \sum_{i=1}^{I^n} (u_{im}(n)^{(s-1)})^F}$$

Equation 61

(Step 4-7)

The membership matrix of each point (input vector) for clusters is calculated according to the following equation.

$$u_{im}(n)^{(s)} = \frac{1}{\sum_{k=1}^{M} \left( \frac{d(y_i^A(n), \mu_m + h(n-1) + \Delta(n)^{(s)})}{d(y_i^A(n), \mu_k + h(n-1) + \Delta(n)^{(s)})} \right)^{1/(F-1)}} ;$$

Equation 62

$1 \leq m \leq M, 1 \leq i \leq I^n$ (Step 4-8)

The objective function is calculated.

$$J^{(s)} = \sum_{i=1}^{n} \sum_{m=1}^{M} (u_{im}(n)^{(s)})^F d(y_i^A(n), \mu_m + h(n) + \Delta(n)) \quad \text{Equation 63}$$

(Step 4-9)

It is determined whether the following condition for the termination of the calculation of the short time deviation vector for the current input speech is satisfied.

$$\frac{|J^{(s-1)} - J^{(s)}|}{J^{(s-1)}} \leq \delta \text{ or } s \geq S \quad \text{Equation 64}$$

If not, the process returns to Step 4-5. If yes, the process proceeds to the next step.

(Step 4-10)

The sum of membership values Wm(n) only for the n-th utterance is calculated according to the following equation.

$$w(n) = \sum_{i=1}^{n} \sum_{m=1}^{M} u_{im}(n)^{(s)} \quad \text{Equation 65}$$

(Step 4-11)

The accumulated sum of membership values and the accumulated product of short time deviation vector and the sum of membership values are updated.

$$W = W + w(n) \quad \text{Equation 66}$$

$$V = V + w(n) \times \Delta(n)$$

(Step 4-12)

The deviation vector h(n) is obtained by the following equation.

$$h(n) = V/W \quad \text{Equation 67}$$

(Step 4-13)

The overall objective function is calculated.

$$JJ(n) = JJ(n-1) + J(n)^{(s)} \quad \text{Equation 68}$$

(Step 4-14)

It is determined whether the following condition for the termination of the calculation of the deviation vector for each input utterance is satisfied.

$$\frac{|JJ(n-1) - JJ(n)|}{JJ(n-1)} \leq \delta\delta \quad \text{Equation 69}$$

If not, the process returns to Step 4-2 to wait for speech input. If yes, adaptation is terminated.

Again in this case, the influence of the input speech to the amount of the correction of the centroids can be adjusted through selection of $\delta$, S, and $\delta\delta$.

Figure 30:
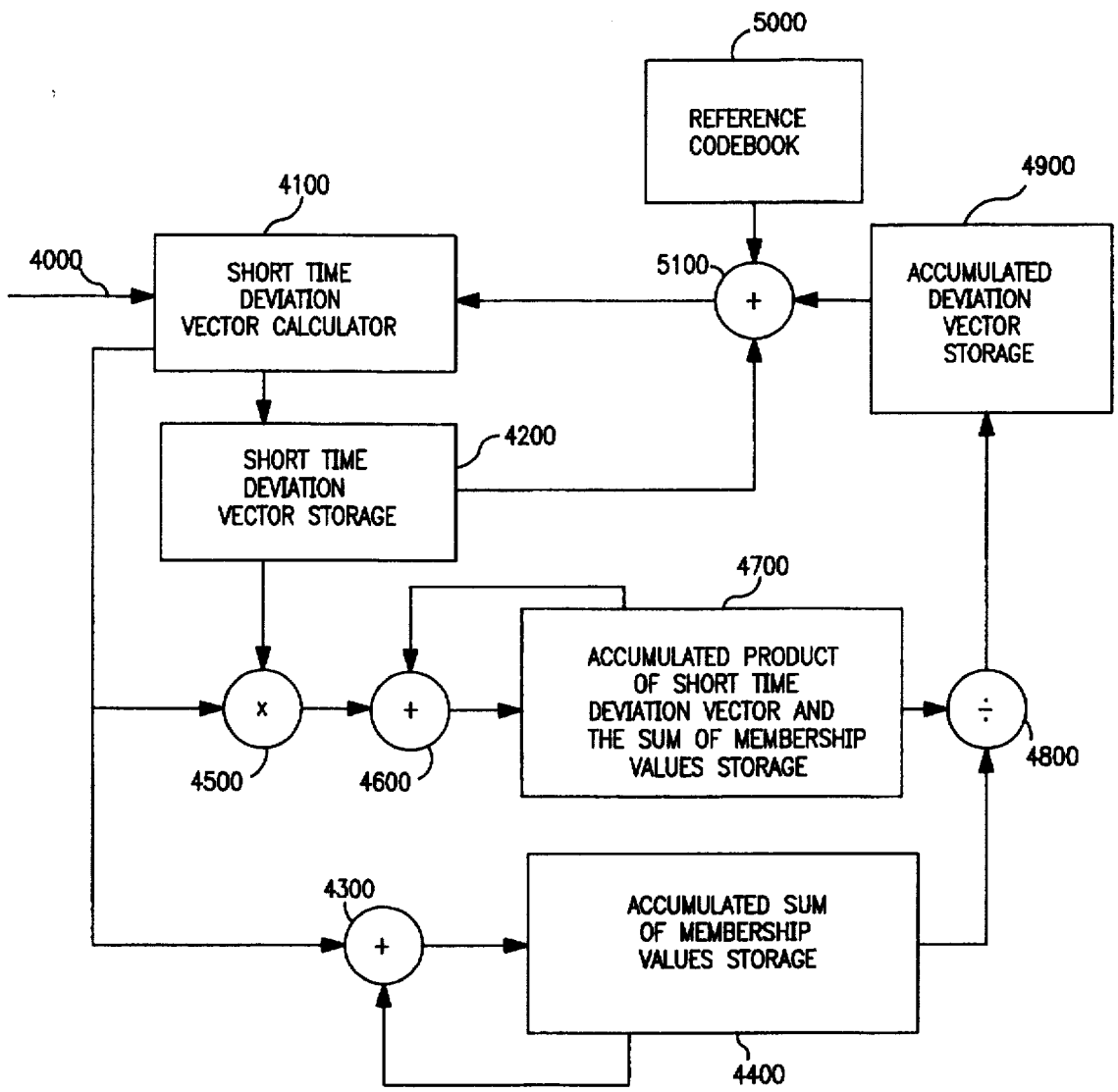
FIG. 30 illustrates the principle of an embodiment of a method of adaptation according to the present invention.

FIG. 30 is a block diagram showing configurations of the first and second embodiments. In the first embodiment, Steps 3-1 through 3-14 are performed and, in the second embodiment, Steps 4-1 through 4-14 are performed.

4000 designates an input terminal to which a series of feature vectors $y^A_1(n), \ldots, y^A_I(n)$ as a result of feature-extraction performed on the n-th input utterance is input. 5000 designates a reference codebook which stores code vectors created from a multiplicity od speakers are so that they can be retrieved using labels.

4200 designates an short time deviation vector storing portion. 4900 designates a deviation vector storing portion.

5100 designates an adder which adds the contents of the reference codebook 5000, short time deviation vector storing portion 4200, and deviation vector storing portion 4900.

4100 designates an short time deviation vector calculating portion which calculates $\Delta_m(n)$ (m=1, ..., M) according to Steps 3-3 through 3-9 in the first embodiment and calculates $\Delta(n)$ according to Steps 4-3 through 4-9 in the second embodiment from contents input through the input terminal 4000 and the output of the adder 5100. The calculated short time deviation vector is stored in the short time deviation vector storing portion 4200. When the above-described repeated calculation is started, the contents of the short time deviation vector 4200 are initialized to 0. With this configuration, the contents of the short time deviation vector 4200 are rewritten each time an updated short time deviation vector is obtained during the calculation.

If the condition for termination at Step 3-9 or Step 4-9 is satisfied, the short time deviation vector adapted to the n-th utterance finally given by the speaker A is obtained at the short time deviation vector storing portion 4200. If the convergence of the short time deviation vector is confirmed, a deviation vector is calculated, past input utterances being also reflected in the calculation as described below.

4400 designates an accumulated sum of membership values storing portion. 4300 designates an adder which adds the contents of the accumulated sum of membership values storing portion 4400 and the output of the short time deviation vector calculating portion 4100 (the sum of membership value). The contents of the accumulated sum of membership values storing portion 4400 are rewritten to an updated accumulated sum of membership values.

4700 designates an accumulated product of short time deviation and the sum of membership values storing portion. 4600 designates an adder. 4500 designates a multiplier which multiplies the output of the short time deviation vector calculating portion 4100 (the sum of membership value) and the contents of the short time deviation vector storing portion 4200. The product is added with the contents of the accumulated product of short tiem deviation and the sum of membership values storing portion 4700 at the adder 4600. Thus, the contents of the accumulated product of short time deviation and the sum of membership values storing portion 4700 are rewritten to an updated accumulated product of short time deviation and the sum of membership values. 4800 designates a divider, and 4900 designates a deviation vector storing portion. The divider 4800 divides the contents of the accumulated product of short time deviation and the sum of membership values storing portion 4700 by the contents of the accumulated sum of membership values storing portion 4400 to calculate a deviation vector which is stored in the deviation vector storing portion. Specifically, in the first embodiment, the deviation vector $h_m(n)$ is calculated . according to Steps 3-1, 3-2, and 3-10 through 3-14. In the second embodiment, the deviation vector h(n) is calculated according to Steps 4-1, 4-2, and 4-10 through 4-14. Such an operation is repeated each time an input utterance is input. A representative vector adapted to the speaker A can be obtained by adding the deviation vector thus obtained to the output of the reference codebook.

Although the description has focused on adaptation of a codebook to a speaker, conversely, it is also possible to adapt a speaker to a reference codebook, i.e., speaker normalization can be performed. Specifically, Equations 46 and 47 can be changed to:

$$J'(n) = \sum_{i=1}^{P} \sum_{m=1}^{M} u_{im}(n)^F d(y_i^A(n), \mu_m'(n))$$ Equation 70

$$= \sum_{i=1}^{P} \sum_{m=1}^{M} \mu_{im}^F(n) d(y_i^A(n), \mu_m'(n-1) + \Delta_m(n))$$

$$= \sum_{i=1}^{P} \sum_{m=1}^{M} u_{im}^F(n) \{y_i^A(n) - (\mu_m'(n-1) +$$

$$\Delta_m(n))\}^T \{y_i^A(n) - (\mu_m'(n-1) + \Delta_m(n))\}$$

$$= \sum_{i=1}^{P} \sum_{m=1}^{M} u_{im}^F(n) \{(y_i^A(n) - \Delta_m(n)) - \mu_m'(n-$$

$$1)\}^T \{(y_i^A(n) - (\Delta_m(n)) - \mu_m'(n-1)\}$$

and $$JJ'(n) = \sum_{r=1}^{n} \sum_{i=1}^{P} \sum_{m=1}^{M} u_{im}(r)^F d(y_i^A(r), \mu_m'(r))$$ Equation 71

$$= \sum_{r=1}^{n-1} \sum_{i=1}^{P} \sum_{m=1}^{M} \mu_{im}(r)^F d(y_i^A(r), \mu_m'(r)) +$$

$$\sum_{i=1}^{P} \sum_{m=1}^{M} u_{im}^F(n) d(y_i^A(n), \mu_m'(n))$$

$$= JJ'(n-1) + \sum_{i=1}^{P} \sum_{m=1}^{M} \mu_{im}^F(n) d(y_i^A(n), \mu_m + h_m(n))$$

$$= JJ'(n-1) + \sum_{i=1}^{P} \sum_{m=1}^{M} u_{im}^F(n) \{y_i^A(n) - (\mu_m(n-1) +$$

$$h_m(n))\}^T \{y_i^A(n) - (\mu_m(n-1) + h_m(n))\}$$

$$= JJ'(n-1) + \sum_{i=1}^{P} \sum_{m=1}^{M} u_{im}^F(n) \{(y_i^A(n) - h_m(n)) -$$

$$\mu_m(n-1)\}^T \{(y_i^A(n) - h_m(n)) - \mu_m(n-1)\}$$

Figure 31:
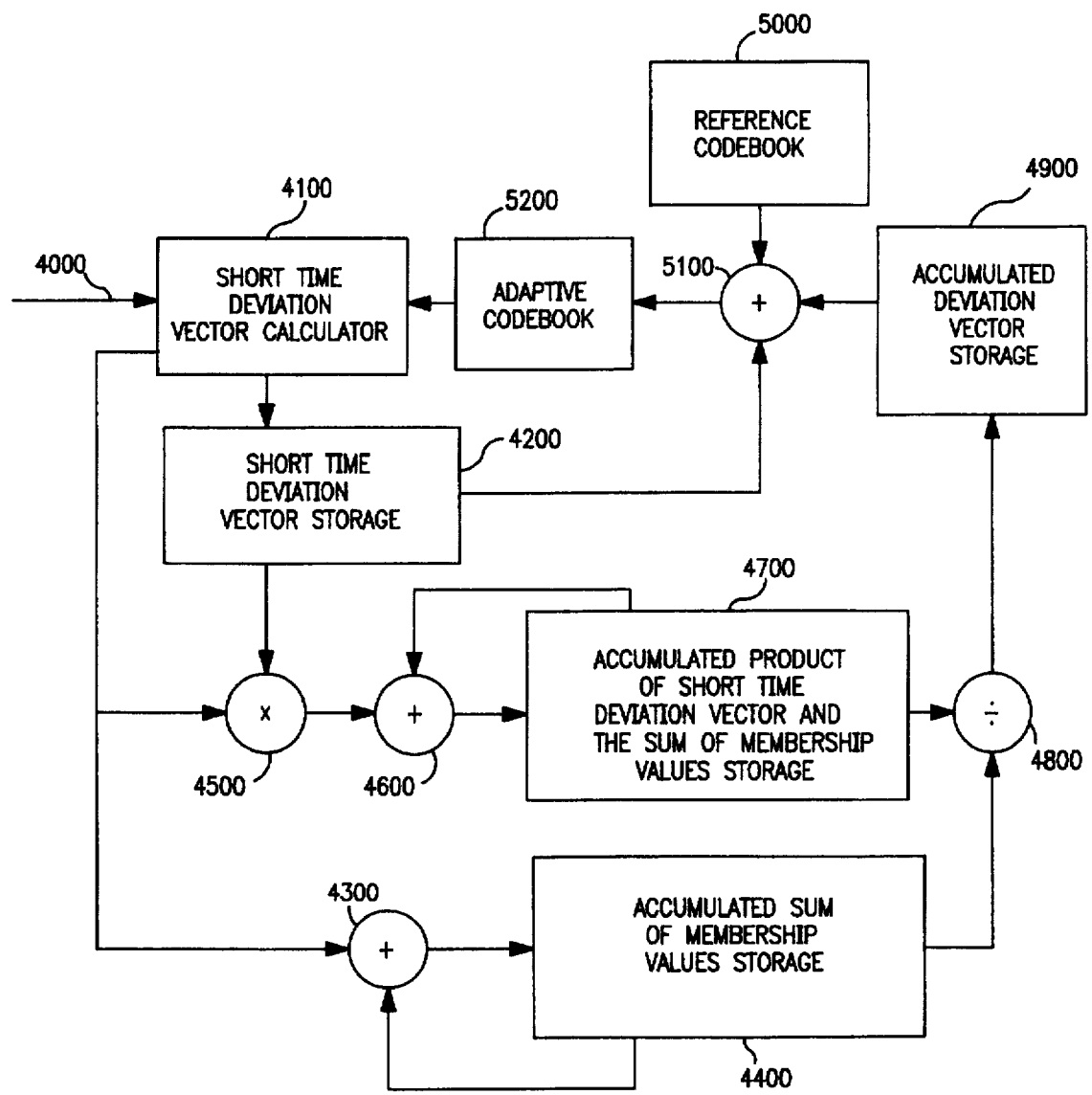
FIG. 31 illustrates the principle of another embodiment of the present invention.
Figure 32:
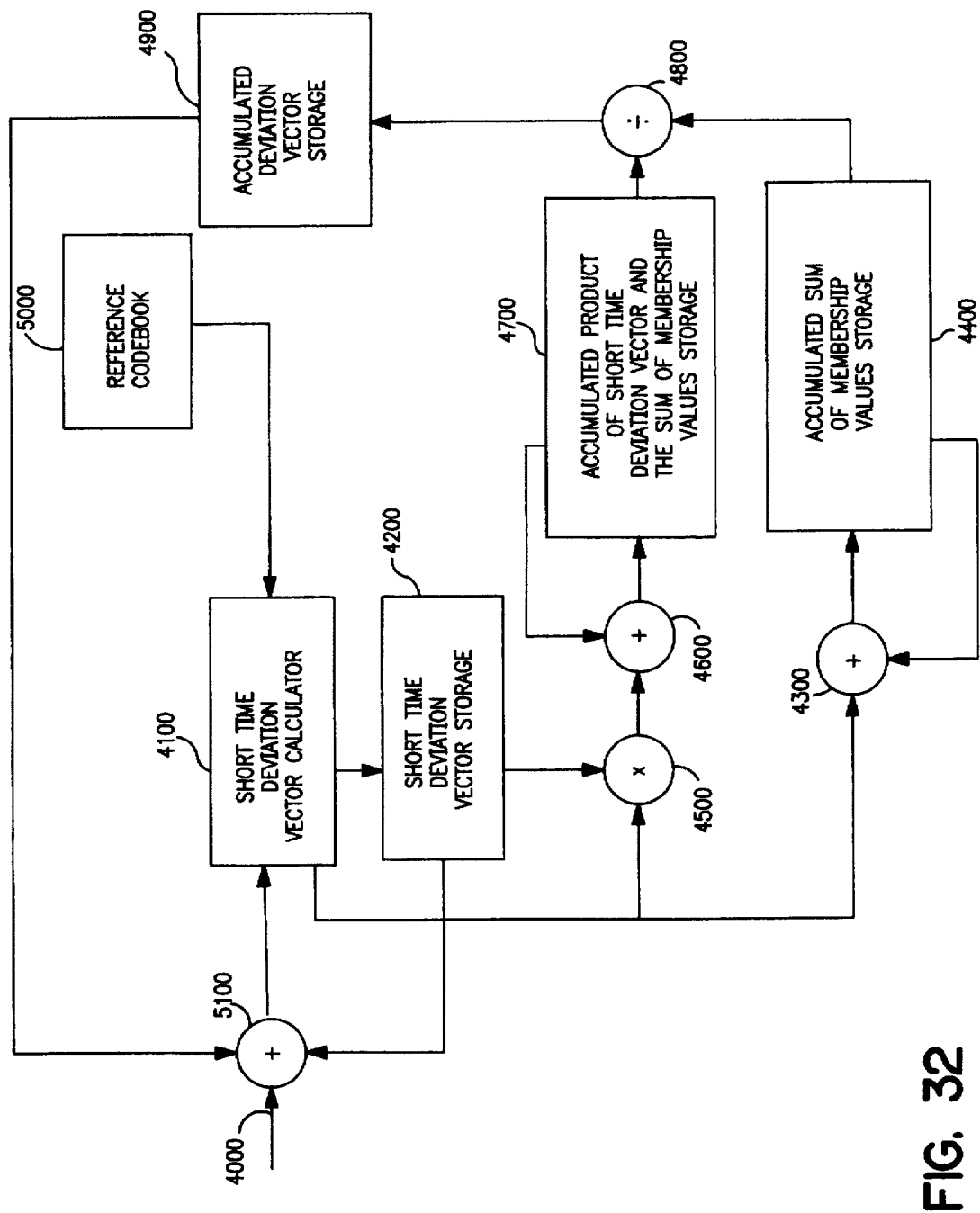
FIG. 32 is a block diagram of another embodiment of a method of speaker normalization according to the present invention.

Therefore, subtracting $h_m$ from $y_i^A$ can be regarded as normalizing a speaker to a codebook. Equations 70 and 71 corresponds to FIGS. 30 and 31, respectively. If the configuration in FIG. 32 is used in conjunction with them, Equations 72 and 73 can be derived in association with Equations 70 and 71.

$$J'(n) = \sum_{i=1}^{P} \sum_{m=1}^{M} u_{im}(n)^F d(y_i^A(n)', \mu_m)$$ Equation 72

$$= \sum_{i=1}^{P} \sum_{m=1}^{M} u_{im}^F(n) d(y_i^A(n) + h_m(n-1) + \Delta_m(n), \mu_m)$$

$$= \sum_{i=1}^{P} \sum_{m=1}^{M} u_{im}^F(n) \{(y_i^A(n) + h_m(n-1) + \Delta_m(n)) -$$

$$\mu_m\}^T \{(y_i^A(n) + h_m(n-1) + \Delta_m(n)) - \mu_m\}$$

$$JJ'(n) = \sum_{r=1}^{n} \sum_{i=1}^{P} \sum_{m=1}^{M} u_{im}(r)^F d(y_i^A(r)', \mu_m)$$ Equation 73

$$= \sum_{r=1}^{n-1} \sum_{i=1}^{P} \sum_{m=1}^{M} \mu_{im}(r)^F d(y_i^A(r) + h_m(r), \mu_m) +$$

$$\sum_{i=1}^{P} \sum_{m=1}^{M} u_{im}^F(n) d(y_i^A(n) + h_m(n), \mu_m)$$

$$= JJ'(n-1) + \sum_{i=1}^{P} \sum_{m=1}^{M} \mu_{im}^F(n) d(y_i^A(n) + h_m(n), \mu_m)$$

$$= JJ'(n-1) + \sum_{i=1}^{P} \sum_{m=1}^{M} u_{im}^F(n) \{y_i^A(n) + h_m(n) -$$

$$\mu_m\}^T \{y_i^A(n) + h_m(n) - \mu_m)\}$$

The above-mentioned matter is such case that all past voices which were inputted to the system by the speaker A are used for adaption, but there is possibility that the circumstances are changed during the using of the speaker and in such case it is preferrable to adaptively use the voices from certain time ago. That is the accumulated sum of membership values storing portion 4400 and the accumulated-product-of-membership value-and-deviation vector storing portion 4700 in the FIGS. 30, 31, 32 and so on calculate the deviation vector by the before-mentioned method, by storing contents of every certain period, to re-write of codebook or to update normalization vector of speaker normalization.

Changing the equations of 54 and 66 to be the equations of 74 and 75 by using an attenuation coefficient α (0<α<1) results in that when the sum of membership value and the short time deviation vector are calculated from a certain past time, the larger the past time is, the smaller value is multiplied to the vectors. Therefore the nearer the input is to the present time, the input is largely weighted.

$$W_m = \alpha \times W_m + w_m(n)$$ Equation 74

$$V_m = \alpha \times V_m + w_m(n) \times \Delta_m(n)$$

$$W = \alpha \times W + w(n)$$ Equation 75

$$V = \alpha \times V + w(n) \times \Delta(n)$$

Figure 33:
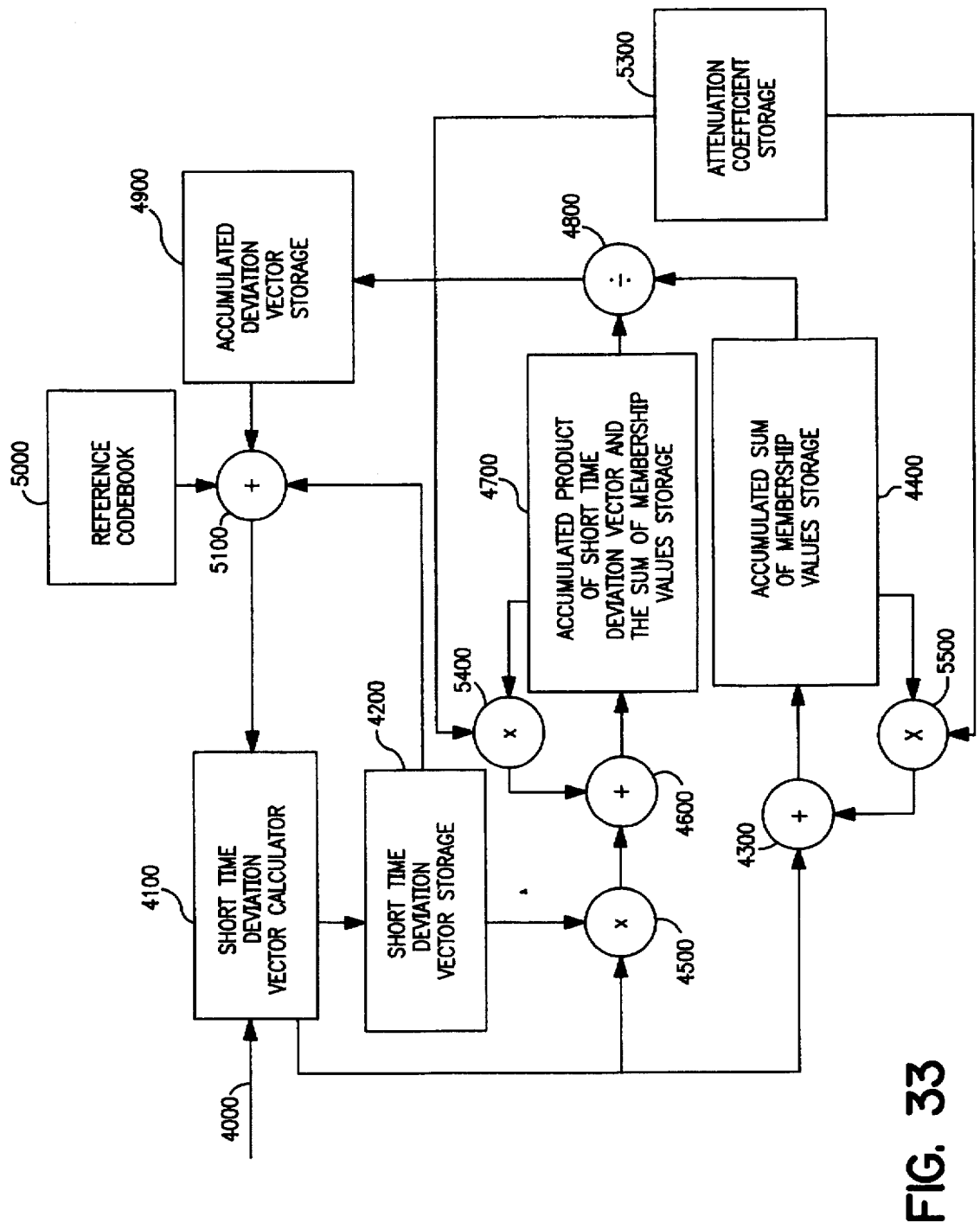
FIG. 33 is a block diagram of a vector quantization device in which the past input voice is gradually forgot, of FIG. 30.
Figure 34:
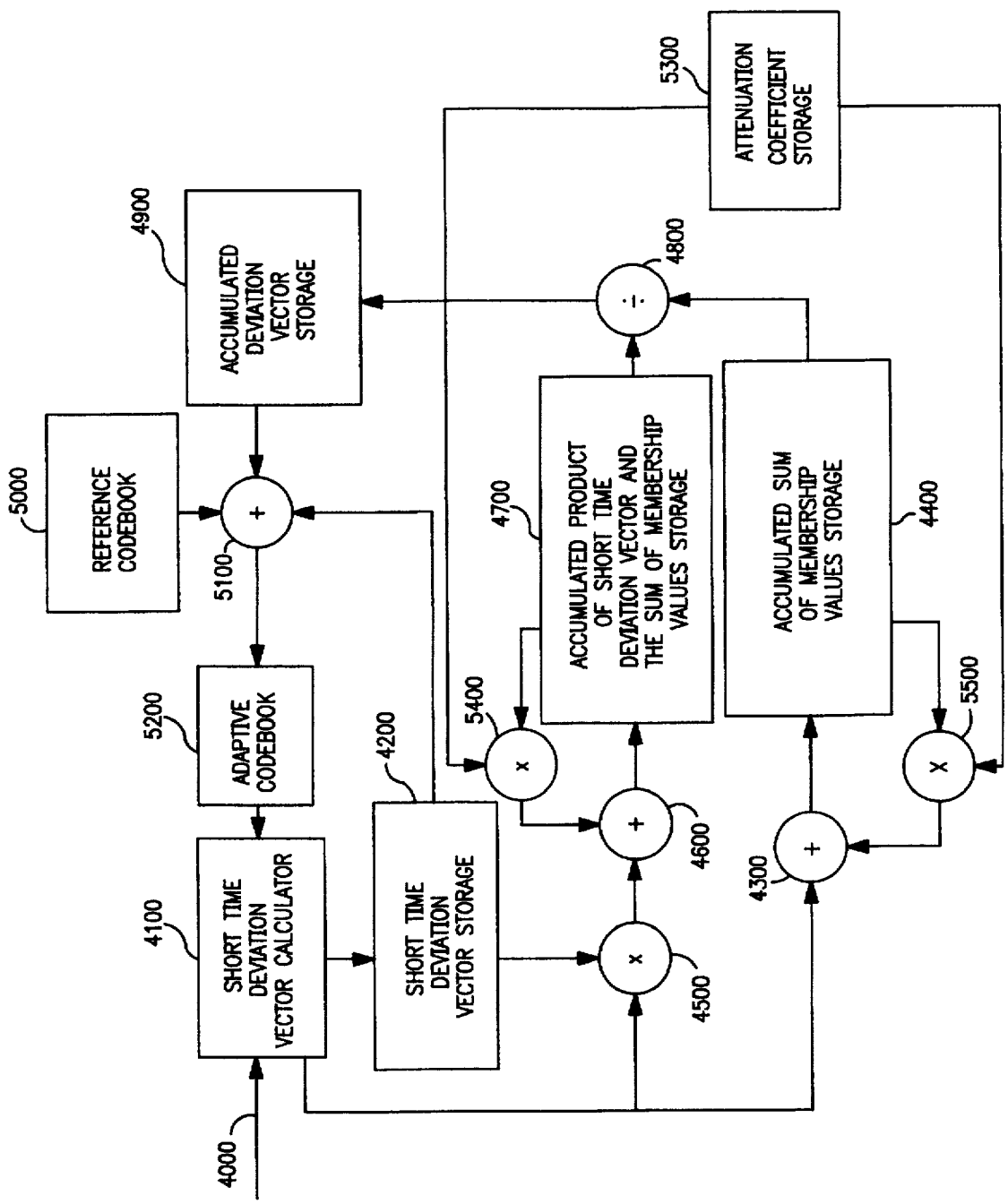
FIG. 34 is a block diagram of a vector quantization device in which the past input voice is gradually forgot, of FIG. 31.

In the constitution of the case, as shown by FIGS. 33 and 34 a multiplier 5400 is set between the accumulated-product-of-membership value-and-deviation vector storing portion 4700 and the adder 4600, and further a multiplier 5500 is set between the accumulated sum of membership values storing portion 4400 and the adder 5500, and from the attenuation coefficient storing portion 5300 the attenuation coefficient is outputted to these multipliers 5400, 5500 to be multiplied with the outputs of the vector storing portions 4700, 4400.

A description will now be made on the result of an experiment carried out to examine the effect of the present invention. A reference codebook was created in advance from 20 male speakers. Successive adaptation was performed using utterances input by an unknown speaker.

Experiments on recognition using 100 words resulted in an average recognition rate of 84.2% for the 20 people in the case of no adaptation. Successive adaptation raised the recognition rate to 88.7%.

Although deviation vectors are calculated as $h_1$, $h_2$, $h_M$ that give the extreme value of the objective function according to the present embodiment, these values may be obtained using the steepest descent method or other similar methods. While the present embodiment has focused on a case wherein $h_i$ that reduces the objective function obtained, $h_i$ that increases the objective function may be obtained depending on the definition of the objective function. For example, this happens of course when J in the present embodiment is replaced with −J. Further, the terms "addition" and "subtraction" have been used in the present embodiment, they may be exchanged because addition means subtraction if accompanied by a negative sign and vice versa.

As described above, the present invention makes it possible to adapt a codebook to the utterance of a particular speaker using a small number of samples or to normalize the utterance of the speaker so that it complies with a reference codebook. It is therefore possible to improve communication quality for communication and recognition accuracy for recognition with a small amount of learning.

According to the present invention, a codebook is corrected using speech whose contents are unknown and a correction vector which is weighted by the path probabilities, calculated using HMMs associated with the speech and which is obtained to minimize the distortion of the quantization error relative to the codebook. This makes it possible to compensate for differences in the environmental conditions between the time of the creation of the HMMs and the time of recognition, thereby allowing a speech recognition device resistant to environmental changes to be configured.

According to the present invention, feature vectors are corrected using speech whose contents are unknown and a normalization vector which is weighted by the path probabilities calculated using HMMs associated with the speech and which is obtained to minimize the distortion of the quantization error relative to the codebook. This makes it possible to compensate for differences in the environmental conditions between the time of the creation of the HMMs and the time of recognition, thereby allowing a speech recognition device resistant to environmental changes to be configured.

What is claimed is:

1. A vector quantizer comprising:

a reference codebook for storing several representative vectors in a feature vector space so that they can be retrieved using labels corresponding thereto;

a learning vector storing means for storing several vectors for learning;

an objective function calculating means for calculating an objective function defined as a function of said representative vectors and said vectors for learning;

a deviation vector calculating means for calculating deviation vectors; and an adaptation means for obtaining new representative vectors by adding said deviation vectors to said representative vectors, wherein:

input vectors are encoded by converting the input vectors into labels or membership vectors whose components are the membership values of said input vector for the labels using said new representative vectors; and said deviation vector calculating means calculates so that said new representative vectors maximize said objective function relative to said vector for learning.

2. A vector quantizer comprising:

a reference codebook for storing several representative vectors in a feature vector space so that they can be retrieved using labels corresponding thereto;

a learning vector storing means for storing several vectors for learning;

an objective function calculating means for calculating an objective function defined as a function of said representative vectors and said vectors for learning;

a deviation vector calculating means for calculating a deviation vector; and a normalization means for adding said deviation vector to input vectors, wherein:

the input vectors are encoded by adding the deviation vectors to the input vectors to obtain normalized input vectors and by converting them into labels or membership vectors whose components are the membership values of said input vectors for the labels; and said deviation vector calculating means calculates so that said objective function is maximized when the sums of said vectors for learning and said deviation vector are placed in said reference codebook as new representative vectors.

3. A vector quantizer comprising:

a reference codebook for storing several representative vectors in a feature vector space so that each of them can be retrieved using labels associated therewith;

a speech input means for inputting speech;

a speech analysis means for performing feature extraction on said input speech to convert it into a series of feature vectors;

a vector quantizing means for converting said feature vectors into labels or a membership value vector whose components are the membership value of said feature vectors for the representative vectors;

an objective function calculating means for calculating an objective function defined as a function of said representative vectors and said series of feature vectors;

short time deviation vector calculating means for calculating a short time deviation vector;

a sum of membership values calculating means for calculating the sum of said membership values in the input speech segment used for the calculation of said short time deviation vector;

a product of short time deviation vector and the sum of membership values calculating means for calculating a vector which is the product of said short time deviation vector and said sum of membership values;

an accumulated sum of membership values storing means for accumulating and storing past sum of membership values;

an accumulated product of short time deviation vector and the sum of membership values storing means for accumulating and storing past product of said short time deviation vector and said sum of membership values;

a deviation vector calculating means for calculating past deviation vectors from the past accumulated product of short time deviation vector and said sum of membership values stored in said accumulated product of short time deviation vector and the sum of membership values storing means and the past accumulated sum of said membership values stored in said accumulated sum of membership values storing means; and an adaptation means for adding said past deviation vector to said representative vectors to obtain new representative vectors, wherein said short time deviation vector calculating means calculates so that said new representative vectors cause said objective function to approach the extreme value relative to the feature vectors for the current input utterance and wherein said deviation vector calculating means calculates so that an overall objective function approaches the extreme value relative to feature vectors for past input utterances.

4. A vector quantizer comprising:

a reference codebook for storing several representative vectors in a feature vector space so that each of them can be retrieved using labels associated therewith;

a speech input means for inputting speech;

a speech analysis means for performing feature extraction on said input speech to convert it into a series of feature vectors;

a vector quantizing means for converting said feature vectors into labels or a membership value vector whose components are the membership value of said feature vectors for the representative vectors;

an objective function calculating means for calculating an objective function defined as a function of said representative vectors and said series of feature vectors;

short time deviation vector calculating means for calculating a short time deviation vector;

a sum of membership values calculating means for calculating the sum of said membership values in the input speech segment used for the calculation of said short time deviation vector;

a product of short time deviation vector and the sum of membership values calculating means for calculating a vector which is the product of said short time deviation vector and said sum of membership values;

an accumulated sum of membership values storing means for accumulating and storing past sum of membership values;

an accumulated product of short time deviation vector and the sum of membership values storing means for accumulating and storing past product of short time deviation vector and said sum of membership values;

a deviation vector calculating means for calculating past deviation vectors from the past accumulated product of short time deviation vector and said sum of membership values stored in said accumulated product of short time deviation vector and the sum membership values storing means and the past accumulated sum of said membership values stored in said accumulated sum of membership values storing means; and a normalization means for adding said past deviation vector to a feature vector, wherein said short time deviation vector calculating means calculates so that said objective function approaches the extreme value relative to said reference codebook when the sum of the current feature vector and said deviation vector is replaced as a new vector for learning and wherein said deviation vector calculating means calculates so that an overall objective function approaches the extreme value relative to said reference codebook when the sums of past feature vectors and said deviation vector are replaced as new vectors for learning.

5. The vector quantizer according to claim 1 or claim 2, wherein said deviation vector calculating means obtains a deviation vector for each representative vector.

6. The vector quantizer according to claim 1 or claim 2, wherein said deviation vector calculating means obtains a common deviation vector for all the representative vectors.

7. The vector quantizer according to claim 1, comprising an adder for adding a deviation vector and each of the representative vectors in the reference codebook wherein vector quantization is performed based on the output of said adder.

8. The vector quantizer according to claim 1, comprising an adder for adding a deviation vector and each of the representative vectors in the reference codebook and an adaptation codebook for storing the output of said adder wherein vector quantization is performed based on the output of said adaptation codebook.

9. A signal transmitter comprising a label transmitting means for transmitting labels encoded by the vector quantizer according to claim 7 or claim 8 and a deviation vector transmitting means.

10. A signal transmitter comprising a label transmitting means for transmitting labels encoded by the vector quantizer according to claim 8 and an adaptation codebook transmitting means for transmitting an adaptation codebook.

11. A signal receiver comprising a deviation vector storing portion for storing deviation vectors transmitted by the signal transmitter according to claim 9, a reference codebook, an adder for adding a representative vector read out from said reference codebook associated with a label which has been received and a deviation vector read out from said deviation vector storing portion in accordance with said label, and a decoder for providing the output of said adder as a decoded vector for said label.

12. A signal receiver comprising a deviation vector storing portion for storing deviation vectors transmitted by the signal transmitter according to claim 9, a reference codebook, an adaptation codebook for storing the sums of representative vectors associate with labels in said reference codebook and said deviation vectors read out from said deviation vector storing portion in accordance with the labels, and a decoder for providing a code vector in said adaptation codebook associated with a label which has been received as a decoded vector for said label.

13. A signal receiver comprising an adaptation codebook storing portion for storing an adaptation codebook transmitted by the signal transmitter according to claim 10 and a decoder for providing a code vector in said adaptation codebook associated with a label which has been received as a decoded vector for said label.

14. A recognition device comprising the vector quantizer according to claim 1 for performing vector quantization on each of a series of feature vectors which has been input, for converting them into labels, and for consequently converting said series of feature vectors into a series of labels, an HMM storing means for storing a hidden Markov model for each unit for recognition wherein the probability of the occurrence of each label is defined for each state, and a likelihood calculating means for calculating the likelihood of each of said HMMs for said series of labels, the unit for recognition associated with the HMM that gives the maximum value of the likelihood being regarded as the result of recognition.

15. A recognition device comprising the vector quantizer according to claim 1 for performing vector quantization on each of a series of feature vectors which has been input, for converting them into membership vectors whose components are membership values of the vectors for individual labels, and for consequently converting said series of feature vectors into a series of said membership vectors, an HMM storing means for storing a hidden Markov model for each unit for recognition wherein the probability of the occurrence of each label is defined for each state, and a likelihood calculating means for calculating the likelihood of each of said HMMs for said series of membership vectors, the unit for recognition associated with the HMM that gives the maximum value of the likelihood being regarded as the result of recognition.

16. A vector quantizer comprising:

a reference codebook storing means for storing a finite number of representative vectors in a feature vector space so that they can be retrieved using labels assigned thereto;

a vector quantizing means for converting each of a series of feature vectors into a membership vector associated with a label using said reference codebook to convert said series of feature vectors into a series of membership vectors;

an HMM storing means for storing HMMs for which the label occurrence probability and the probability of a state transition are defined for each state thereof;

a feature vector series occurrence rate calculating means for calculating the rate of the occurrence of said series of feature vectors from said HMMs based on said label occurrence probability and said membership vectors;

a path probability calculating means for calculating the path based on said feature vector series occurrence rate and the probability of the transition of said HMM; and a codebook correcting means for correcting said representative vectors, wherein said codebook correcting means comprises a correction vector calculating means for correcting said representative vectors to minimize the distortion of quantization error of said series of feature vectors from said reference codebook weighted by said path probability and is configured to correct said representative vectors.

17. A vector quantizer comprising:
- a reference codebook storing means for storing a finite number of representative vectors in a feature vector space so that they can be retrieved using labels assigned thereto;
- a vector quantizing means for converting each of a series of feature vectors into a membership vector associated with a label using said reference codebook to convert said series of feature vectors into a series of membership vectors;
- an HMM storing means for storing HMMs for which the label occurrence probability and the probability of a state transition are defined for each state thereof;
- a feature vector series occurrence rate calculating means for calculating the rate of the occurrence of said series of feature vectors from said HMMs based on said label occurrence probability and said membership vectors;
- a path probability calculating means for calculating the path probability based on said feature vector series occurrence rate and the probability of the transition of said HMM;
- a likelihood calculating means for calculating the likelihood of the HMM for each of said word relative to said series of feature vectors;
- a comparison and determination means for determining the result of recognition;
- a recognition candidate reliability calculating means for calculating the reliability of a candidate for recognition obtained by said comparison and determination means;
- a code book correction execution determining means for instructing the execution of the correction of the reference codebook if the reliability of said candidate for recognition exceeds a predetermined threshold; and
- a codebook correcting means for correcting each of said code vectors, wherein said reference codebook correcting means comprises a correction vector calculating means for correcting said representative vectors to minimize the distortion of quantization error of said series of feature vectors from said reference codebook weighted by said path probability and is configured to correct said reference codebook when the contents of speech is known by using the candidate for recognition as the contents of speech.

18. A recognition device comprising the vector quantizer according to claim 1 for performing vector quantization on each of a series of feature vectors which has been input, for converting them into labels, and for consequently converting said series of feature vectors into a series of labels, a recognition model storing means for storing a recognition model represented by a series of labels for each unit for recognition, and a distance calculating means for calculating the distance or similarity between said input series of labels and each of said recognition models, the unit for recognition associated with the recognition model that gives the minimum value of said distance or the maximum value of said similarity being regarded as the result of recognition.

19. A recognition device comprising the vector quantizer according to claim 1 for performing vector quantization on each of a series of feature vectors which has been input, for converting them into membership vectors whose components are membership values of the vectors for individual labels, and for consequently converting said series of feature vectors into a series of said membership vectors, a recognition model storing means for storing a recognition model represented by a series of labels for each unit for recognition, and a distance calculating means for calculating the distance or-similarity between said input series of membership values and each of said recognition models, the unit for recognition associated with the recognition model that gives the minimum value of said distance or the maximum value of said similarity being regarded as the result of recognition.

20. The vector quantizer according to claim 2, comprising an adder for adding a deviation vector and input vectors wherein vector quantization is performed based on the output of said adder.

21. A signal transmitter comprising a label transmitting means for transmitting labels encoded by the vector quantizer according to claim 20 and a deviation vector transmitting means for transmitting a deviation vector.

22. A signal receiver comprising a deviation vector storing portion for storing deviation vectors transmitted by the signal transmitter according to claim 21, a reference codebook, an subtracter for subtracting a deviation vector read out from said deviation vector storing portion from a representative, vector read out from said reference codebook in accordance with a label which has been received, and a decoder for providing the output of said subtracter as a decoded vector for said label.

23. A recognition device comprising the vector quantizer according to claim 2 for performing vector quantization on a normalized vector of each of a series of feature vectors which has been input, for converting them into labels, and for consequently converting said series of feature vectors into a series of labels, an HMM storing means for storing a hidden Markov model for each unit for recognition wherein the probability of the occurrence of each label is defined for each state, and a likelihood calculating means for calculating the likelihood of each of said HMMs for said series of membership vectors, the unit for recognition associated with the HMM that gives the maximum value of the likelihood being regarded as the result of recognition.

24. A recognition device comprising the vector quantizer according to claim 2 for performing vector quantization on the normalized vector of each of a series of feature vectors which has been input, for converting them into membership vectors whose components are membership values of the vectors for individual labels, and for consequently converting said series of feature vectors into a series of said membership vectors, an HMM storing means for storing a hidden Markov model for each unit for recognition wherein the probability of the occurrence of each label is defined for each state, and a likelihood calculating means for calculating the likelihood of each of said HMMs for said series of membership vectors, the unit for recognition associated with the HMM that gives the maximum value of the likelihood being regarded as the result of recognition.

25. A vector quantizer comprising:
- a reference codebook storing means for storing a finite number of representative vectors in a feature vector space so that they can be retrieved using labels assigned thereto;
- a vector quantizing means for converting each of a series of feature vectors into a membership vector associated with a label using said reference codebook to convert said series of feature vectors into a series of membership vectors;
- an HMM storing means for storing HMMs for which the label occurrence probability and the probability of a state transition are defined for each state thereof;
- a feature vector series occurrence rate calculating means for calculating the rate of the occurrence of said series of feature vectors from said HMMs based on said label occurrence probability and said membership vectors;
- a path probability calculating means for calculating the path probability based on said feature vector series occurrence rate and the probability of the transition of said HMM;

a feature vector correcting means for correcting said feature vectors; and a normalization vector adjusting means for calculating a normalization vector for correcting said feature vectors, wherein said normalization vector adjusting means comprises a correction vector calculating means for correcting said representative vectors to minimize the distortion of quantization error of said series of feature vectors from said reference codebook weighted by said path probability and is configured to correct said representative vectors.

26. A vector quantizer comprising:

a reference codebook storing means for storing a finite number of representative vectors in a feature vector space so that they can be retrieved using labels assigned thereto;

a vector quantizing means for converting each of a series of feature vectors into a membership vector associated with a label using said reference codebook to convert said series of feature vectors into a series of membership vectors;

an HMM storing means for storing HMMs for which the label occurrence probability and the probability of a state transition are defined for each state thereof;

a feature vector series occurrence rate calculating means for calculating the rate of the occurrence of said series of feature vectors from said HMMs based on said label occurrence probability and said membership vectors;

a path probability calculating means for calculating the path probability based on said feature vector series occurrence rate and the probability of the transition of said HMM;

a likelihood calculating means for calculating the likelihood of the HMM for each of said word relative to said series of feature vectors;

a comparison and determination means for deterring the result of recognition;

a recognition candidate reliability calculating means for calculating the reliability of a candidate for recognition obtained by said comparison and determination means;

a code book correction execution determining means for instructing the execution of the correction of the reference codebook if the reliability of said candidate for recognition exceeds a predetermined threshold;

a feature vector correcting means for correcting said feature vectors; and a normalization vector adjusting means for calculating a normalization vector for correcting said feature vectors, wherein said reference codebook correcting means comprises a correction vector calculating means for correcting said representative vectors to minimize the distortion of quantization error of said series of feature vectors from said reference codebook weighted by said path probability and is configured to correct said reference codebook when the contents of speech is unknown by using the candidate for recognition as the contents of speech.

27. A recognition device comprising the vector quantizer according to claim 2 for performing vector quantization on a normalized vector of each of a series of feature vectors which has been input, for converting them into labels, and for consequently converting said series of feature vectors into a series of labels, a recognition model storing means for storing a recognition model represented by a series of labels for each unit for recognition, and a distance calculating means for calculating the distance or similarity between said input series of labels and each of said recognition models, the unit for recognition associated with the recognition model that gives the minimum value of said distance or the maximum value of said similarity being regarded as the result of recognition.

28. A recognition device comprising the vector quantizer according to claim 2 for performing vector quantization on a normalized vector of each of a series of feature vectors which has been input, for converting them into membership vectors whose components are membership values of the vectors for individual labels, and for consequently converting said series of feature vectors into a series of said membership vectors, a recognition model storing means for storing a recognition model represented by a series of labels for each unit for recognition, a distance calculating means for calculating the distance or similarity between said input series of membership values and each of said recognition models, the unit for recognition associated with the recognition model that gives the minimum value of said distance or the maximum value of said similarity being regarded as the result of recognition.

29. The vector quantizer according to claim 1, comprising a temporary storage means for serially storing predetermined constant signal segments of an input signal in real time wherein serial adaptation of a code book or a deviation vector is performed for each of said signal segments using the contents of said temporary storing means as vectors for learning.

30. The vector quantizer according to claim 2, comprising a temporary storage means for serially storing predetermined constant signal segments of an input signal in real time wherein deviation vectors for normalization of the input signal are serially calculated for each of said signal segments using the contents of said temporary storing means as vectors for learning.

31. The vector quantizer according to claim 1, comprising a multiplier and attenuation coefficient storing means for storing an attenuation coefficient which is set to attenuate an effect of a past input voice, wherein the deviation vector is calculated so as to make an effect of the input voice near a present time large by multiplying the accumulated product of short time deviation vector and the sum of membership values and the accumulated sum of membership values vector with the attenuation coefficient, and thereby to adapt the code book or the deviation vector.

32. The vector quantizer according to claim 2, comprising a multiplier and attenuation coefficient storing means for storing an attenuation coefficient which is set to attenuate an effect of a past input voice, wherein the deviation vector is calculated so as to make an effect of the input voice near a present time large by multiplying the accumulated product of short time deviation vector and the sum of membership values and the accumulated sum of membership values vector with the attenuation coefficient, and thereby to calculate the deviation vector for normalization of the input signal in order.

* * * * *